(12) United States Patent
Arama et al.

(10) Patent No.: US 11,334,221 B2
(45) Date of Patent: May 17, 2022

(54) LEFT RAIL CORRESPONDING ICON FOR LAUNCHING APPS WITHIN THE CONTEXT OF A PERSONAL INFORMATION MANAGER

(71) Applicant: Microsoft Technology Licensing, LLC, Redmond, WA (US)

(72) Inventors: Corina Arama, Bellevue, WA (US); Fernanda Mendes Richnak, Redmond, WA (US); Jonathan Jay Cadiz, Bellevue, WA (US); Weina Xie, Redmond, WA (US); William Ritter Avery, Redmond, WA (US); Lingnan Becker, Bellevue, WA (US); Erin Woo, New York, NY (US); Garett Yoshiharu Sakamoto, Newcastle, WA (US); Jonathan David Butler, Seattle, WA (US); Jin Ma, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/023,534

(22) Filed: Sep. 17, 2020

(65) Prior Publication Data
US 2022/0083178 A1   Mar. 17, 2022

(51) Int. Cl.
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
CPC .................................................... G06F 3/0482
See application file for complete search history.

(56) References Cited

U.S. PATENT DOCUMENTS

| 6,133,915 A * | 10/2000 | Arcuri | G06F 3/0481 |
| | | | 715/779 |
| 6,141,010 A * | 10/2000 | Hoyle | G06F 8/60 |
| | | | 715/201 |
| 8,095,972 B1 * | 1/2012 | Floyd | G06F 16/9574 |
| | | | 726/9 |

(Continued)

FOREIGN PATENT DOCUMENTS

EP   2813933 A1   12/2014

OTHER PUBLICATIONS

Mary MacPherson, "Website vs Web App: What's the Difference?", archived on Dec. 5, 2019 at wayback machine <<https://web.archive.org>>, available at: (Year: 2019).*

(Continued)

*Primary Examiner* — Daniel Rodriguez

(57) ABSTRACT

Systems and method are directed to launching an application from a rail located within a user interface of a personal information manager application. More specifically, a display of a first user interface of a first application may be rendered at a display device, where the first user interface includes a rail populated with a plurality of icons representing a plurality of applications. At least one of the plurality of icons may be selected and a second application may be determined based on the selected icon. Based upon the selection of the icon, a display of a second user interface may be rendered within a portion of the first user interface.

17 Claims, 41 Drawing Sheets

(56) References Cited

U.S. PATENT DOCUMENTS

| | | | | |
|---|---|---|---|---|
| 8,239,206 | B1* | 8/2012 | LeBeau | H04M 1/271 |
| | | | | 704/275 |
| 8,533,796 | B1* | 9/2013 | Shenoy | G06F 21/335 |
| | | | | 726/6 |
| 9,003,541 | B1* | 4/2015 | Patidar | G06F 21/50 |
| | | | | 726/26 |
| 9,223,460 | B2* | 12/2015 | Naranjo | G06F 3/0481 |
| 9,658,739 | B1* | 5/2017 | Freund | G06F 3/04817 |
| 10,261,672 | B1 | 4/2019 | Dolbakian et al. | |
| 10,318,222 | B2* | 6/2019 | Lee | G06F 3/0481 |
| 10,503,370 | B2* | 12/2019 | Claux | G06F 9/451 |
| 2003/0048286 | A1* | 3/2003 | Lal | G06F 9/452 |
| | | | | 715/700 |
| 2003/0124502 | A1* | 7/2003 | Chou | G09B 5/00 |
| | | | | 434/350 |
| 2003/0126216 | A1* | 7/2003 | Avila | H04L 51/14 |
| | | | | 709/206 |
| 2004/0162879 | A1* | 8/2004 | Arcuri | G06Q 10/107 |
| | | | | 709/206 |
| 2005/0108655 | A1* | 5/2005 | Andrea | G06F 9/451 |
| | | | | 715/798 |
| 2006/0075046 | A1* | 4/2006 | Yozell-Epstein | G06Q 10/107 |
| | | | | 709/206 |
| 2006/0227106 | A1* | 10/2006 | Hashimoto | G06F 3/0482 |
| | | | | 345/157 |
| 2007/0143704 | A1* | 6/2007 | Laird-McConnell | G06F 9/451 |
| | | | | 715/781 |
| 2008/0140448 | A1* | 6/2008 | Hernandez | G16H 10/60 |
| | | | | 705/2 |
| 2009/0113301 | A1* | 4/2009 | Fisher | G06F 8/61 |
| | | | | 715/716 |
| 2009/0119177 | A1* | 5/2009 | John | G06Q 30/02 |
| | | | | 705/14.54 |
| 2009/0222493 | A1* | 9/2009 | Smarr | G06F 16/23 |
| 2010/0011077 | A1* | 1/2010 | Shkolnikov | H04L 51/063 |
| | | | | 709/206 |
| 2010/0262958 | A1* | 10/2010 | Clinton | H04W 8/245 |
| | | | | 717/171 |
| 2011/0006971 | A1* | 1/2011 | Ebey | G06F 3/1431 |
| | | | | 345/1.3 |
| 2012/0084692 | A1 | 4/2012 | Bae | |
| 2012/0151368 | A1* | 6/2012 | Tam | G06F 9/451 |
| | | | | 715/738 |
| 2012/0159377 | A1* | 6/2012 | Naranjo | G06F 3/0481 |
| | | | | 715/780 |
| 2012/0266101 | A1* | 10/2012 | Shah | G06F 9/451 |
| | | | | 715/781 |
| 2013/0297050 | A1* | 11/2013 | Reichard | G05B 15/02 |
| | | | | 700/83 |
| 2014/0013396 | A1* | 1/2014 | Field-Eliot | H04L 63/0807 |
| | | | | 726/4 |
| 2014/0129964 | A1* | 5/2014 | Bleth | G06F 3/04817 |
| | | | | 715/760 |
| 2014/0250390 | A1* | 9/2014 | Holmes | G06F 3/0482 |
| | | | | 715/760 |
| 2014/0365890 | A1* | 12/2014 | Lei | G06F 3/0485 |
| | | | | 715/719 |
| 2015/0331557 | A1* | 11/2015 | Fish | G06F 3/0482 |
| | | | | 715/773 |
| 2015/0346952 | A1 | 12/2015 | Yang et al. | |
| 2015/0363093 | A1* | 12/2015 | Lee | G06F 16/248 |
| | | | | 715/747 |
| 2016/0103793 | A1* | 4/2016 | Fang | G06F 3/04842 |
| | | | | 715/234 |
| 2016/0132214 | A1* | 5/2016 | Koushik | G06F 9/455 |
| | | | | 715/741 |
| 2016/0350057 | A1* | 12/2016 | Kwon | G06F 3/1454 |
| 2017/0046024 | A1* | 2/2017 | Dascola | G06F 3/0488 |
| 2018/0052571 | A1* | 2/2018 | Seol | G06F 3/0482 |
| 2018/0088966 | A1* | 3/2018 | Chourasiya | G06F 9/54 |
| 2018/0329508 | A1* | 11/2018 | Klein | G06F 1/1615 |
| 2019/0377459 | A1* | 12/2019 | Jeong | G06F 3/0481 |
| 2019/0377467 | A1* | 12/2019 | Wang | G06Q 10/1095 |
| 2020/0019678 | A1* | 1/2020 | Kunnath | H04L 63/0815 |
| 2020/0226842 | A1* | 7/2020 | Altieri | A63F 13/335 |
| 2020/0236074 | A1* | 7/2020 | Kim | H04L 51/046 |
| 2020/0326839 | A1* | 10/2020 | Walkin | G06F 3/0482 |
| 2020/0387269 | A1* | 12/2020 | Baker | G06Q 50/01 |
| 2021/0006671 | A1* | 1/2021 | Karaki | H04N 1/00474 |

OTHER PUBLICATIONS

[Item U continued] <<https://medium.com/@essentialdesign/website-vs-web-app-whats-the-difference-e499b18b60b4#:~:text=Web%20applications%20are%20websites%20with,%2C%20YouTube%2C%20Twitter%2C%20etc.&text=A%20web%20application%20is%20computer,to%20the%20individual%20using%20it>>, 5 pages (Year: 2019).*

"Manifest Files", Retrieved From: https://en.wikipedia.org/w/index.php?t%20itle=Manifest%20file&oldid=860803136, Sep. 23, 2018, 2 Pages.

"Navigation Rail", Retrieved From: https://web.archive.org/web/20200717082647/https://material.io/components/navigation-rail, Jul. 17, 2020, 26 Pages.

"International Search Report and Written Opinion Issued in PCT Application No. PCT/US21/035564", dated Nov. 12, 2021, 16 Pages.

* cited by examiner

LEFT RAIL CORRESPONDING ICON FOR LAUNCHING APPS WITHIN THE CONTEXT OF A PERSONAL INFORMATION MANAGER

BACKGROUND

Icons are generally used as shortcuts to launch applications, such as word processing application, messaging applications and the like. In some examples, icons within applications such as word processing applications may be used for performing a function associated with the application and/or a file of the application. For example, an icon for performing a paste function within the file may be located within a toolbar of the application. However, such icons are generally limited to performing functions related to the application in which they are presented. Moreover, if a user desires to launch an application when viewing another application, the user generally has to divert their attention from the application they are viewing in order to launch the application they wish to use. For example, the user may need to minimize or close a current application, locate the application they wish to use, or an icon indicative of the application they wish to use, and then launch such application. Accordingly, a user may lose context and/or focus when having to perform multiple steps to launch an application.

It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, an icon associated with an application may be located in a rail that is part of the application the user is currently using or working in. The application, when launched from the rail, may be contained within an application in which the user is currently working. As an example, a user may be using an application, such as a personal information manager application; MICROSOFT™ OUTLOOK™ is an example of a personal information manager application and/or application a user may be using. Instead of requiring a user to locate another application either as an icon on a desktop or from an icon in a start menu, an icon associated with an application may be located in a rail, where the rail may be positioned at a left side of the personal information manager application. An application launched from the rail, may be contained within, or embedded within, a window, area, or region of a user interface that a user may be currently working in. Accordingly, user attention and focus may be maintained at the personal information manager application.

In accordance with at least one example of the present disclosure, a system is provided. The system may include one or more computer readable storage media and program instructions stored on the one or more computer readable storage media that, when executed by at least one processor, cause the at least one processor to: cause a display of a first user interface of a first application to be rendered at a display device, the first user interface comprising a rail including a plurality of icons representing a plurality of applications; receive an indication of an input directed to a selection of an icon of the plurality of icons, determine a second application associated with the selected icon; and cause a display of a second user interface of the second application to be rendered within a portion of the first user interface at the display device.

In accordance with at least one example of the present disclosure, a method for displaying a user interface of an application is provided. The method may include causing a rendering of a display of a first user interface of a first application at a display device, the first user interface comprising a rail including a plurality of icons representing a plurality of applications, receiving an indication of an input directed to a selection of an icon of the plurality of icons; determining a second application associated with the selected icon, determining a location to render a display of a second user interface associated with the second application; and causing a rendering of a display of the second user interface associated with the second application at the determined location.

In accordance with at least one example of the present disclosure, a method for displaying a user interface of an application is provided. The method may include determining, from a manifest file, a plurality of icons representing a plurality of applications to be displayed at a first user interface, populating a first application window of a first user interface with the determined plurality of icons, receiving an indication of a selection of an icon of the determined plurality of icons from within the first application window of the first user interface, determining an application associated with the selected icon, and causing a user interface associated with the determined application to be displayed within a second application window of the first user interface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
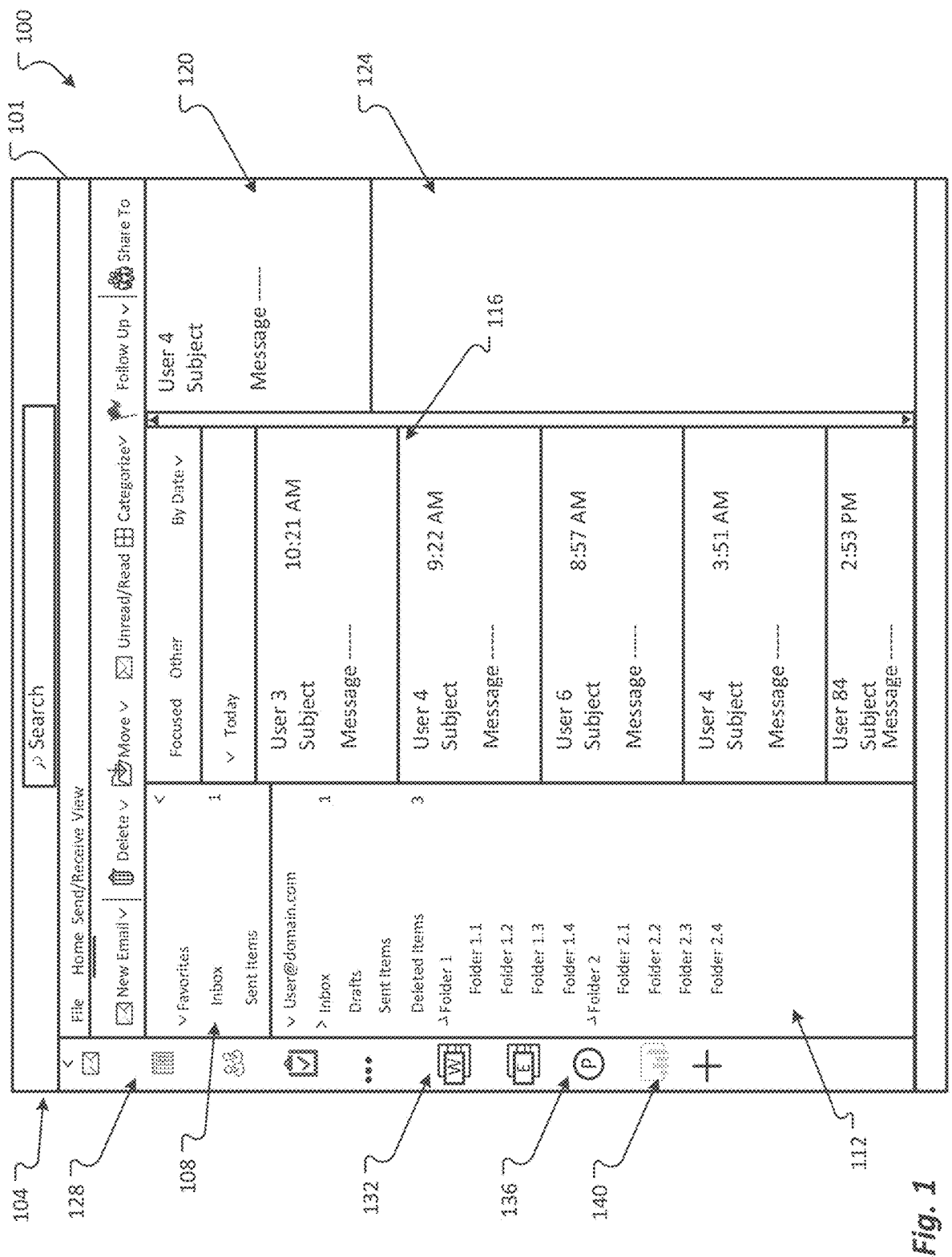
FIG. 1 depicts a user interface of a personal information manager application in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents (0042) FIG. 1 depicts a user interface 100 of a personal information manager application 101 in accordance with examples of the present disclosure. Non-limiting examples of the personal information manager application 101 include, but are not limited to, MICROSOFT™ OUTLOOK™, SCRIBE™, POSTBOX™, EVOLUTION™, MOZILLA™ THUNDERBIRD™, and GMAIL™. In some examples, the personal information manager application 101 may be an application that manages information other than personal information. As an example, corporate financial information, company logistics information, and/or employment data may be managed by the personal information manager 101. In some examples, the personal information manager application 101 may be a native client application residing on a processing device such as a computing device; in some examples, the personal information manager application 101 may be a web application, such as but not limited to OUTLOOK WEB ACCESS provided by MICROSOFT™ or GMAIL™, where such personal information manager application 101 may run or otherwise execute instructions within a web browser. The user interface 100 of the personal information manager application 101 may include a top portion 104 which may include a search field for searching one or more messages maintained by or otherwise available at the personal information manager application 101. The user interface 100 may also include multiple regions configured to display message related information to a user. For example, the user interface 100 of the personal information manager application 101 may display a region 108 configured to provide a summary of a quantity of messages contained in a folder or otherwise associated with a label, the folder and/or label, such as but not limited to "inbox" or "sent items" as depicted in FIG. 1, may correspond to a favorite item such that a user may quickly access messages from and/or view summary information associated with one or more of the folders or labels. Similarly, the user interface 100 of the personal information manager application 101 may display a region 112 configured to provide a more granulized summary of a quantity of messages contained in a folder or otherwise associated with a label; the folder and/or label depicted in FIG. 1 may correspond to a structure of a one or more message folders or labels, such as but not limited to an "inbox" or "Folder 1" for example. Although a person information manager is described here, aspects of the present disclosure may be practiced with other types of applications that may be different from personal information manager applications.

The user interface 100 of the personal information manager application 101 may display a region 116 configured to provide a display of one or more messages within a folder or label selected in the region 108 and/or region 112. As depicted in FIG. 1, the messages in the region 116 may correspond to email messages, however, the messages in the region 116 may correspond to other types of messages, such as instant message, chat messages, etc. As further depicted in FIG. 1, the user interface 100 of the personal information manager application 101 may display a region 120 providing content associated with a selected message in the region 116. For example, the message in the region 120 may correspond to a summary of a quantity of messages contained in a folder or otherwise associated with a label. The region 124 of the user interface 100 may further display additional information associate with the message in the region 120.

In accordance with examples of the present disclosure, the user interface 100 of the personal information manager application 101 may include a rail 128. The rail 128 may comprise a portion of the user interface 100 that is visually distinct from the remaining portions of the user interface. For example, a line or divider visually divide the rail 128 from other portions of the user interface 100. In some examples, the line or divider may appear as a different color from a background color displayed by the rail 128 and/or some of the other portions of the user interface. In some examples, the rail may be similar to a toolbar and may be placed at different locations of the user interface 100. In some examples, the rail 128 may be detachable from the user interface 100 such that the rail 128 exists as a separate portion and/or standalone portion of the user interface 100. The rail 128 may include icons of one or more applications capable of being launched and displaying another user interface 100. As depicted in the user interface 100, the rail 128 may be placed at the left side of the user interface 100 and may provide easy and/or efficient access to one or more of the regions 108 and/or 112 for selecting one or more messages to view based at least in part on proximity to such regions. However, it should be appreciated that the rail 128 may be placed at other locations within the user interface 100.

The rail 128 may provide access to a plurality of applications other than the personal information manager application 101. For example, the rail 128 may include shortcuts for a plurality of applications, where each shortcut may be associated with one or more displayed icons located at the rail 128. The rail 128 may allow a user to launch one or more applications, such as MICROSOFT™ WORD™ 132, MICROSOFT™ POWERPOINT™ 136, and/or MICROSOFT™ POWER BI™ 140. Of course, other applications are contemplated and within the scope of this disclosure. Moreover, first party and third party applications (e.g., applications created by or provided by a company other than the company associated with the first party applications) may also be used.

Figure 2:
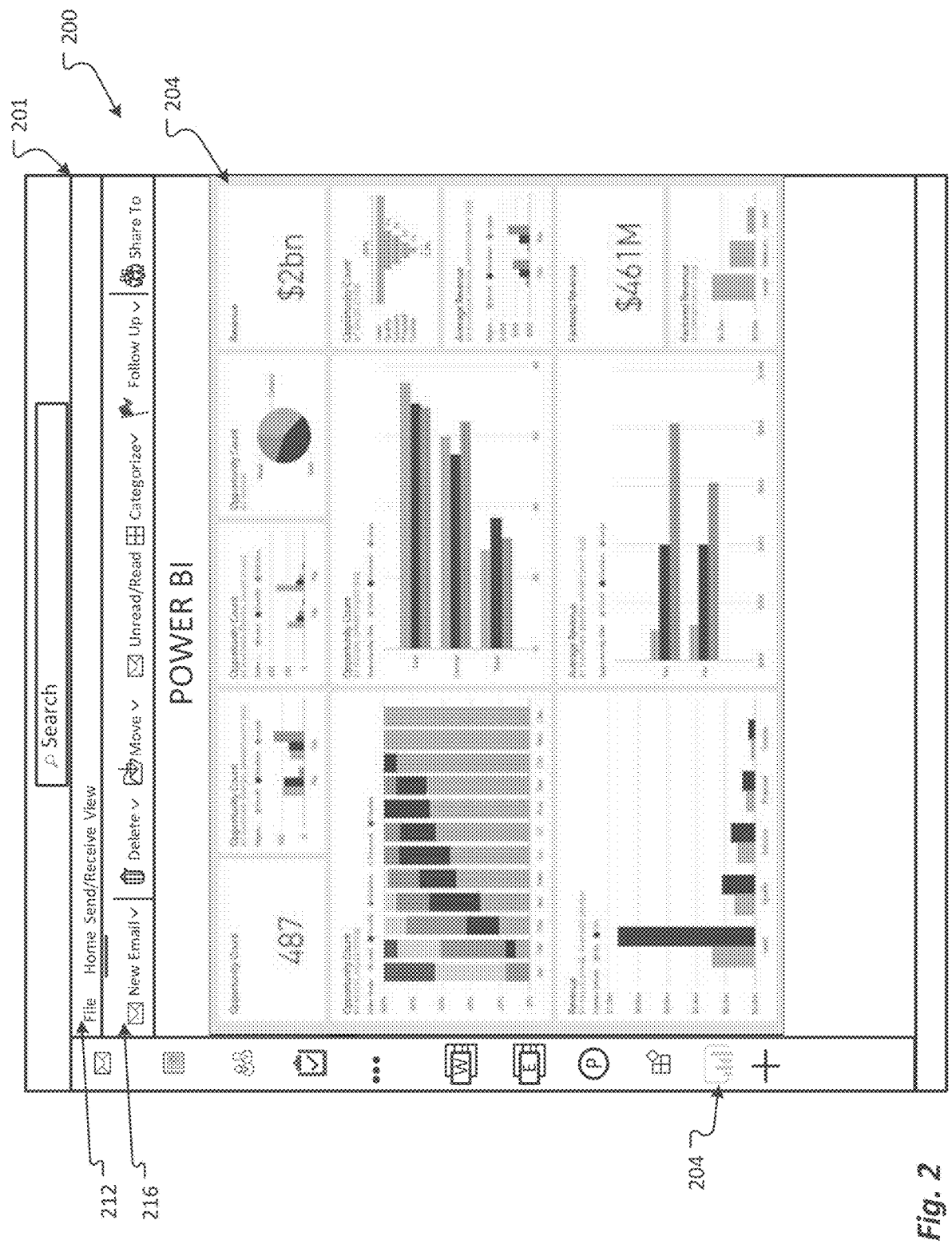
FIG. 2 depicts another user interface of the personal information manager application in accordance with examples of the present disclosure.

In accordance with examples of the present disclosure, a user may select an application to launch by selecting, clicking, or otherwise activing an icon associated with the desired application; such application may launch and may be contained within one or more areas or regions of the personal information manager application 101. For example, and as depicted in FIG. 2, upon selecting the MICROSOFT™ POWER BI™ icon 204, the application, MICROSOFT™ POWER BI™ may be launched within the user interface 200 of the personal information manager application depicted in FIG. 2. The personal information manager application 201 depicted in FIG. 2 may be the same as or similar to the personal information manager application depicted in FIG. 1. In some examples, the launched application may occupy one or more regions of the user interface 200. For example, the MICROSOFT™ POWER BI™ dashboard displayed in FIG. 2 may occupy regions 108, 116, 120, and 124 of the user interface 200. However, one or more toolbars 212 and/or 216 of the personal information manager application may be maintained and/or displayed. In some examples, clicking on an item in one or more of the toolbars 212 and/or 216 may cause the personal information manager application 201 to switch from displaying the application launched according to a selected icon, to displaying the user interface 200 of the personal information manager application 201. To return to the application launched according to the selected icon, a user may be required to click the icon 204 corresponding to the application that was previously launched. In some examples, keyboard shortcuts or other ways of returning to the application launched according to the selected icon may be utilized. In some examples, the application launched according to the selected icon may occupy zero or more regions 108, 116, 120, and/or 124. In other examples, one or more of the toolbars 212 and/or 216 may be modified or otherwise occupied or covered by a portion of the launched application. For example, a user interface associated with the application launched according to the selected icon may cover one or more of the toolbars 212 and/or 216.

Figure 3:
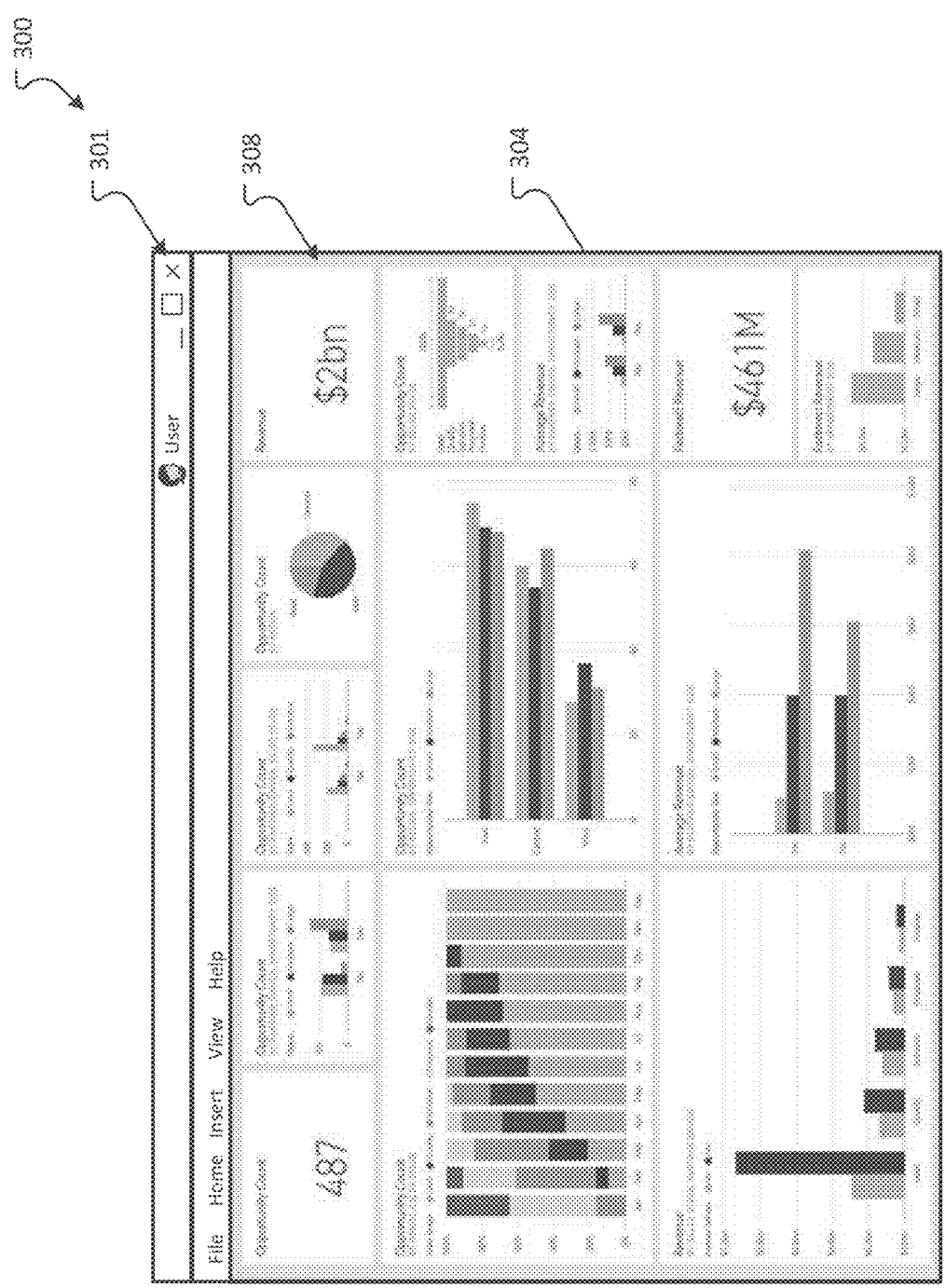
FIG. 3 depicts another user interface of the personal information manager application in accordance with examples of the present disclosure.

In accordance with some examples of the present disclosure, an application associated with a selected icon may launch in a window separate and apart from the user interface 200. For example, upon selecting the MICROSOFT™ POWER BI™ icon 204, the application, MICROSOFT™ POWER BI™ may be launched in a separate window and as a separate application 304 that is not contained within the user interface 300 of the personal information manager application 301. The personal information manager application 301 depicted in FIG. 3 may be the same as or similar to the personal information manager application 101 depicted in FIG. 1. Accordingly, as a user is interacting with the user interface 300 of the personal information manager application 301, a user may wish to switch to or otherwise utilize another application, such as the MICROSOFT™ POWER BI™ by selecting the icon 204 for example. Upon selection of the icon 204, a user interface 300 for the MICROSOFT™ POWER BI™ program may be rendered to a display, in a window that is different than a window displaying the user interface 100 or 200, and display application specific elements 308 associated with the selected icon 204 associated with an application. In some examples, upon selection of the icon 204, a user interface 300 for the MICROSOFT™ POWER BI™ program may be rendered to a display, in a window and at a display device that is different than a window and display device displaying the user interface 100 or 200, application specific elements 308 associated with the selected icon 204 associated with an application may be provided to a user. Accordingly, a user may interact with the application displayed in the user interface 300 as they normally would and may close the application displayed in the user interface 300 using the elements displayed as part of the user interface 300.

Figure 4:
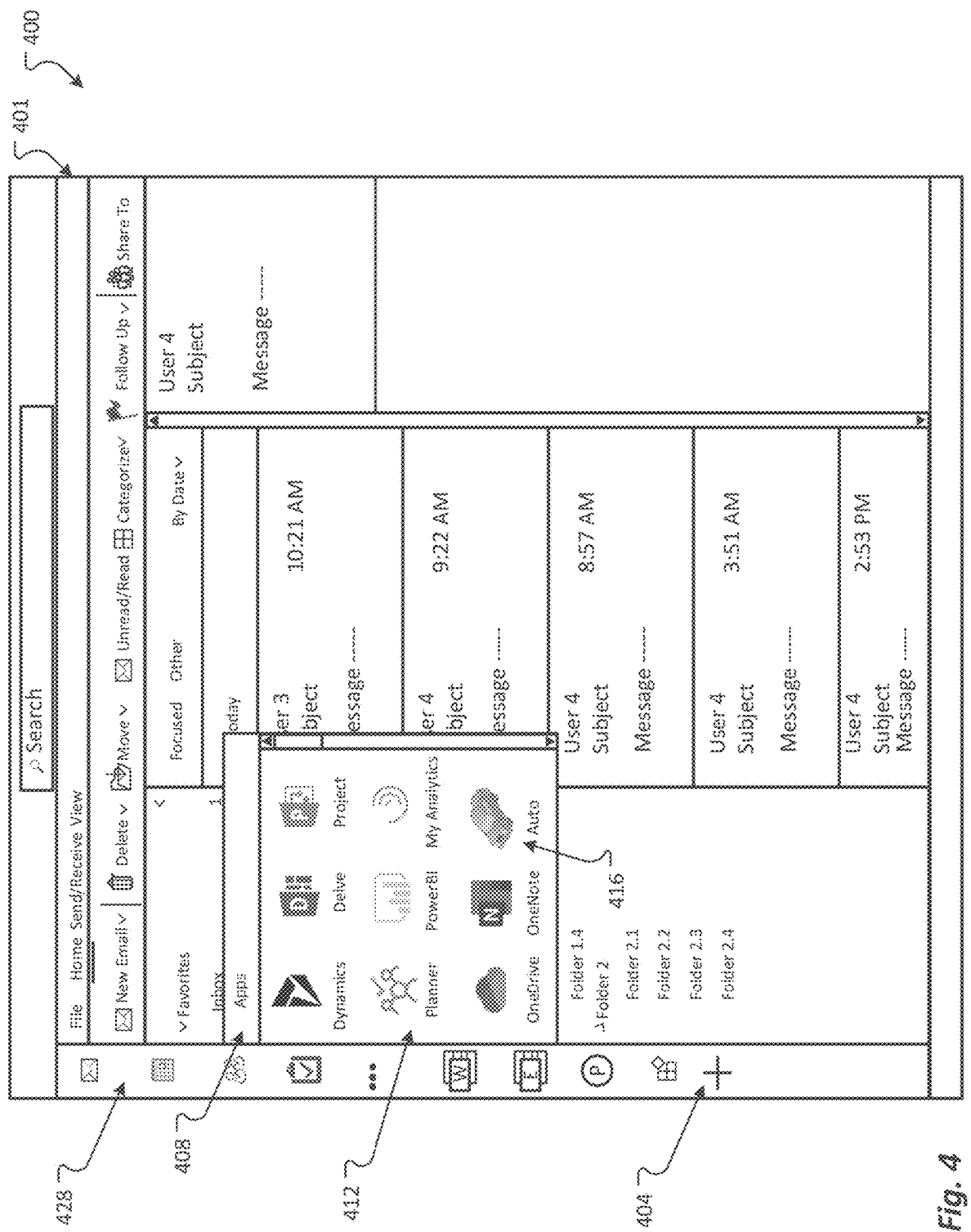
FIG. 4 depicts an application gallery in accordance with examples of the present disclosure.

FIG. 4 depicts an application gallery 408 in accordance with examples of the present disclosure. When an icon for an application that a user wishes to launch is not displayed in the rail 428, a user may select the "plus" element 404 to cause an application gallery 408 to be displayed to the user. The personal information manager application 401 depicted in FIG. 4 may be the same as or similar to the personal information manager application 101 depicted in FIG. 1. The application gallery 408 may display one or more icons 412 representing applications that can be added to or otherwise pinned to the rail 428. For example, a user desiring to have an auto application displayed in the rail 428, may click or otherwise select the "plus" element 404 located in the rail 428. The "plus" element 404 may cause the application gallery 408 to launch thereby displaying a plurality of icons 412. A user may then may make a selection, such as the auto icon 416 such that the auto icon 416 is displayed in the rail 428.

Figure 5:
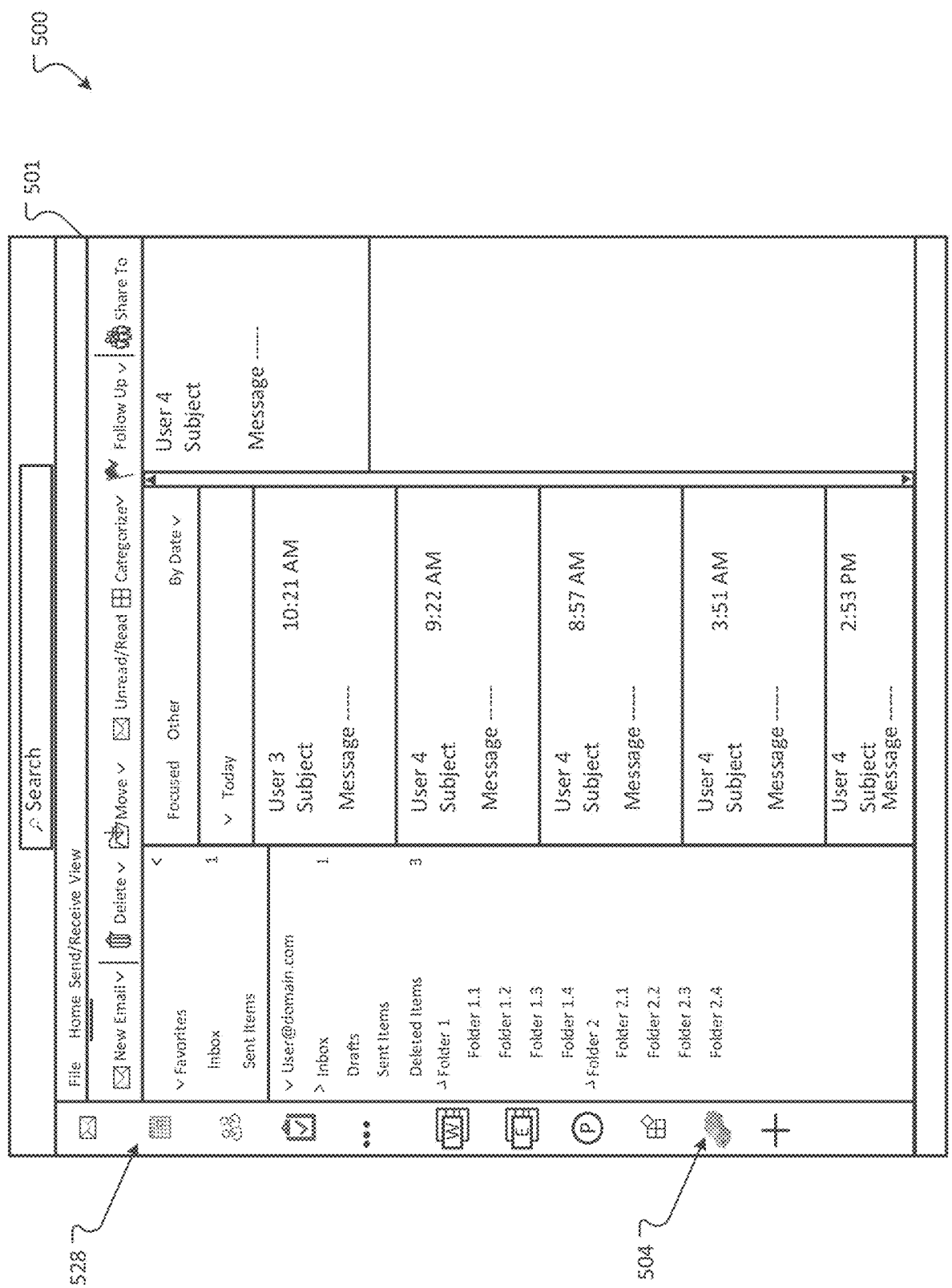
FIG. 5 depicts a rail populated with a user selected application in accordance with examples of the present disclosure.

FIG. 5 depicts a rail 528 populated with a user selected application in accordance with examples of the present disclosure. The personal information manager application 301 depicted in FIG. 5 may be the same as or similar to the personal information manager application 101 depicted in FIG. 1. As depicted in FIG. 5, the auto icon 504 is displayed in the rail 528. A user may then have quick and/or efficient access to the application represented by the icon 504.

Figure 6:
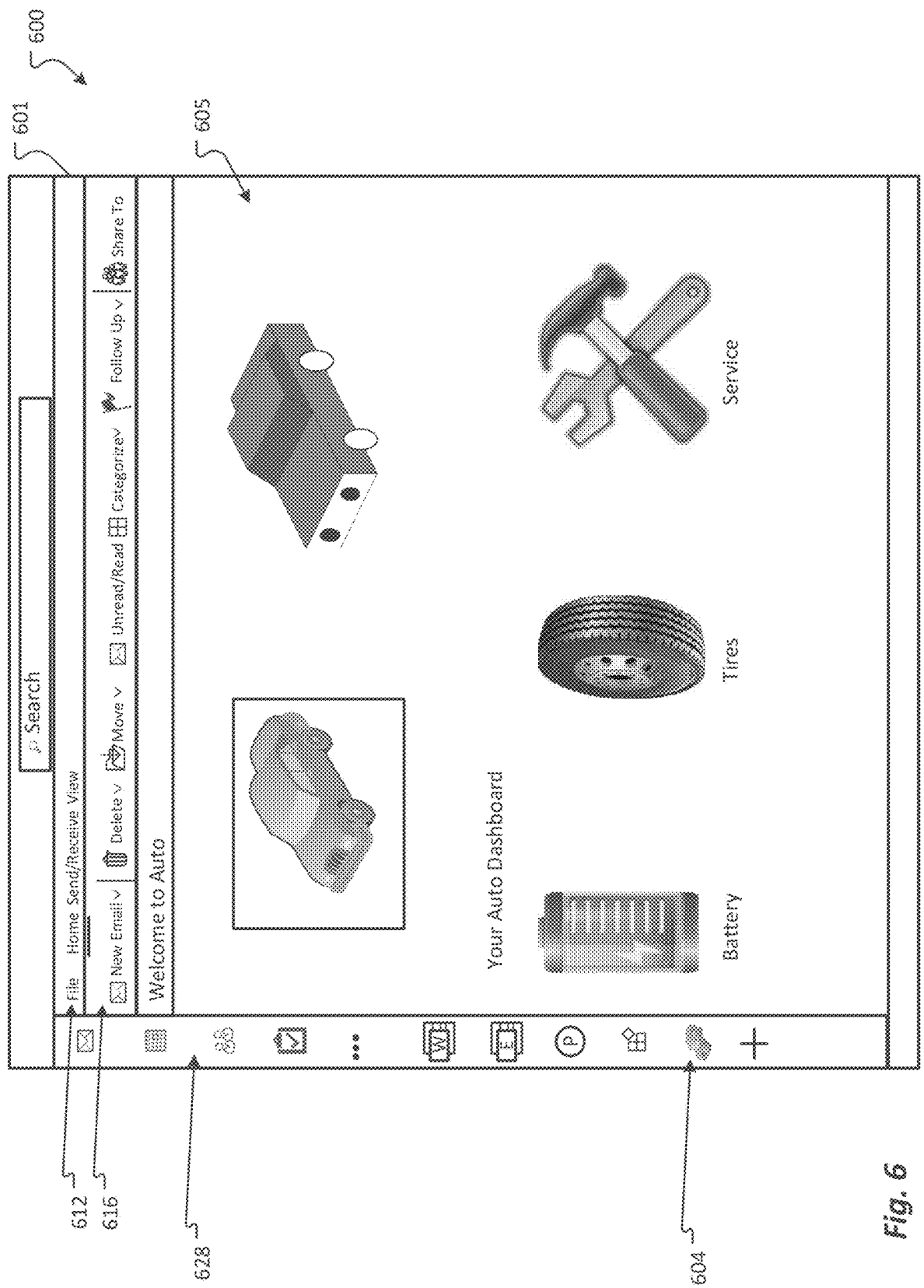
FIG. 6 displays a user interface of the personal information manager application in accordance with examples of the present disclosure.

FIG. 6 displays a user interface 600 of the personal information manager application 601 in accordance with examples of the present disclosure. The personal information manager application 601 depicted in FIG. 6 may be the same as or similar to the personal information manager application 101 depicted in FIG. 1. The user interface 600 may include a user interface 605 of the launched application associated with the icon 604. That is, the user interface 600 of the personal information manager application may display the launched application "auto" for example, within the personal information manager application. Accordingly, a user working within the personal information manager application 601 can conveniently access messaging functions of the personal information manager application 601 while working within the user interface 605 of the launched application. For example, the toolbars 612 and 616 are displayed within the user interface 600 of the personal information manager application 601, such toolbars provide a user access to the messaging functions while also allowing a user to interact with the launched application. As one example, a user may select or click on a new email icon in the toolbar 616; in response, an interface to compose the new email may be displayed; the interface may be a pop out window to compose the email or return back to the personal information manager application user interface while still executing the Auto application. In some examples, as the user interface 605 of the auto application is displayed, a user may interact with one or more controls in the auto application. For example, a user may select the car icon and a dashboard displaying information about a car may be provided to the user via the user interface 605.

Figure 7:
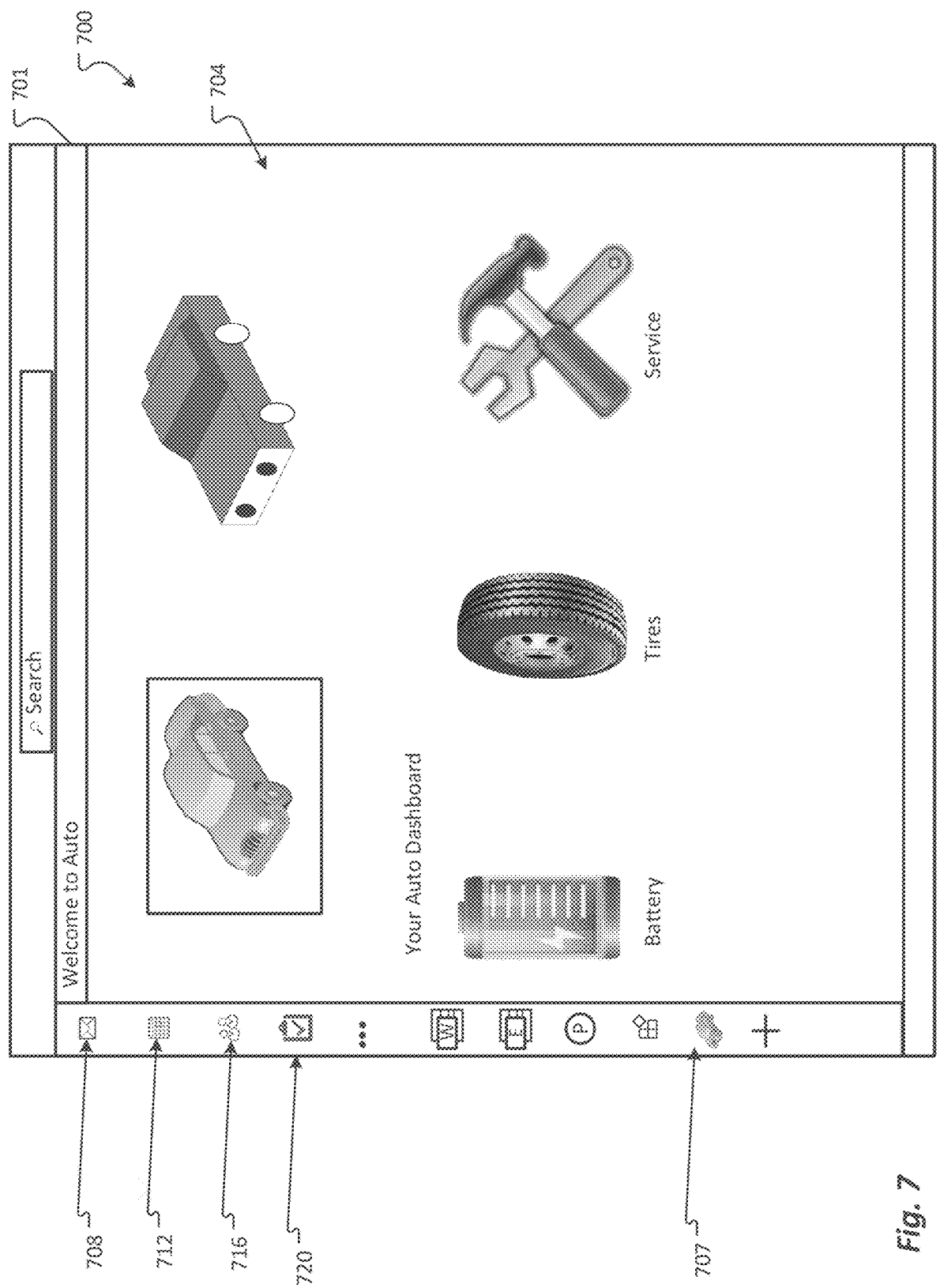
FIG. 7 depicts another user interface of the personal information manager application in accordance with examples of the present disclosure.

FIG. 7 displays a user interface 700 of the personal information manager application 701 in accordance with examples of the present disclosure. The personal information manager application 701 depicted in FIG. 7 may be the same as or similar to the personal information manager application 101 depicted in FIG. 1. The user interface 700 may include a user interface 704 of the launched application associated with the icon 707. That is, the user interface 700 of the personal information manager application 701 may display the launched application "auto" for example, within the personal information manager application 701. Accordingly, a user working within the personal information manager application 701 can conveniently access messaging functions of the personal information manager application 701 while working within the user interface 704 of the launched application. However, unlike the user interface 605, the user interface 704 is displayed such that the toolbars 612 and 616 are no longer visible. Accordingly, a user desiring to access messaging functions associated with the user interface 700 of the personal information manager application 701 may switch to a user interface displaying the messages by selecting, or clicking on, one or more of the messaging function icons, 708, 712, 716, and/or 720 for example. That is, the icon 708, when selected, may cause a different user interface, such as user interface 100, to be displayed. The icon 712, when selected, may cause a calendar user interface of the personal information manager application 701 to be displayed. The icon 716, when selected, may cause a contacts user interface of the personal information manager application 701 to be displayed. The icon 720, when selected, may cause a task management user interface of the personal information manager application 701 to be displayed.

Figure 8A:
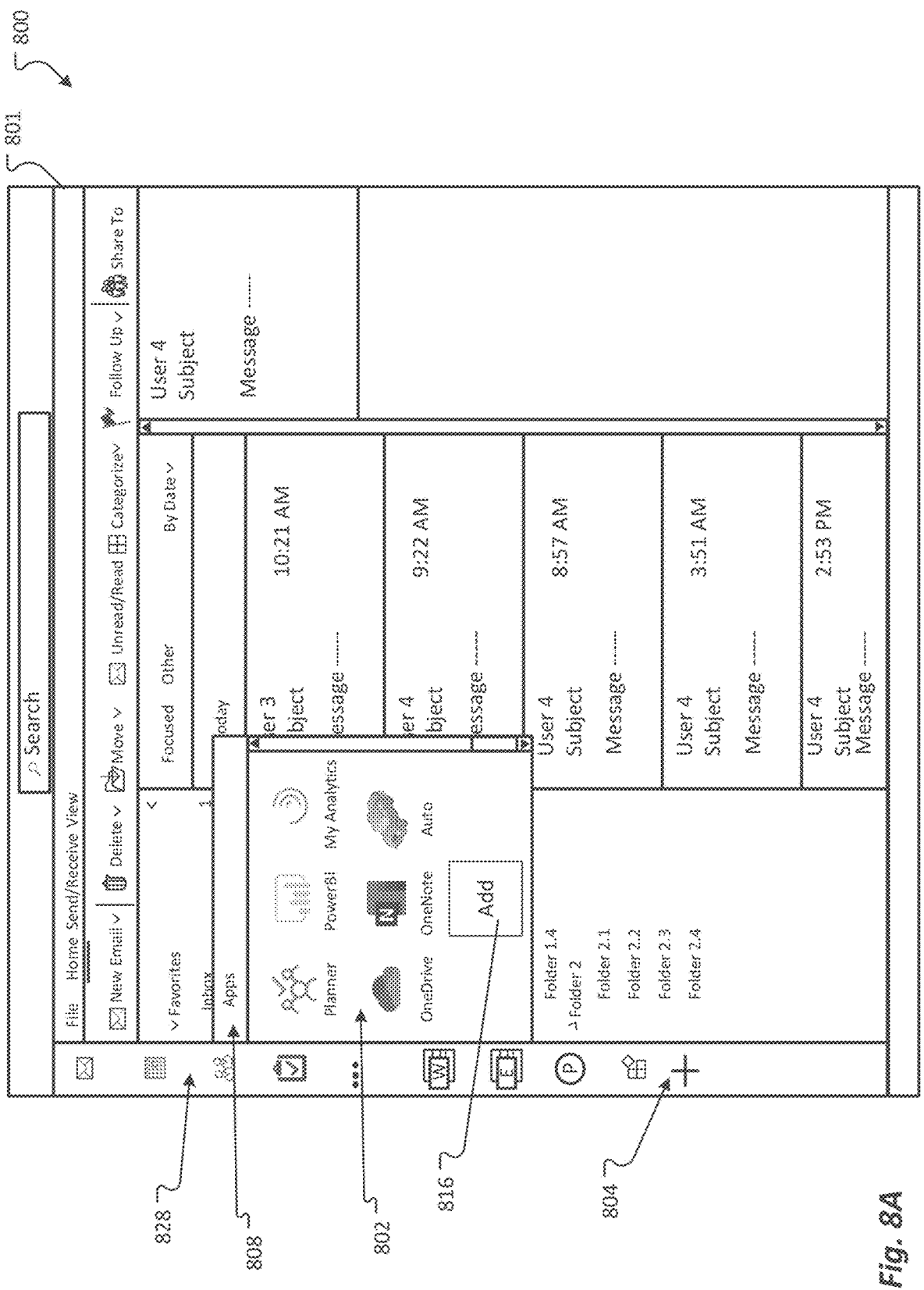
FIGS. 8A-8E depict details of a user interface associated with adding an application to an application gallery in accordance with examples of the present disclosure.
Figure 8B:
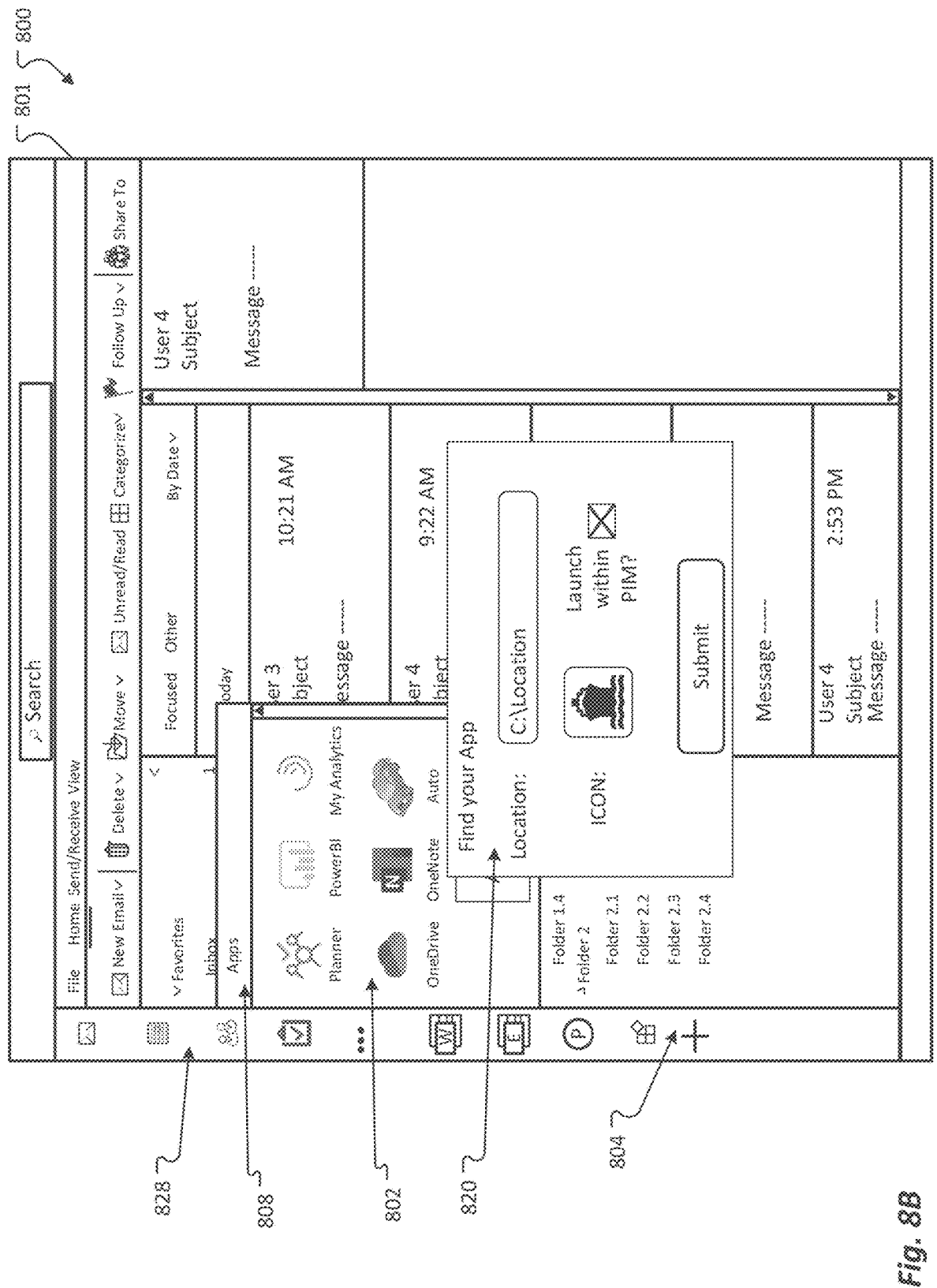

FIG. 8A depicts details of a user interface associated with adding an application to the application gallery 808. The personal information manager application 801 depicted in FIG. 8 may be the same as or similar to the personal information manager application 101 depicted in FIG. 1. More specifically, a user desiring to add an icon representative of an application to the rail 828 may select the "plus" element 804 thereby causing the application gallery 808 to be displayed. While the application gallery 808 may display a plurality of icons 802 associated with a plurality of different applications, a user may desire to add a specific application to the application gallery 808 such that an icon representative of the application to be added may be displayed in the rail 828. The application to be added may be a first party application or may be a third party application. The user may select the "add" element, or button, 816 to add such application. As depicted in FIG. 8B, a window 820 may be displayed in response to a user selecting the "add" element, or button, 816. Accordingly, a user may provide a location of the application the user wishes to add to the application gallery 808, a suggested icon, and whether such application should be launched within the user interface 800 of the personal information manager application. The location of the application to be added to the application gallery 808 may reside on a computing device that is presenting or otherwise causing the presentation of user interface 800. Accordingly, a user may provide a path to an executable or other type of file that when launched, causes a desired application to be rendered and displayed. In some instances, one or more parameters may be entered into the window 820. As one example, an indication as to whether a user desires to have the application launch within the user interface 800 of the personal information manager application may be received. As another example, one or more parameters may be entered that indicate which of the regions of the user interface 800 are to be occupied by the desired application when executed. In some examples, a portion of an application may be executed in one or more of the previously described regions of the user interface 800.

Figure 8C:
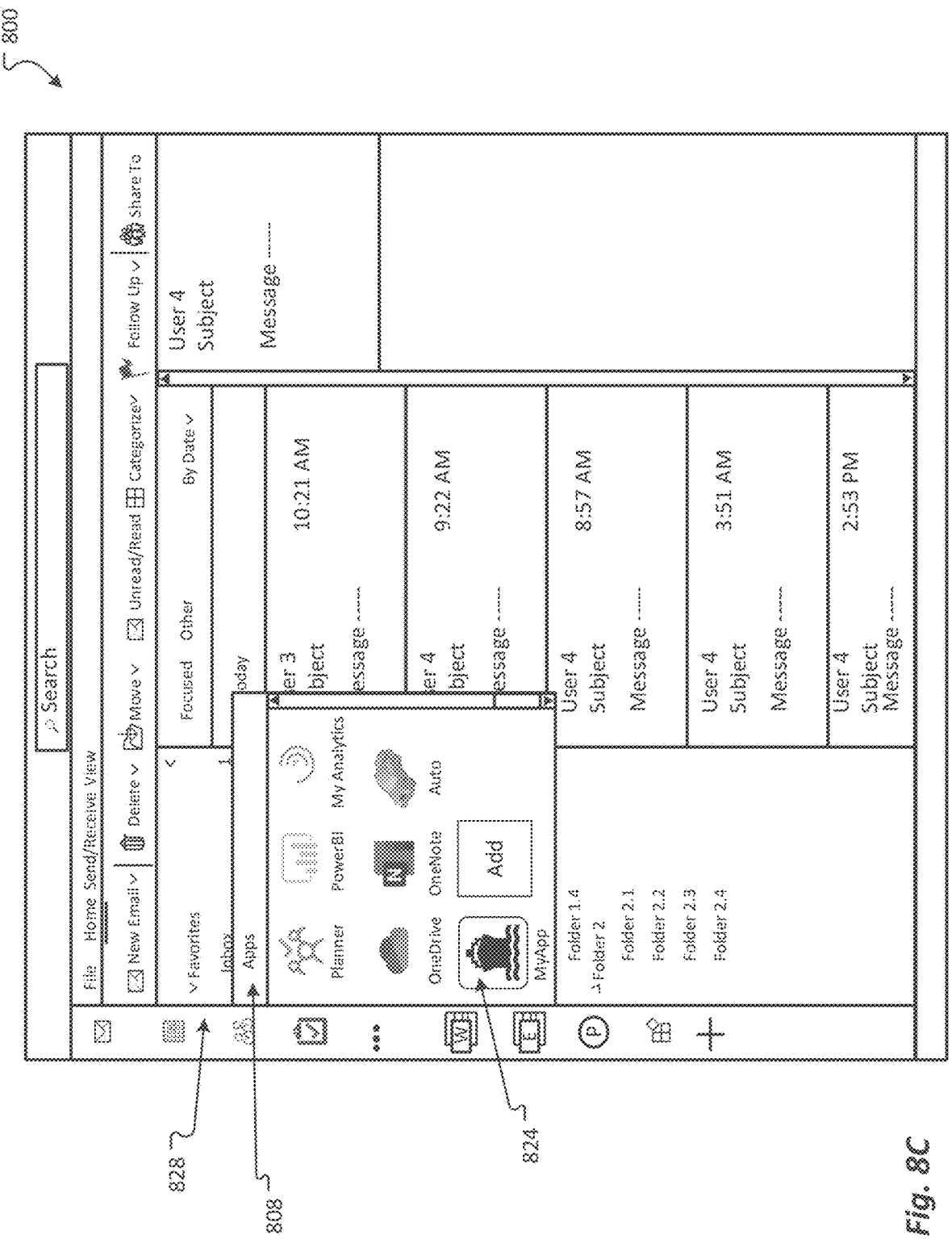
Figure 8D:
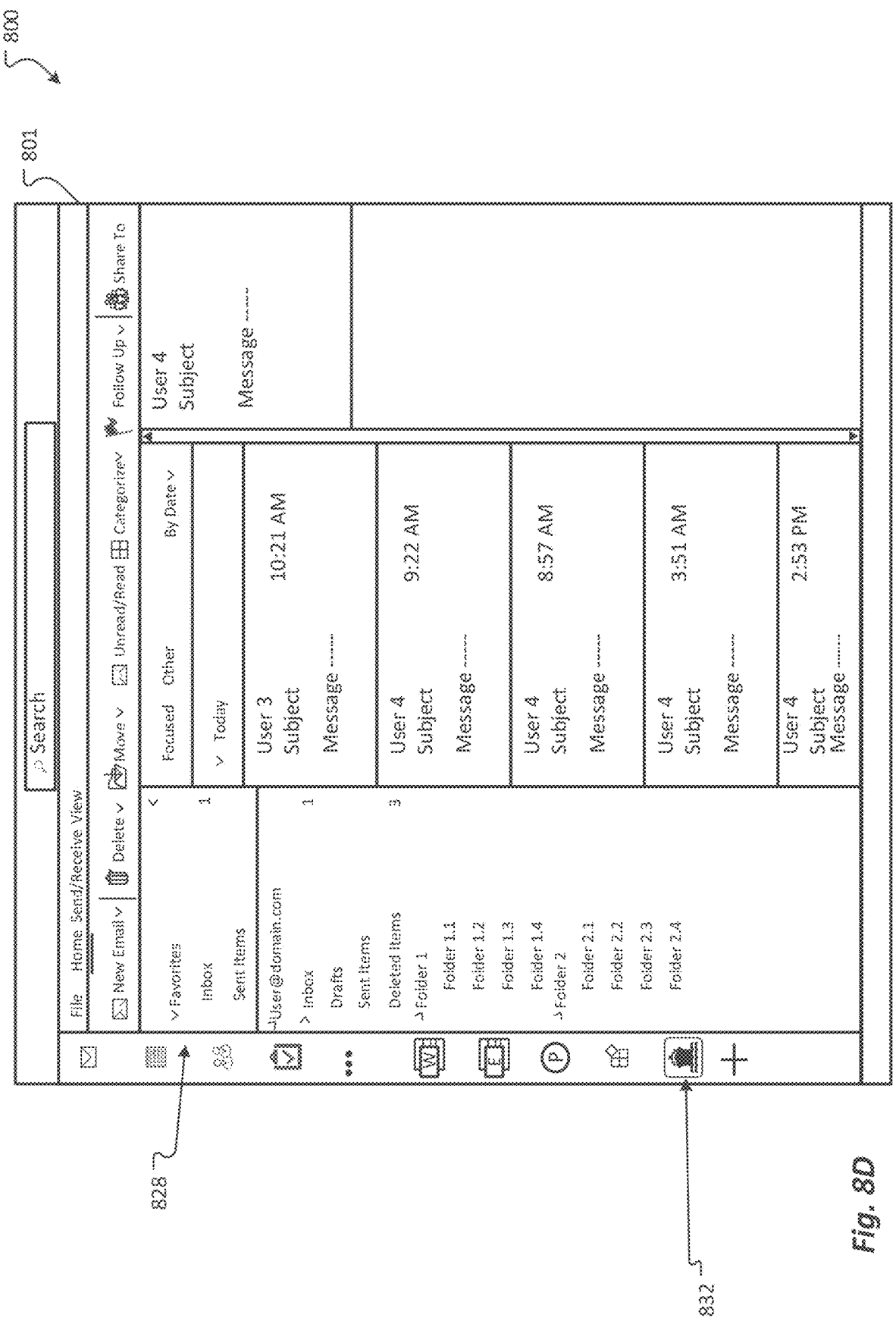

In some instances, a user may desire a new window to display the application, where the new window is separate and apart from the user interface 800. In some instances, a user may desire the application to launch within the user interface 800 of the personal information manager application 801. Accordingly, once the path of the application, an icon, and/or other parameters are entered, a user may select the submit button to close the window 820 such that an icon associated with the application identified in the window 820 may be displayed in the application gallery 808. As depicted in FIG. 8C, the icon 824 associated with the desired application is then added to the application gallery 808. As provided in FIG. 8D, an icon 832 associated with the newly added application may be added to or otherwise pinned to the rail 828.

Figure 8E:
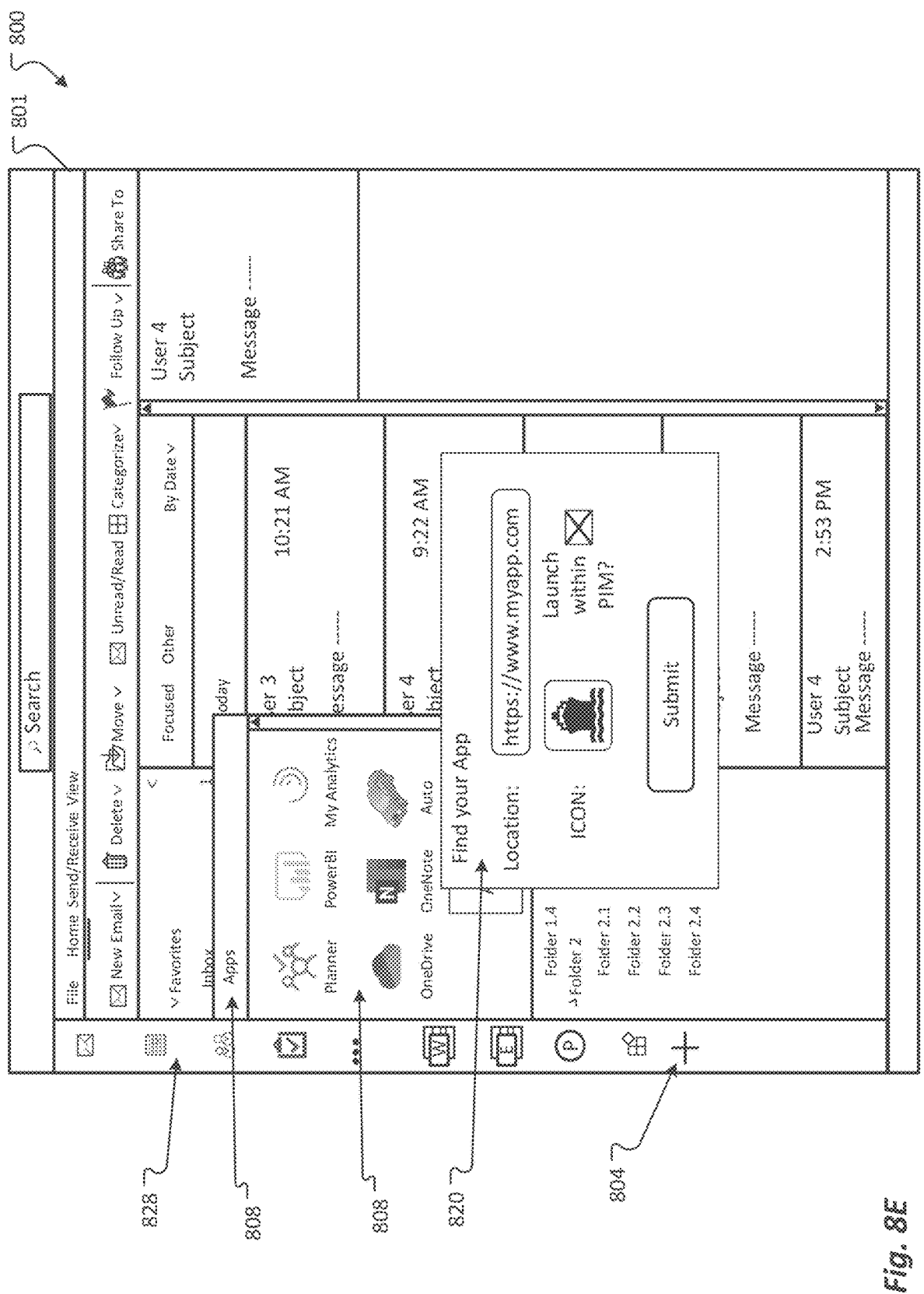

In accordance with some examples of the present disclosure, when a desired application is added to the application gallery 880, the location of the application may be entered as a network address or otherwise an address available via one or more network locations. For example, and as depicted in FIG. 8E, the location of the desired app is located at a website. In some examples, an instance of a browser application may be launched when a network address is provided, accordingly, a user may have the option of using a default browser instance and/or provide a selection of a browser to use. In accordance with some examples of the present disclosure, when the application is launched, a browser may be launched within the user interface 800 such that the added application appears to be running locally but is actually running via a web page or another networked connection. In some examples, the application running within the user interface 800 is a web version of an application that may be natively installed or executed on a processing device. Accordingly, the personal information manager application 801 may be configured to execute both remote applications, such as a web application, and local application such as a natively installed application at the processing device.

Figure 9:
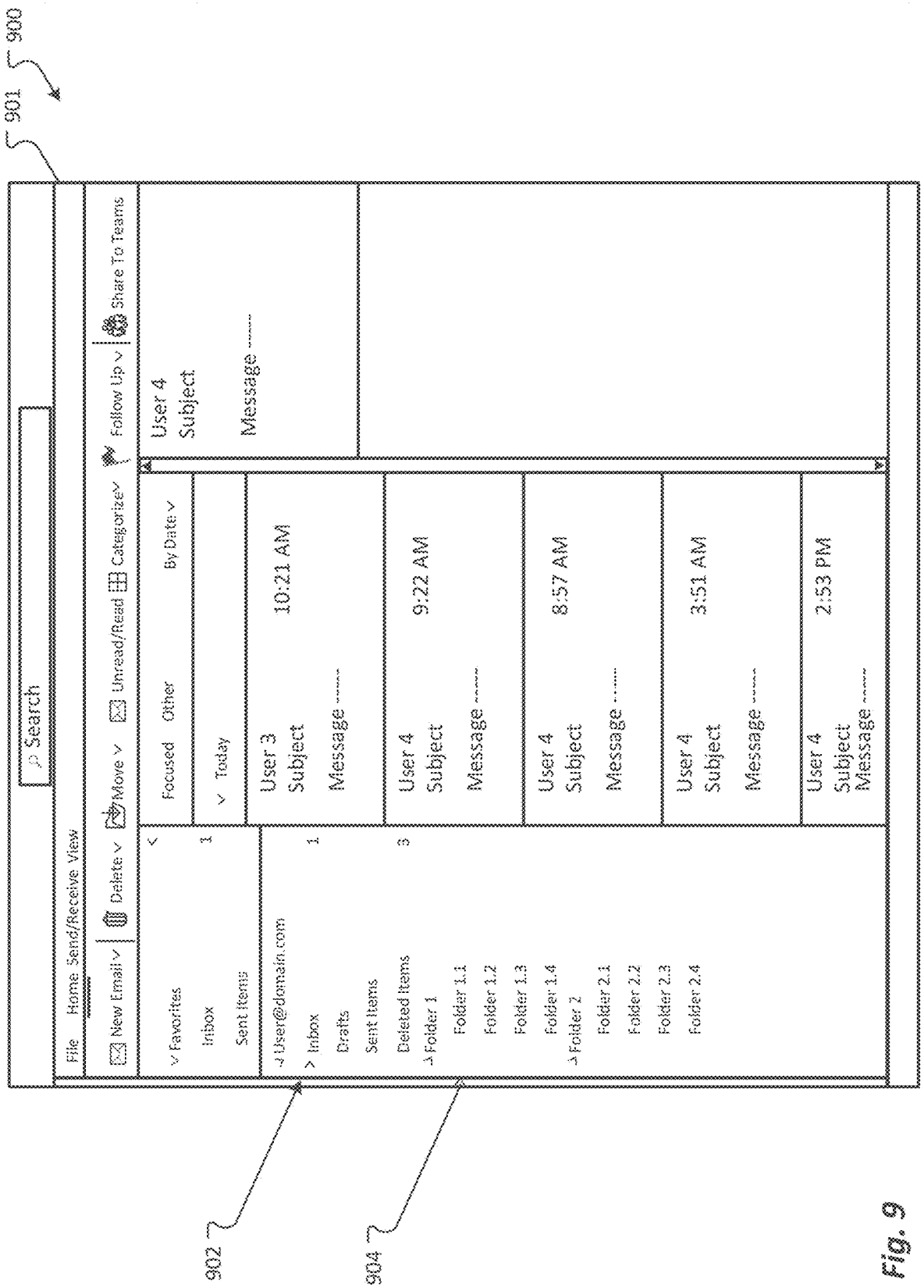
FIG. 9 depicts additional details of the personal information manager application in accordance with examples of the present disclosure.

FIG. 9 depicts details of the personal information manager application 901 in accordance with examples of the present disclosure. The personal information manager application 9901 depicted in FIG. 9 may be the same as or similar to the personal information manager application 101 depicted in FIG. 1. The rail 928 may be responsive to minimization and maximization commands. For example, FIG. 9 depicts the rail 902 in a minimized state; to maximize the rail 902 or otherwise make the rail 902 appear, a user may select the element 904. Such selection of the element 904 may correspond to a click of the element 904 or a hover above the element 904.

Figure 10:
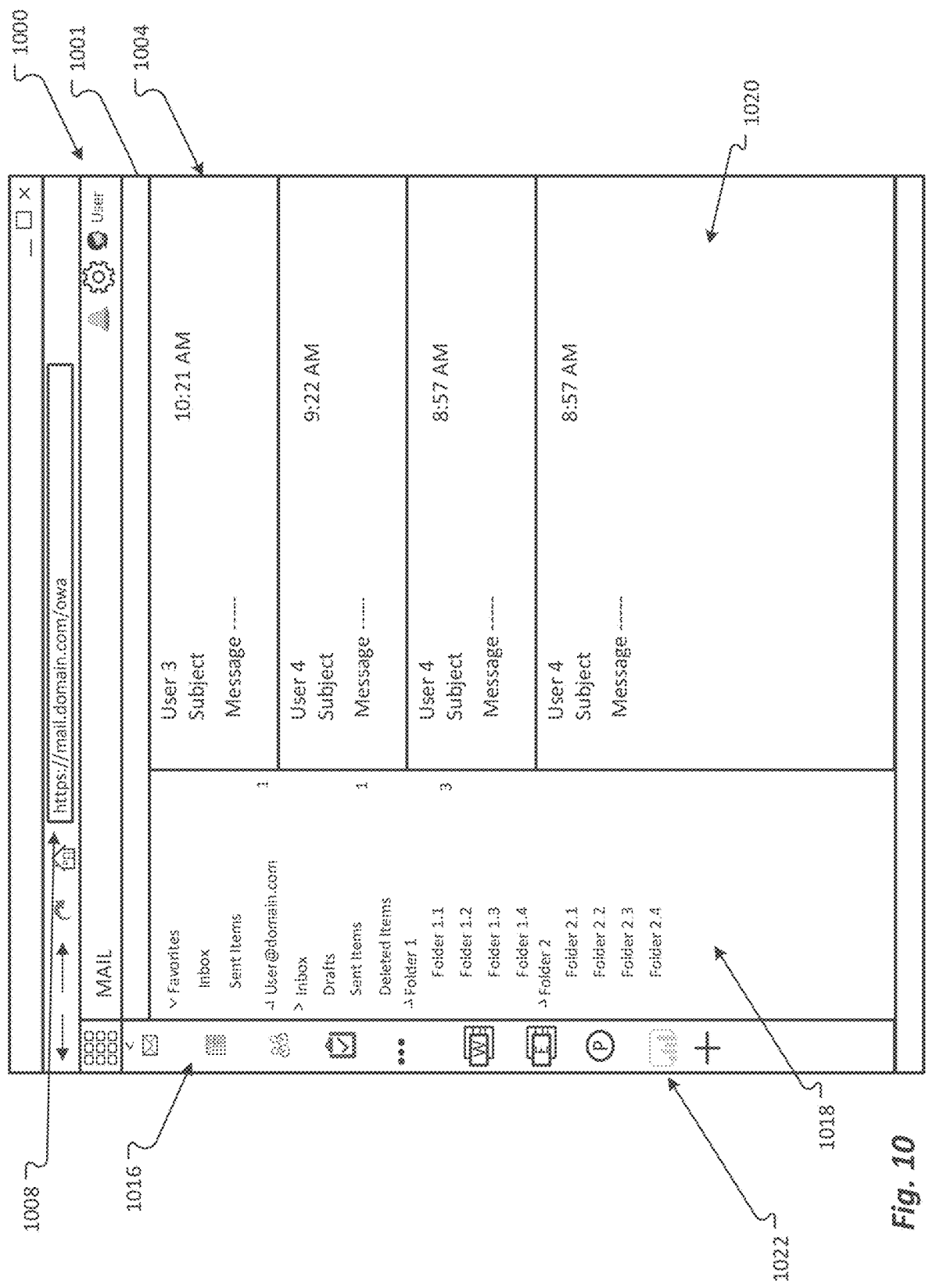
FIG. 10 depicts an example of a web accessible personal information manager application having a user interface in accordance with examples of the present disclosure.

FIG. 10 depicts an example of a web accessible personal information manager application 1001 having a user interface 1000 in accordance with examples of the present disclosure. The web accessible personal information manager application may be an OUTLOOK™ Web Access application provided by MICROSOFT™. In another example, the web accessible application may be Gmail's email application. The personal information manager application 1001 and rail 1016 behave and/or operate in a manner similar to the personal information manager application and rail 128, 428, 528, 628, 828, and 928 described with respect to FIG. 1-9. Initially, a user may navigate to a web address location using the location bar 1008. The user may be required to login or authenticate before the user interface 1000 is displayed. The user interface 1000 may include a plurality of regions 1018, 1020, and 1022 corresponding to regions 112 and 116 of FIG. 1. Accordingly, if a user were to select a message displayed in the region 1020, a popup window may be displayed that presents the text of the selected message. In accordance with examples of the present disclosure, a user may desire to launch an application within the user interface 1000. Accordingly, the user may select an icon located on the rail 1016 to launch the application. For example, the user may select the MICROSOFT™ POWER BI™ icon 1022, thereby causing the MICROSOFT™ POWER BI™ application to be displayed in the user interface 1100 as depicted in FIG. 11.

Figure 11:
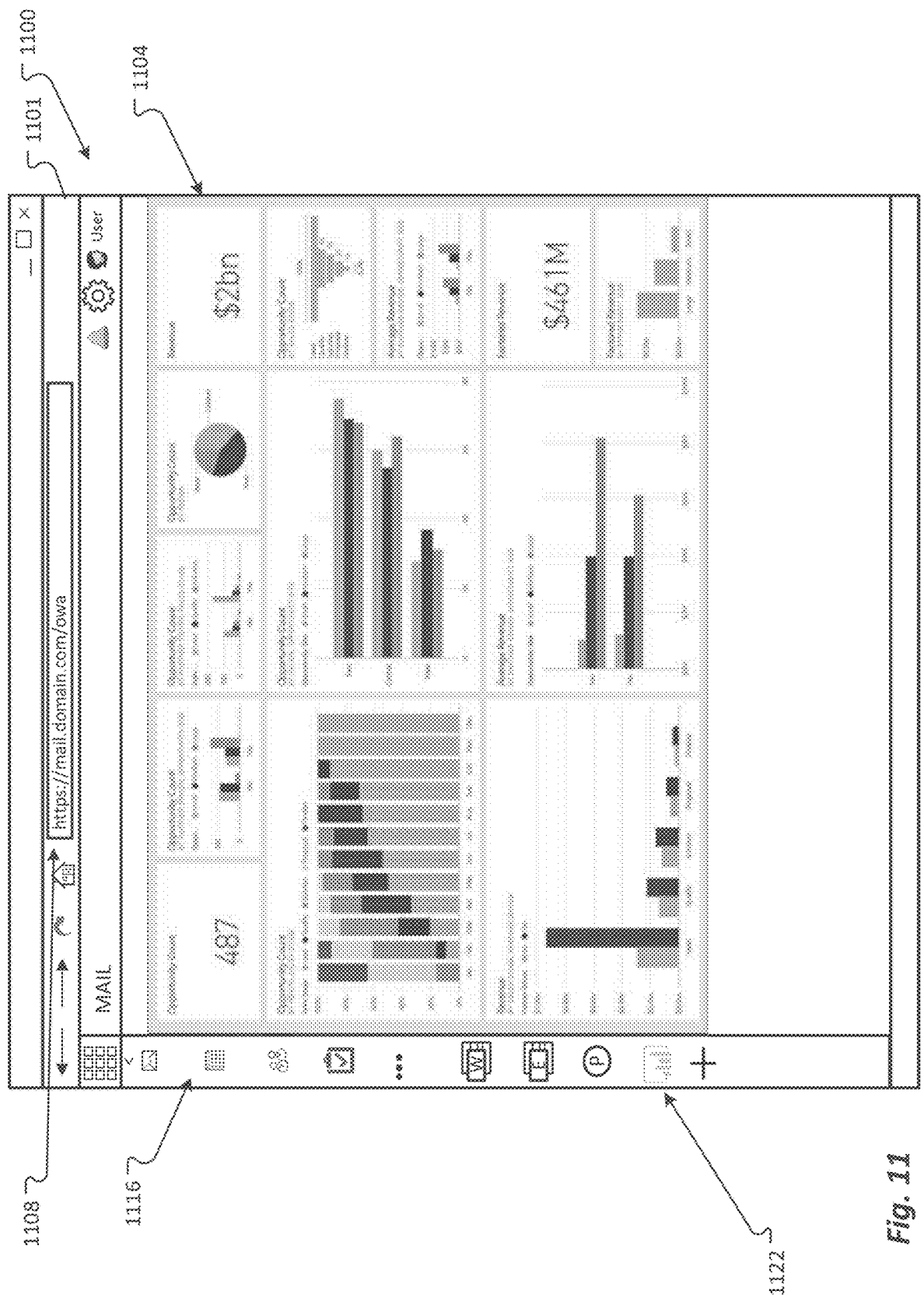
FIG. 11 depicts another user interface of a personal information manager application in accordance with examples of the present disclosure.

As an example, the personal information manager application 1101 depicted in FIG. 11 may be the same as or similar to the personal information manager application 1001 depicted in FIG. 10. In some examples, the launched application may occupy one or mote regions of the user interface 1100. For example, the MICROSOFT™ POWER BI™ dashboard displayed in FIG. 11 may occupy regions corresponding to 1018 and 1020 of FIG. 10. In some examples, clicking on an item in the rail 1116 may cause the web accessible personal information manager application to switch from displaying the application launched according to the selected icon, to displaying the user interface 1100 of the personal information manager application. To return to the application launched according to the selected icon, a user may be required to click the icon 1122 corresponding to the application that was previously launched. In some examples, keyboard shortcuts or other ways of returning to the application launched according to the selected icon may be utilized. In some examples, the application launched according to the selected icon may occupy zero or more regions 1018 and 1022.

In accordance with some examples of the present disclosure, an application associated with a selected icon may launch in a window separate and apart from the user interface 1100. For example, upon selecting the MICROSOFT™ POWER BI™ icon 1122, the application, MICROSOFT™ POWER BI™ may be launched in a separate window or as a separate web accessible application that is not contained within the user interface 1100 of the personal information manager application 1101. Accordingly, as a user is interacting with the user interface 1100 of the personal information manager application 1101, a user may wish to switch to or otherwise utilize another application, such as the MICROSOFT™ POWER BI™ by selecting the icon 1122 for example. Upon selection of the icon 1122, a user interface for the MICROSOFT™ POWER BI™ program may display, in a window that is different than a window displaying the user interface 1100 and the application associated with the icon 1122. Accordingly, a user may interact with the application displayed in the user interface as they normally would and may close the application displayed in the user interface using the elements.

Figure 12:
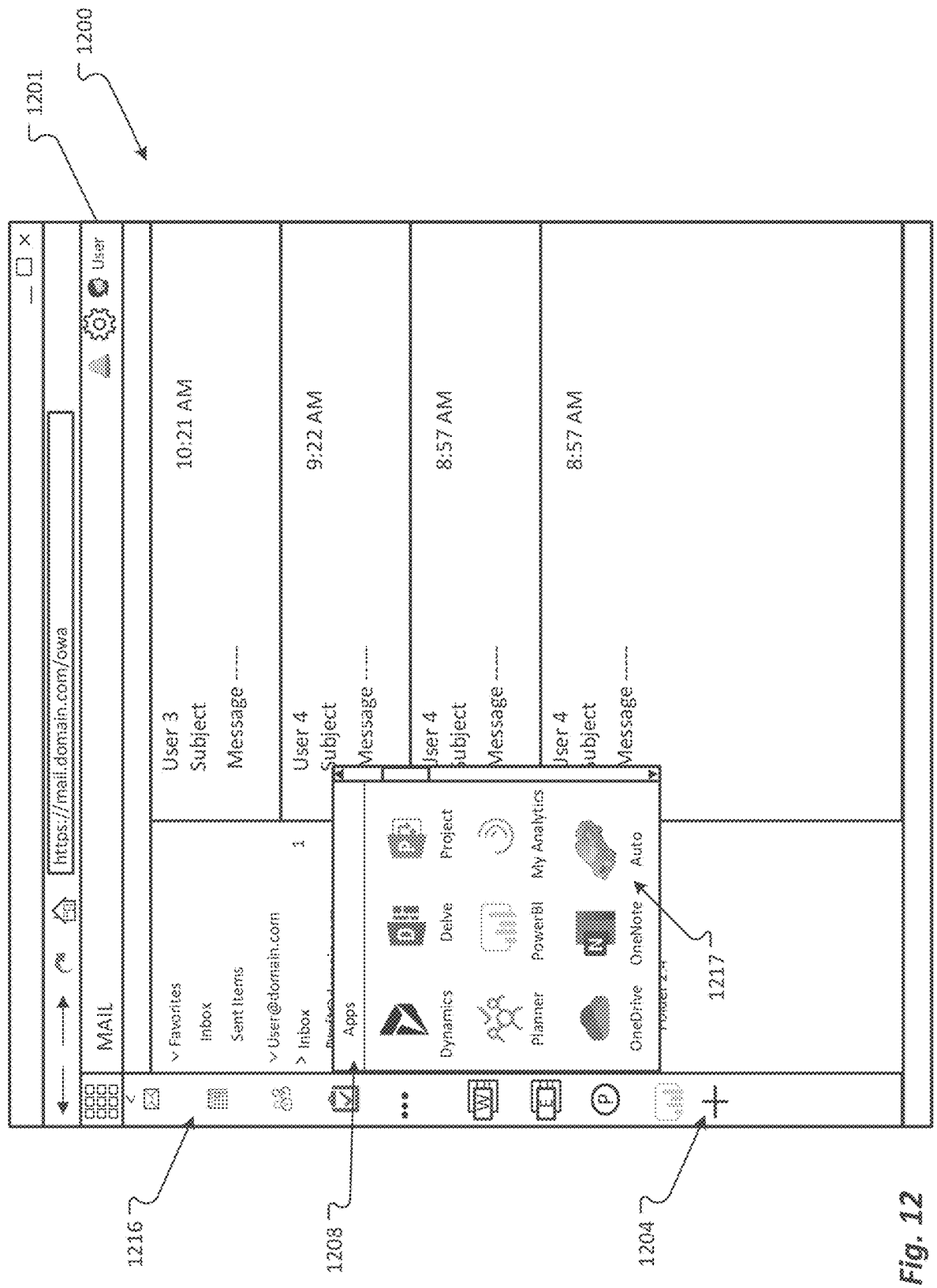
FIG. 12 depicts an example user interface for adding an application to a rail in accordance with examples of the present disclosure.
Figure 13:
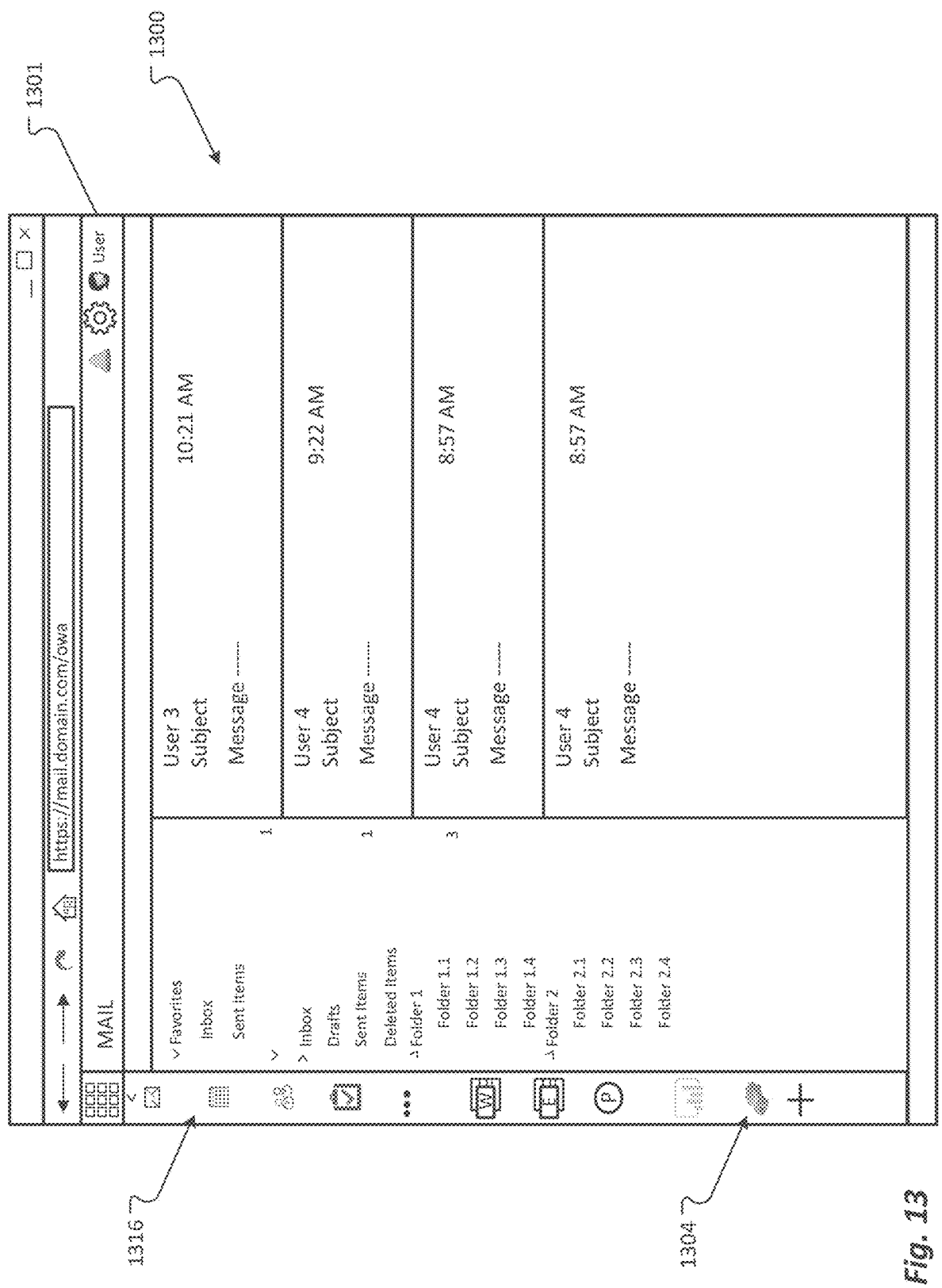
FIG. 13 depicts a selected application being displayed in a rail in a user interface of the personal information manager application in accordance with examples of the present disclosure.

In accordance with some examples of the present disclosure, when an icon for an application that a user wishes to launch using the rail 1216 of the personal information manager application 1201 is not displayed in the rail 1216, a user may select the "plus" or "add" selection 1204 to cause an application gallery 1208 to be displayed to the user as displayed in FIG. 12. The application gallery 1208 may display one or more icons 1212 representing applications that can be added to or otherwise pinned to the rail 1216. For example, a user desiring to have an auto application displayed in the rail 1216, may click or otherwise select the "plus" or "add" icon 1204 located in the rail 1216. The "plus" or "add" icon 1204 may cause the application gallery 1208 to launch thereby displaying a plurality of icons 1212. A user may then may make a selection, such as the auto icon 1217 such that the auto icon 1217 is displayed in the rail 1216. As depicted in FIG. 13, the selected application is displayed in the rail 1316 in the user interface 1300 of the personal information manager application 1301 as icon 1304. Accordingly, a user may then have quick and/or efficient access to the application represented by the icon 1304.

Figure 14A:
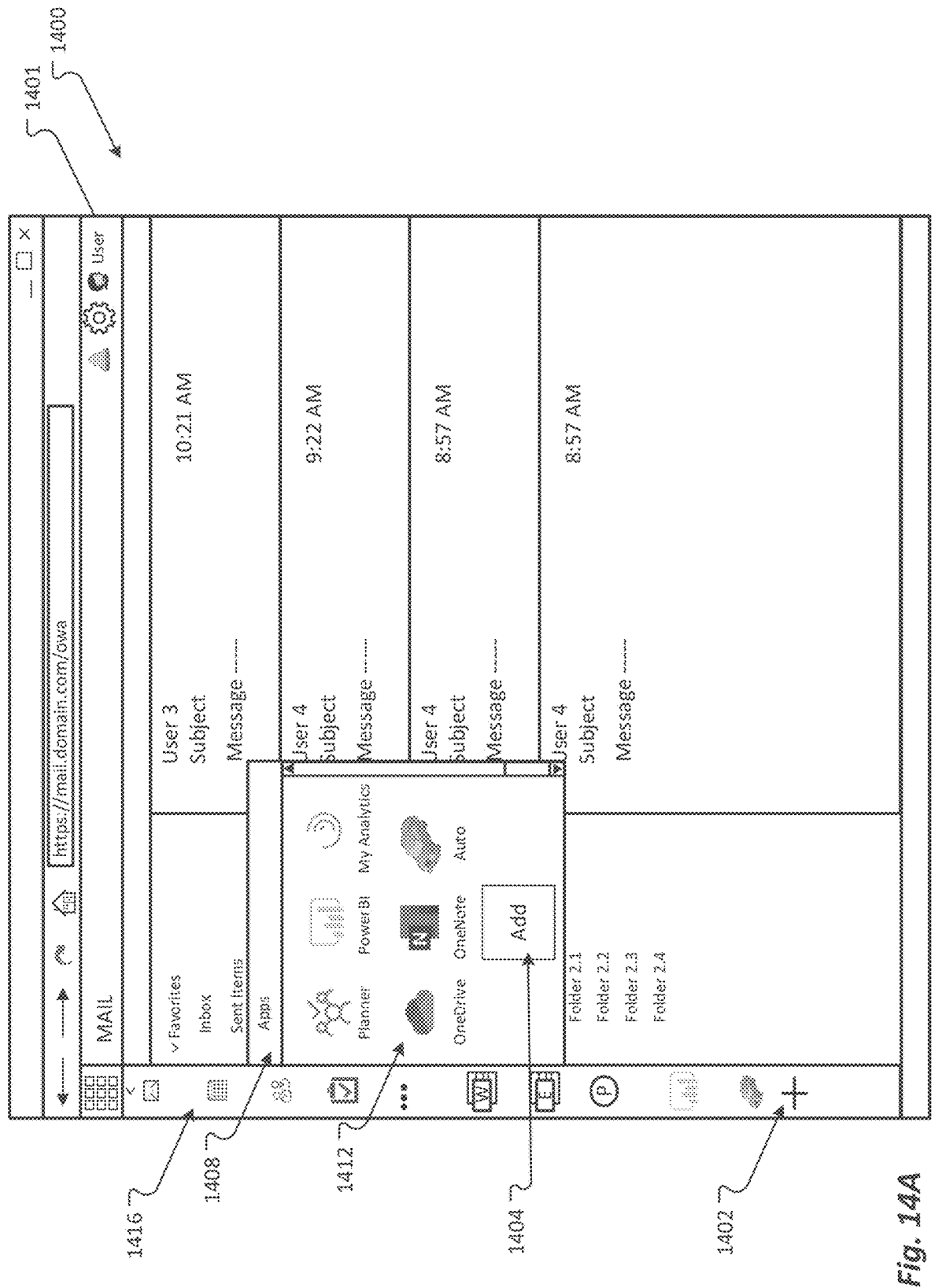
FIGS. 14A-14D depicts details of a user interface associated with adding an application to an application gallery of a personal information manager application in accordance with examples of the present disclosure.
Figure 14B:
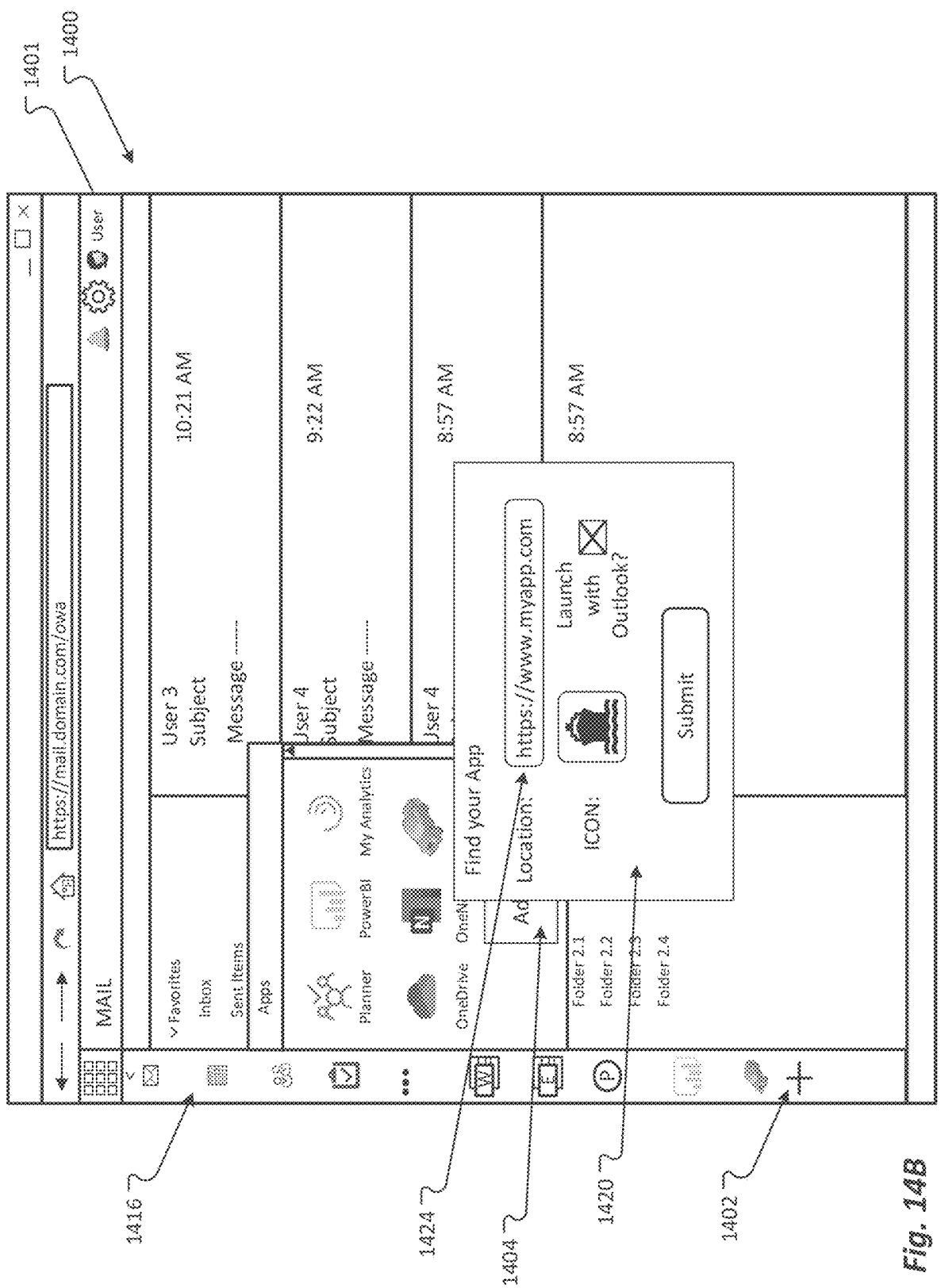

FIG. 14A depicts details of a user interface associated with adding an application to the application gallery 1408 of a personal information manager application 1401 in accordance with examples of the present disclosure. More specifically, a user desiring to add an icon representative of an application to the rail 1416 may select the "plus" or "add" icon 1402 thereby causing the application gallery 1408 to be displayed. While the application gallery 1408 may display a plurality of icons 1412 associated with a plurality of different applications, a user may desire to add a specific application to the application gallery 1408 such that an icon representative of the application to be added may be displayed in the rail 1416. The application to be added may be a first party application or may be a third party application. The user may select the "add" element, or button, 1402 to add such application. As depicted in FIG. 14B, a window 1420 may be displayed in response to a user selecting the "add" element, or button, 1404. Accordingly, a user may provide a location of the application the user wishes to add to the application gallery 1408, a suggested icon, and whether such application should be launched within the user interface 1400 of the personal information manager application. In accordance with some examples of the present disclosure, when a desired application is added to the application gallery 1408, the location of the application may be entered as a network address or otherwise an address available via one or more network locations. For example, and as depicted in FIG. 14B, the location of the desired app is located at a website. Accordingly, and in accordance with some examples of the present disclosure, when the application is launched, a browser may be launched within the user interface 1400, which may be a web browser itself, such that the added application appears to be running locally but is actually running via a web page or another networked connection. In some examples, the application running within the user interface 1400 is a web version of an application that may be natively installed or executed on a processing device. Accordingly, the personal information manager application may be configured to execute both remote applications, such as a web application, and local application such as a natively installed application at the processing device.

In some instances, one or more parameters may be entered into the window 1420. As one example, an indication as to whether a user desires to have the application launch within the user interface 1400 of the personal information manager application may be received. As another example, one or more parameters may be entered that indicate which of the regions of the user interface 1400 are to be occupied by the desired application when executed. In some examples, a portion of an application may be executed in one or more of the previously described regions of the user interface 1400.

Figure 14C:
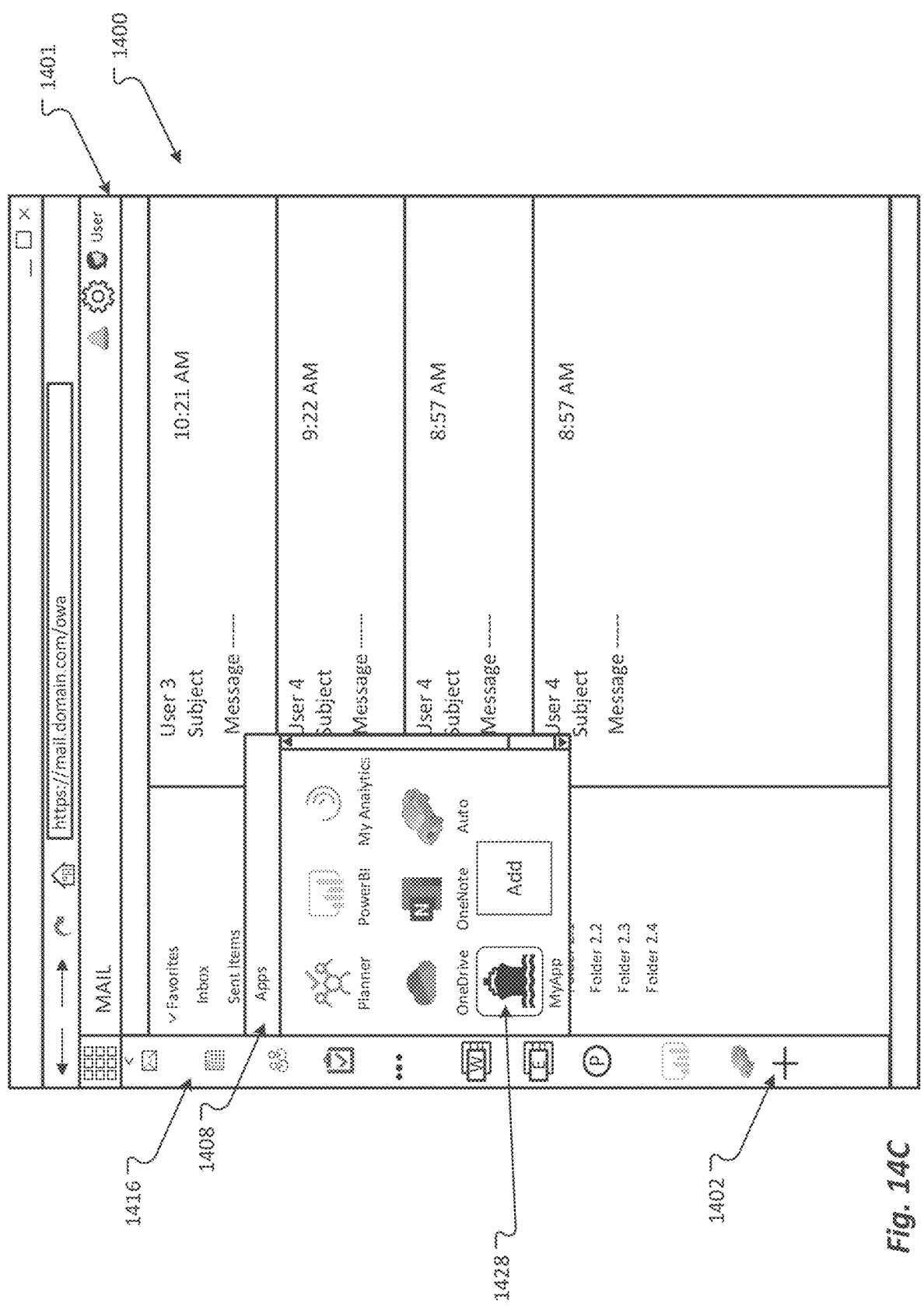
Figure 14D:
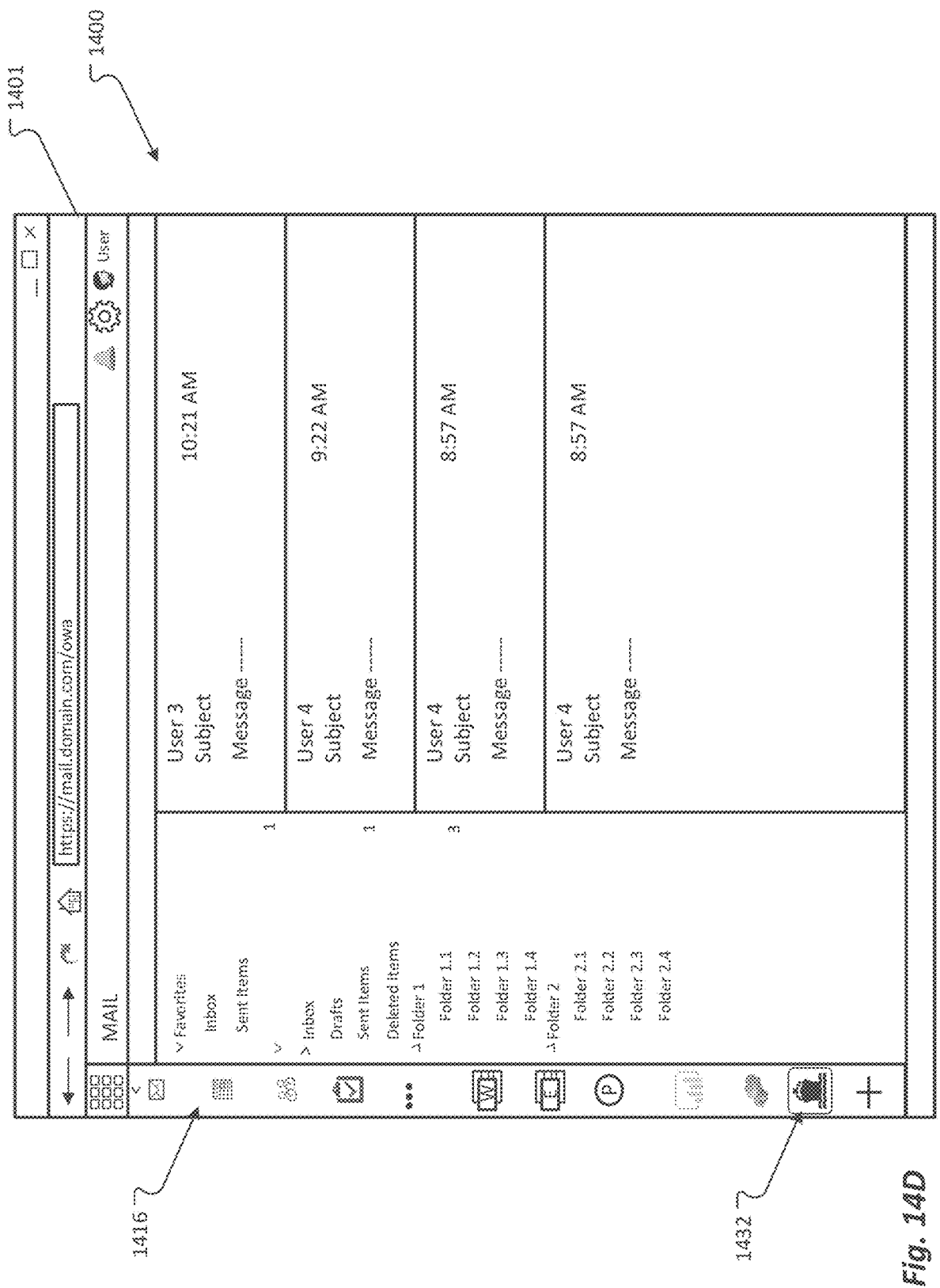

In some instances, a user may desire a new window to display the application, where the new window is separate and apart from the user interface 1400 of the personal information manager application 1401. In some instances, a user may desire the application to launch within the user interface 1400 of the personal information manager application 1401. Accordingly, once the path of the application, an icon, and/or other parameters are entered, a user may select the submit button to close the window 1420 such that an icon associated with the application identified in the window 1420 may be displayed in the application gallery 1408. As depicted in FIG. 14C, the icon 1424 associated with the desired application is then added to the application gallery 1408. As provided in FIG. 8D, an icon 1432 associated with the newly added application may be added to or otherwise pinned to the rail 1416 upon selection by a user.

Figure 15A:
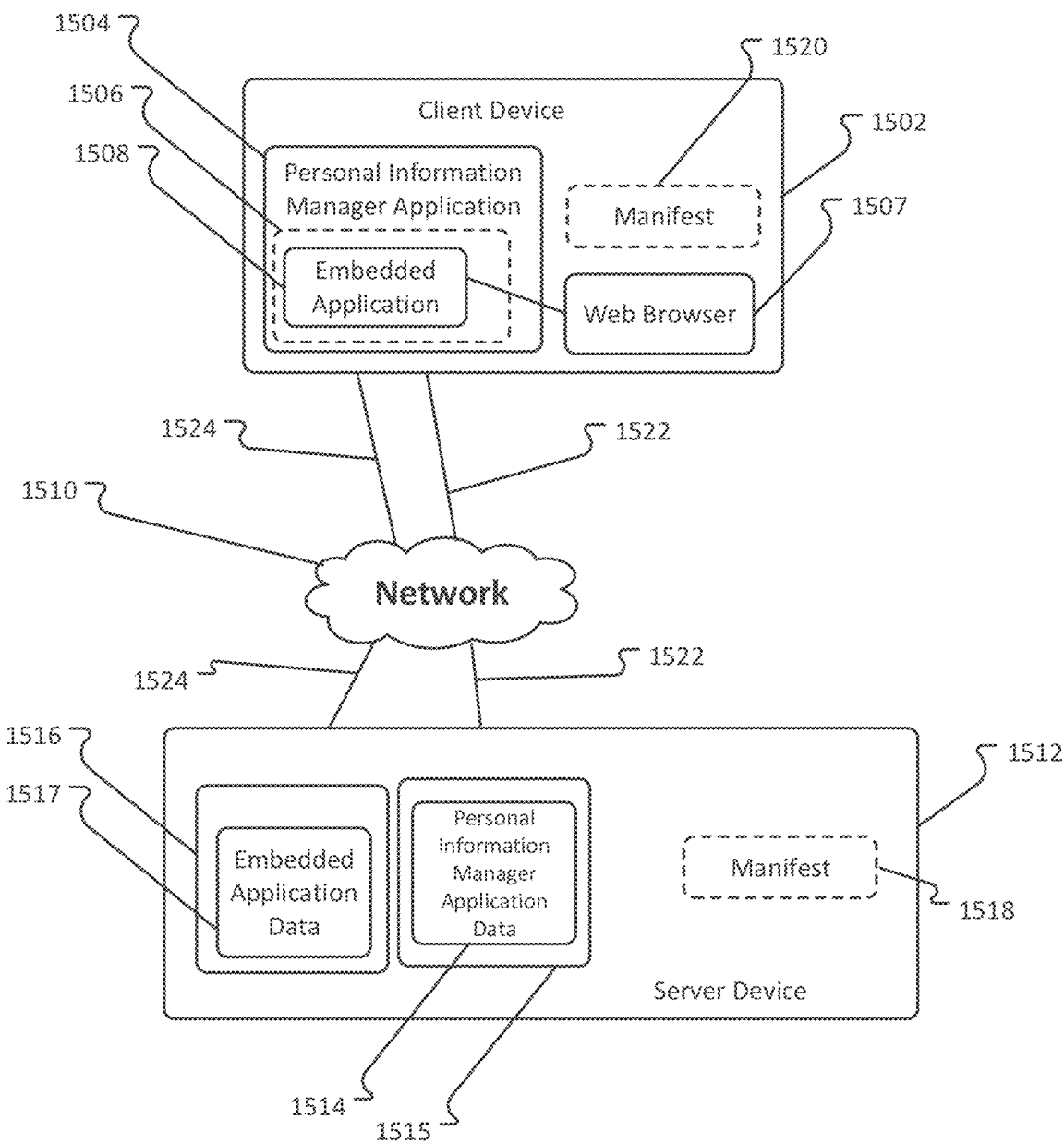
FIG. 15A depicts details of a personal information manager application residing on and executing at a processing device in accordance with examples of the present disclosure.

FIG. 15A depicts details of a personal information manager application 1504 residing on and executing at a processing device 1502 in accordance with examples of the present disclosure. The processing device 1502 may be any type of processing device configured for user interaction. Example processing devices include, but are not limited to laptops, tablets, smartphones, and the like. The personal information manager application 1504 may be the same as or similar to the previously described personal information manager applications. As an example, the personal information manager application 1504 may be the same as or similar to the personal information manager application 101 previously described. In accordance with examples of the present disclosure, the personal information manager application 1504 may cause to be executed an embedded application 1508, where the embedded application may be the same as or similar to the previously described first or third party applications selected by and/or launched by a user. Non-limiting examples of the embedded application 1508 may correspond to MICROSOFT™ POWER BI™, MICROSOFT™ Forms, Auto, etc. as previously described. In some examples, the embedded application 1508 may be executed as a web application or an application running in a web browser, such as web browser 1506. Accordingly, the personal information manager application 1504 may cause a web browser 1506 to execute the embedded application 1508 in a portion of a user interface displayed by the personal information manager application 1504 executed in the web browser 1506, where the web browser 1506 executes commands and/or otherwise displays data associated with the embedded application 1508. In some examples, the embedded application 1508 may display a user interface within the personal information manager application 1504 while interacting with a web browser 1507 residing at the processing device 1502. Thus, the embedded application 1508 may communicate with the web browser 1507 while providing an interactive user interface within the user interface of the personal information manager application 1504. Accordingly, the web browser 1506 may be optional or otherwise implemented as the web browser 1507. The processing device 1502 may also include a manifest 1520; the manifest 1520 may store or otherwise identify applications in an application gallery, such as the application gallery 408 as previously described. In addition, the manifest 1520 may indicate which applications have been added to or otherwise pinned to the rail of the personal information manager application 1504. As one example, the manifest may indicating that two default applications, such as but not limited to MICROSOFT™ WORD™ and MICROSOFT™ POWERPOINT™ are to appear in the rail 128 in addition to a user selected application, such as Auto.

In accordance with examples of the present disclosure, the personal information manager application, embedded application 1508, and/or the web browser 1507 may communicate with a server device 1512 to access application specific data. For example, the personal information manager application 1504 may communicate via a first communication channel 1524 to the server device 1512 to send and receive messages, such messages may be stored as personal information manager application data 1514 located at the server device 1512. In some examples, the embedded application 1508 may not require communication with the server device 1512 for data. In other examples, the embedded application 1508 may share the communication channel with the personal information manager application 1504 to interact with embedded application data 1517 residing at the server device 1512. In some examples, a new communication channel 1522 may be utilized by the embedded application 1508 to interact with embedded application data 1517 residing at the server device 1512. In accordance with some examples of the present disclosure, the embedded application data 1517 may be accessed by an application executing at the server device 1512 such that the application 1516 is responsive to one or more commands from the embedded application 1508. For example, the application 1516 may correspond to a service, such as a MICROSOFT™ POWER BI™ service running on the server device 1512. The MICROSOFT™ POWER BI™ service may interact with the embedded application data 1157 to provide data, user interfaces, views, etc to the embedded application 1508. Similarly, the persona) information manager application 1504 may interact with a service 1515 that makes the personal information manager application data 1514 available to the personal information manager application 1504. In accordance with some examples of the present disclosure, the server device 1512 may also include a manifest 1518; the manifest 1518 may store or otherwise identify applications in an application gallery, such as the application gallery 408 as previously described. In addition, the manifest 1518 may indicate which applications have been added to or otherwise pinned to the rail of the personal information manager application 1504. As one example, the manifest may indicating that two default applications, such as but not limited to MICROSOFT™ WORD™ and MICROSOFT™ POWERPOINT™ are to appear in the rail 128 in addition to a user selected application, such as Auto Such manifest 1518 may be retrieved by the personal information manager application 1504 when the personal information manager application 1504 communicates with the server device 1512.

Figure 15B:
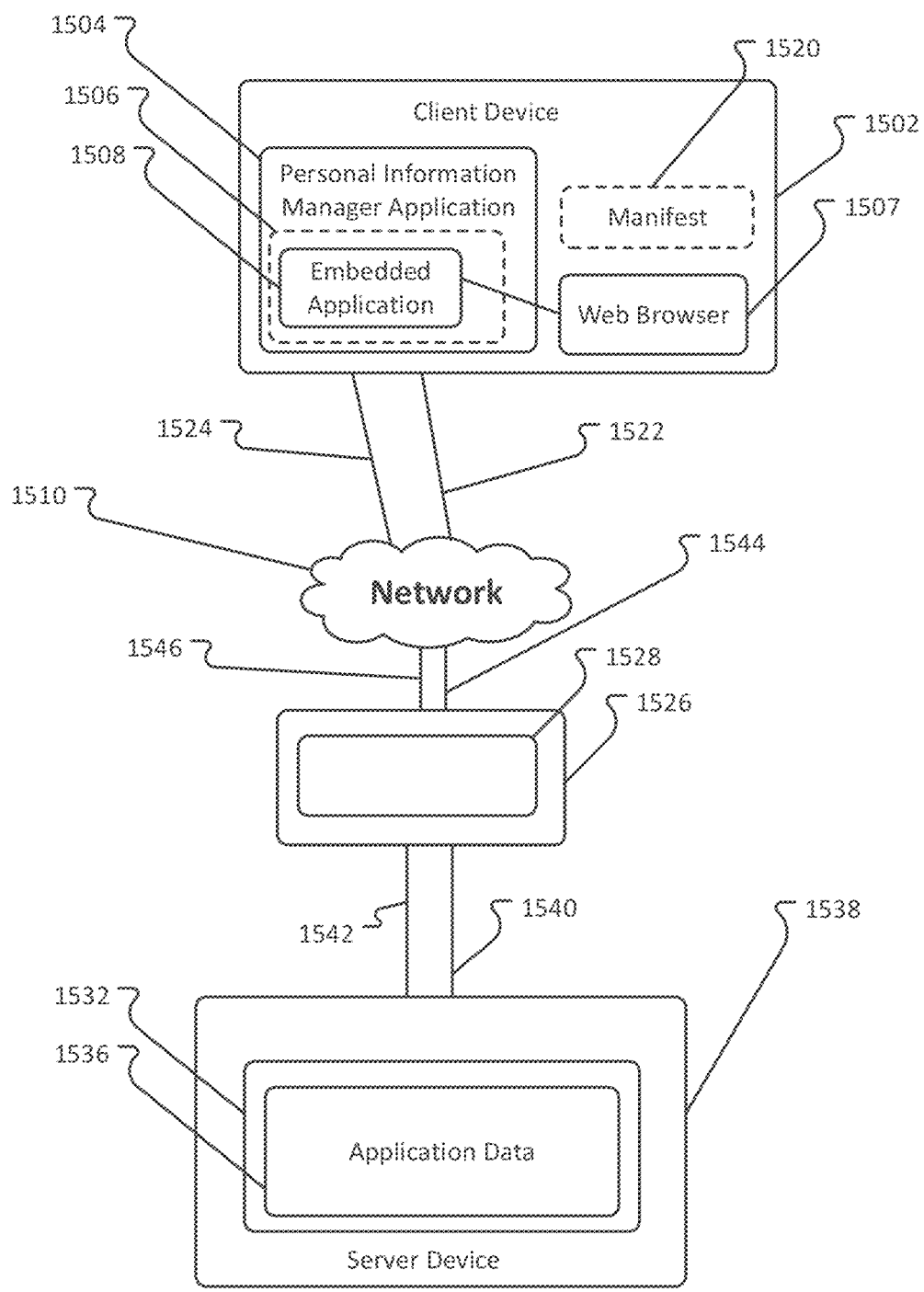
FIG. 15B depicts details of a personal information manager application residing on and executing at a processing device in accordance with examples of the present disclosure.

In accordance with some examples of the present disclosure, a server device 1526 may include a unified hosting interface 1528 for providing, or serving, content to the personal information manager application 1504 as depicted in FIG. 15B. That is, the unified hosting interface 1528 may provide a hosting interface between a first or third party application 1532 and the personal information manager application 1504. In some examples, the first or third party application 1532 may be hosted at a server device 1538. The unified hosting interface 1528 may interact with application data 1536 via the application 1532. For example, the server device 1526 may establish a communication channel 1540 to obtain data from the application 1532, the server device 1538 may then establish a different communication channel 1542 to provide the data to the unified hosting interface 1528. The unified hosting interface 1528, via the server device 1526, may establish a communication channel 1544 to provide the data to the personal information manager application 1504. In some examples, the unified hosting interface 1528 may receive data from the personal information manager application 1504 via the communication channel 1546. Accordingly, the unified hosting interface 1528 may provide content to the personal information manager application 1504 such that the first or third party application 1532 is unaware as to which personal information manager application 1504 it is running from. Further, the embedded application 1508 communicates with the unified hosting interface 1528, where the unified hosting interface 1528 may provide content from several first or third party applications.

Figure 16A:
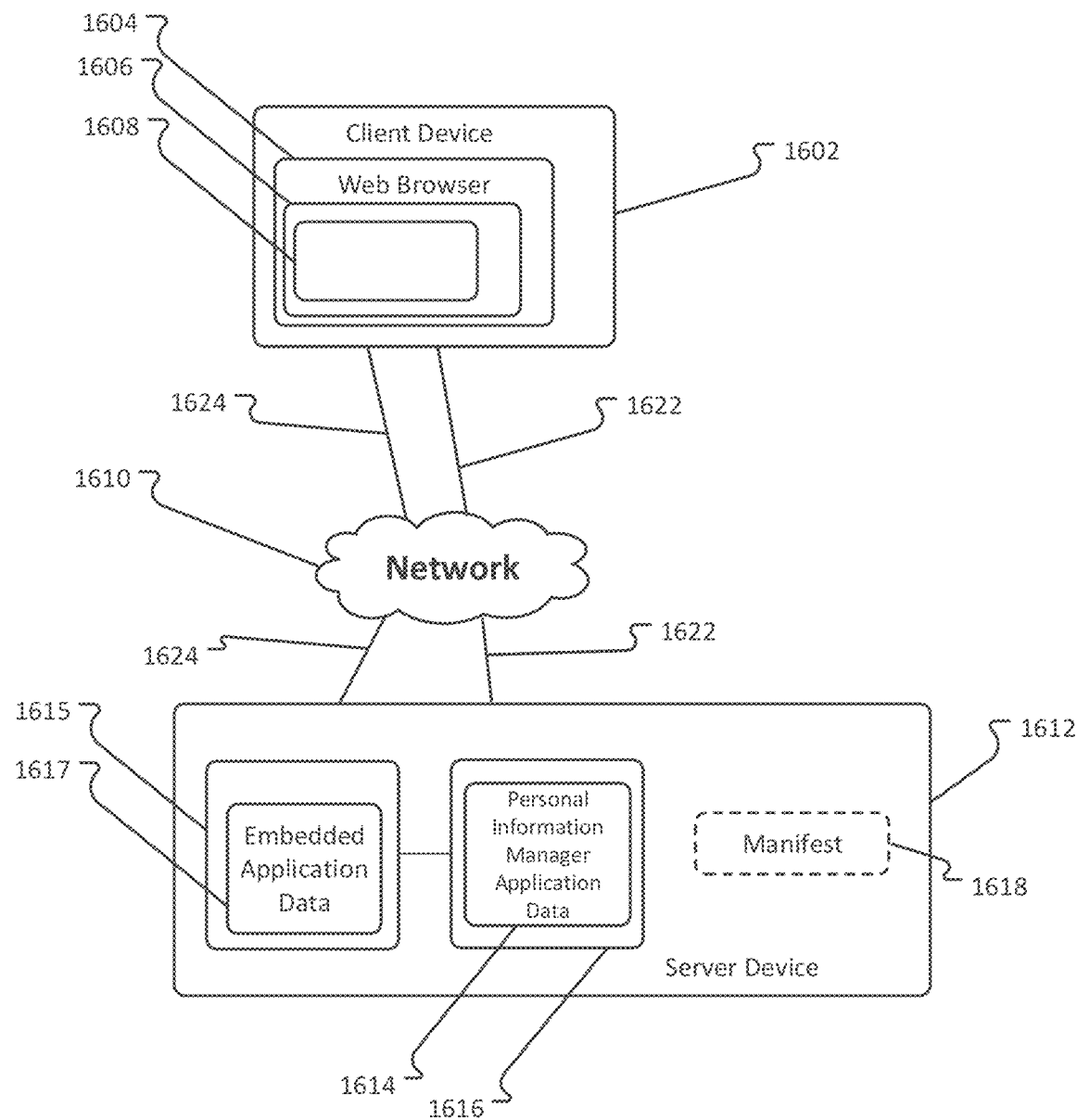
FIG. 16A depicts details of a web browser residing on and executing at a processing device in accordance with examples of the present disclosure.

FIG. 16A depicts details of a web browser 1604 residing on and executing at a processing device 1602 in accordance with examples of the present disclosure. The processing device 1602 may be any time of processing device configured for user interaction Example processing devices include, but are not limited to laptops, tablets, smartphones, and the like. The web browser 1604 may be the same as or similar to the previously described web browser of FIGS. 10-14D. Thus, the web browser 1604 may utilized to navigate to a networked location such that a web application 1606 may be accessed to display a user interface, such as the user interface 1000 of FIG. 10. More specifically, the web browser may access a web version of the previously described personal information manager application. As an example, the web version of the personal information manager application may be the same as or similar to the personal information manager application 1001 previously described. In. accordance with examples of the present disclosure, the web version of the personal information manager application may cause to be displayed, a user interface associated with second web application 1608; the second web application 1608 may correspond to a first or third party application selected by and/or launched by a user. Non-limiting examples of the second web application 1608 may correspond to MICROSOFT™ POWER BI™, MICROSOFT™ Forms, Auto, etc. as previously described. In some examples, the web browser 1604 executes commands and/or otherwise displays data associated with the web application 1606 and the second web application 1608, where the user interface associated with the second web application 1608 may be embedded within or otherwise displayed within the user interface of the web application 1606.

In accordance with examples of the present disclosure, the web browser 1604 may communicate with an application 1616 which may be a personal information manager application to access application specific data. For example, the web browser 1604 may communicate via a first communication channel 1624 to the server device 1612 to send and receive messages; such messages may be stored as personal information manager application data 1614 located at the server device 1612. In some examples, the second web application 1608 may share the communication channel with the web browser 1604 and/or the web application 1606 to communicate with the or otherwise interact with application data 1617 residing at the server device 1612. In some examples, a new communication channel 1622 may be utilized by the web browser 1604 to interact with application data 1617 residing at the server device 1612. In accordance with some examples of the present disclosure, the application data 1617 may be accessed by an application 1616 executing at the server device 1612 such that the application 1616 is responsive to one or more commands from the web browser 1604. As an example, the application 1616 may correspond to a service, such as a MICROSOFT™ POWER BI™ service running on the server device 1612. The MICROSOFT™ POWER BI™ service may interact with the application data 1617 to provide data, user interfaces, views, etc to the web browser 1604. Similarly, the web browser 1604 executing a personal information manager application may interact with a service or application 1616 that makes the personal information manager application data 1614 available to the web browser 1604. In accordance with some examples of the present disclosure, the server device 1612 may also include a manifest 1618; the manifest 1618 may store or otherwise identify applications in an application gallery, such as the application gallery 1208 as previously described. In addition, the manifest 1618 may indicate which applications have been added to or otherwise pinned to the rail 1016 of the personal information manager application. As one example, the manifest may indicate that two default applications, such as but not limited to MICROSOFT™ WORD™ and MICROSOFT™ POWERPOINT™ are to appear in the rail 1016 in addition to a user selected application, such as Auto. Such manifest 1618 may be retrieved by the web application 1606 when the web application 1606 communicates with the server device 1612.

Figure 16B:
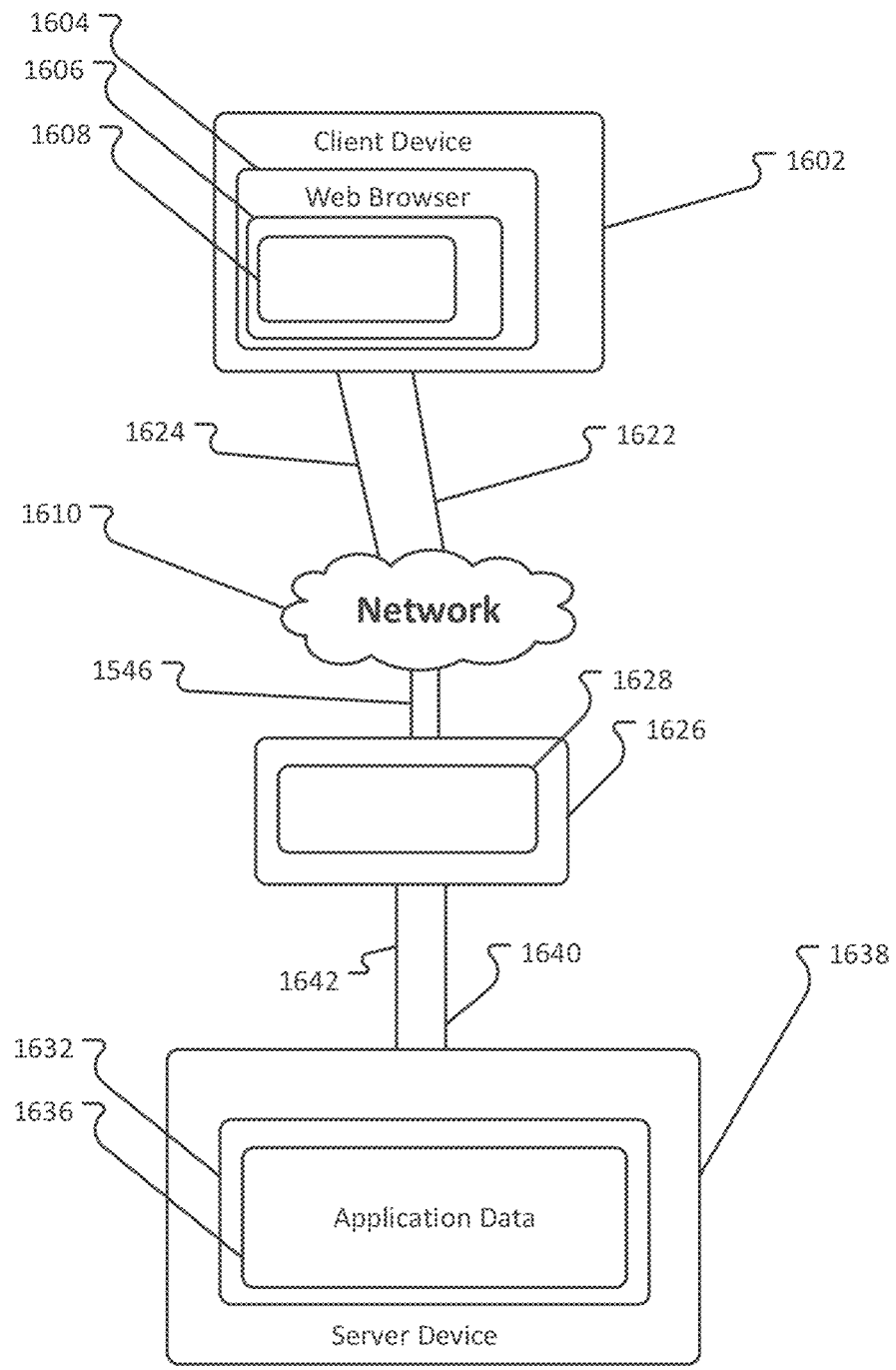
FIG. 16B depicts details of a web browser residing on and executing at a processing device in accordance with examples of the present disclosure.

In accordance with some examples of the present disclosure, a server device 1626 may include a unified hosting interface 1628 for providing, or serving, content to the web browser 1604 running or executing the web version of the personal information manager application as depicted in FIG. 16B. That is, the unified hosting interface 1628 may provide a hosting interface between a first or third party application 1632 and the web browser 1604. In some examples, the first or third party application 1632 may be hosted at a server device 1638. The unified hosting interface 1628 may interact with application data 1636 via the application 1632. For example, the server device 1626 may establish a communication channel 1640 to obtain data from the application 1632; the server device 1638 may then establish a different communication channel 1642 to provide the data to the unified hosting interface 1628. The unified hosting interface 1628, via the server device 1626, may establish a communication channel 1644 to provide the data to the web browser 1604. In some examples, the unified hosting interface 1628 may receive data from the web version of the personal information manager application running in the web browser 1604 via the communication channel 1646. Accordingly, the unified hosting interface 1628 may provide content to the web version of the personal information manager application running in the web browser 1604 such that the first or third party application 1632 is unaware as to which web version of the personal information manager application running in the web browser 1604 is running from. Further, the unified hosting interface 1628 may provide content from several first or third party applications.

Figure 17:
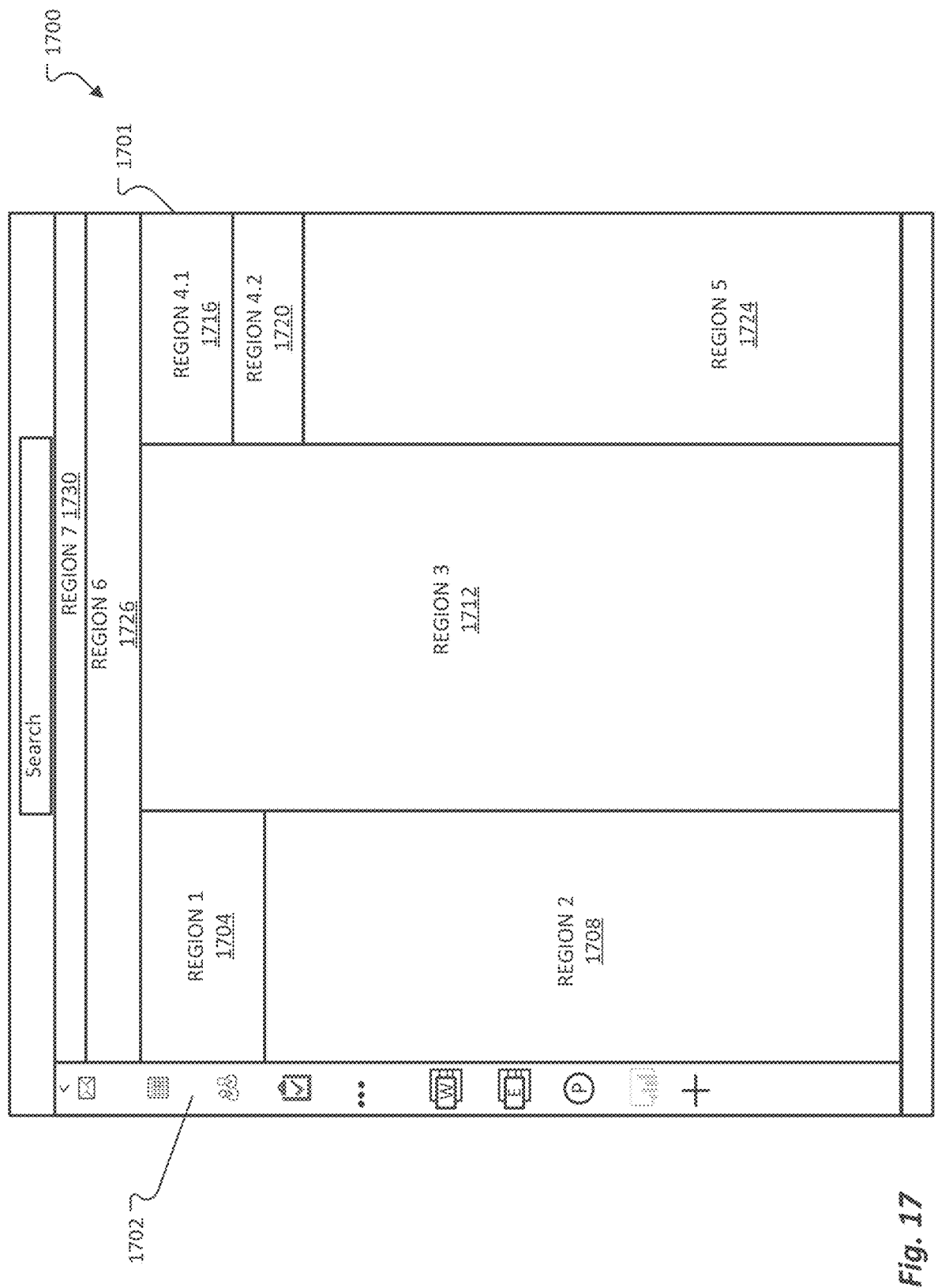
FIG. 17 depicts details of a user interface of a personal information manager application in accordance with examples of the present disclosure.

FIG. 17 depicts details of a user interface 1700 of the personal information manager application 1701 in accordance with examples of the present disclosure. More specifically, the personal information manager application 1701 may be the same as or similar to the personal information manager application 101 of FIG. 1. As depicted in FIG. 17, the user interface 1700 may be segmented into various regions 1704, 1708, 1712, 1716, 1720, and 1724, 1726, and 1730. Of course, more or fewer regions are contemplated herein. In accordance with examples of the present disclosure, an application launched from the rail 1702 may be contained to one or more regions identified in FIG. 17. Of course the regions may be of various sizes and shapes. In some examples, the application launched from the rail 1702 may occupy two regions, three regions, or more regions. Accordingly, when an application is launched, a determination may be made as to where the application will be displayed. Such determination may be made based on a display configuration file or setting maintained by an operating system and/or the personal information manager application 1701.

Figure 18:
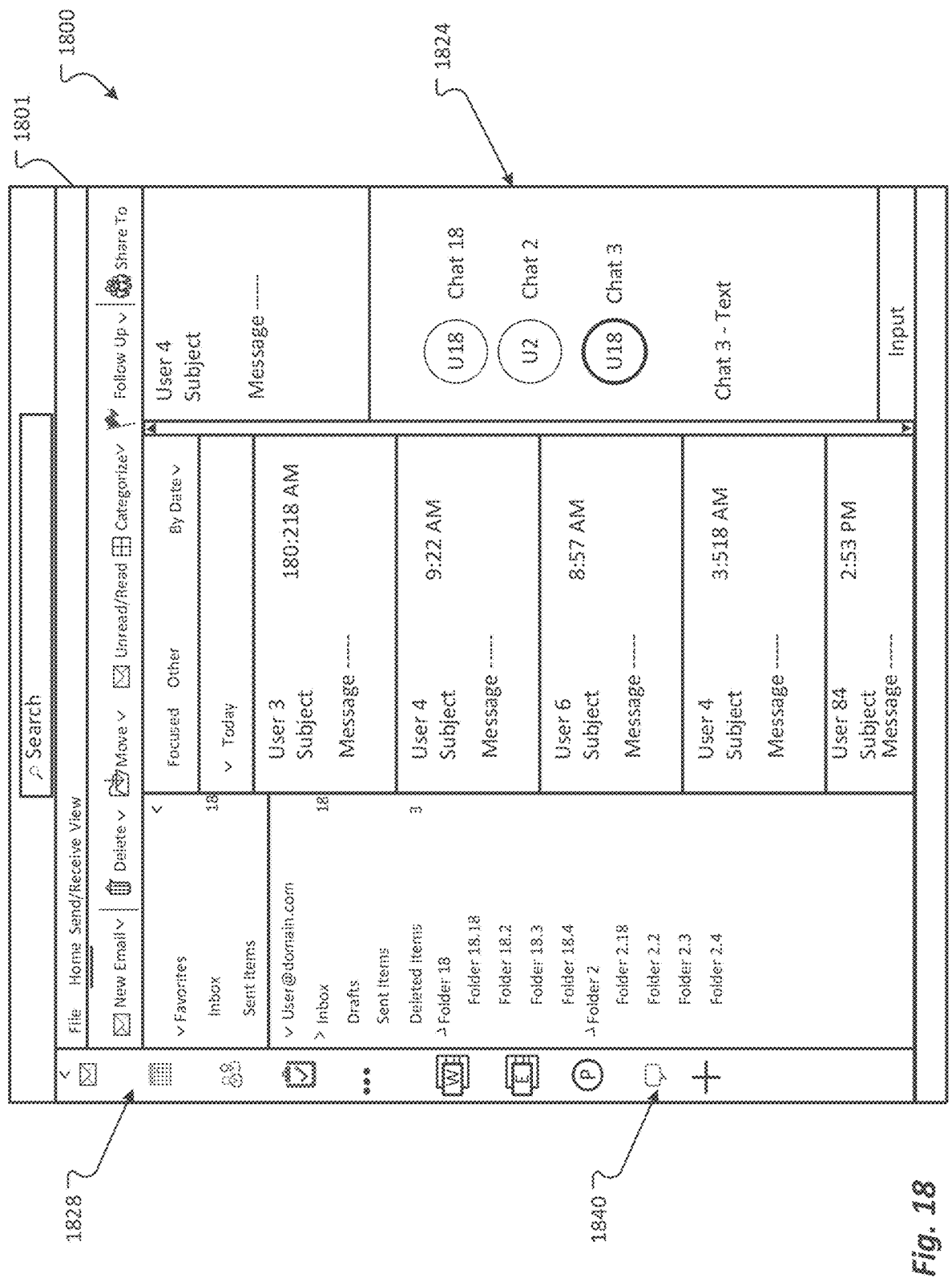
FIG. 18 depicts an example user interface associated with a personal information manager application in accordance with examples of the present disclosure.

FIG. 18 depicts an example user interface 1800 associated with the personal information manager application 1801 in accordance with examples of the present disclosure. The personal information manager application 1801 may be the same as or similar to the personal information manager application 101 of FIG. 1. More specifically, the user interface 1800 may be divided into one or more regions as previously discussed with respect to FIG. 17. In some examples, an application 1840 that a user desires to launch may occupy one or more regions 1824. That is, the region 1824 may contain or otherwise display the entirety of the user interface of the launched application 1840.

Figure 19:
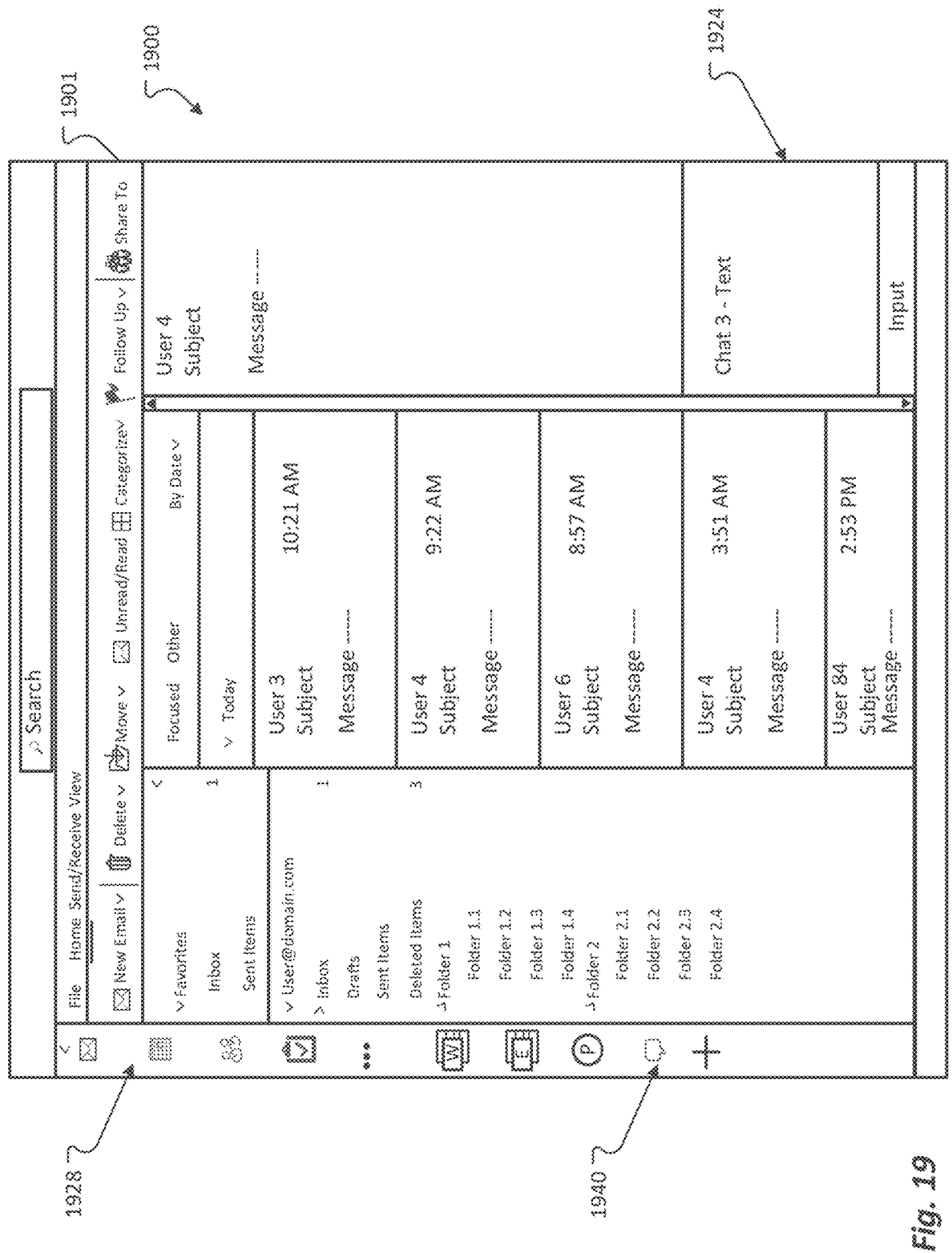
FIG. 19 depicts an example user interface associated with a personal information manager application in accordance with examples of the present disclosure.

FIG. 19 depicts an example user interface 1900 associated with the personal information manager application 1901 in accordance with examples of the present disclosure. The personal information manager application 1901 may be the same as or similar to the personal information manager application 101 of FIG. 1. More specifically, the user interface 1900 may be divided into one or more regions as previously discussed with respect to FIG. 17. In some examples, an application 1940 that a user desires to launch may occupy one or more regions 1924. However, only a portion of the launched application 1940 may occupy the region 1924. For example, the launched application 1940 may display two windows, such as illustrated in region 1824 of FIG. 18. In some examples, only a signal window may be displayed within the user interface 1900. For example, only the window associated with region 1924 may be displayed. Such a determination or identification of a window to display may be based on a configuration or setting maintained by an operation system, the personal information manager application 1901, or the launched application 1940.

Figure 20:
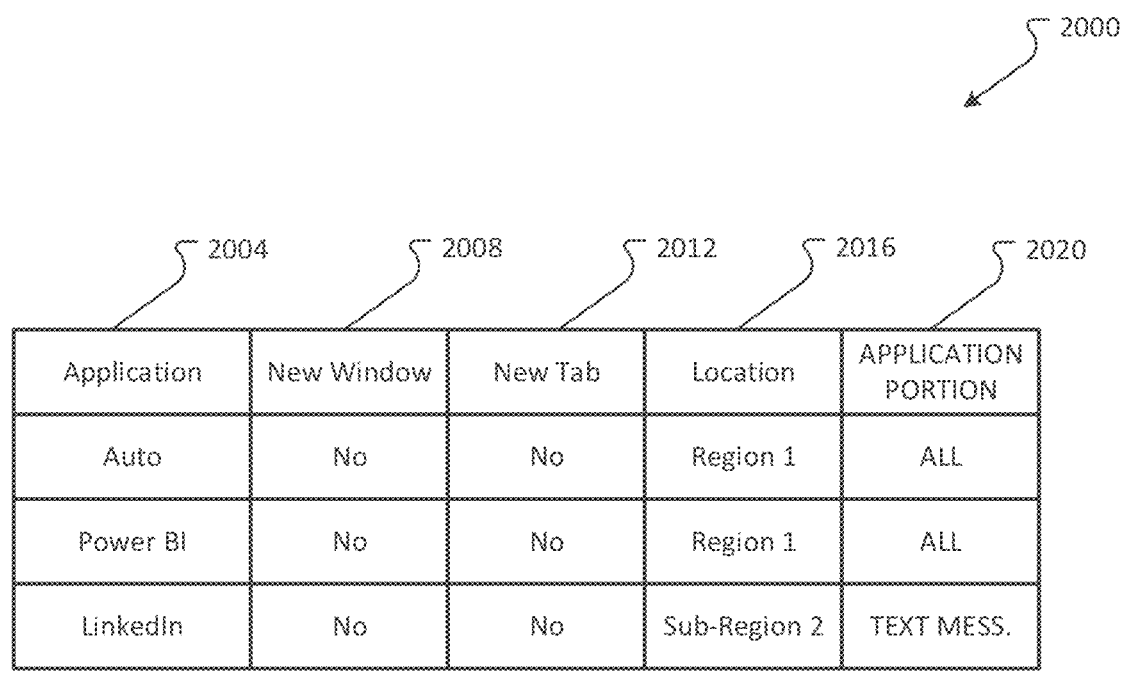
FIG. 20 depicts a data structure in accordance with examples of the present disclosure.

FIG. 20 depicts a data structure 2000 in accordance with examples of the present disclosure. More specifically, the data structure 2000 may be associated with one or more applications to be launched by a user from a rail of an application or web application. The data structure 2000 may be specific to a single application or otherwise include information and configuration settings specific to a plurality of applications. In examples, the data structure 2000 may include and/or identify an application by name or some other form of identification, as depicted in the "Application" column 2004. In addition the data structure 2000 may include one or more parameters indicating how such application should launch, operate, and/or be displayed at a user interface of a personal information manager application. Non-limiting examples of how the application should launch and operate include whether the application should launch in a new window as depicted in the "New Window" column 2008 instead of or in addition to a new tab as depicted in the "New Tab" column 2012. As another example, the "Location" column 2016 may providing information for where an application should launch and operate. For example, an application Auto may launch in a region defined as Region 1 of the personal information manager application user interface. As another example, a "LinkedIn" application should launch into a region defined as sub-region 2. Of course other regions and other parameters associated with how an application should launch and/or operate are contemplated. In some examples, the data structure 2000 may also indicate what portion of an application should be displayed and/or launched as depicted in the "Application Portion" column 2020. For example, for applications capable of providing compartmentalized output and/or otherwise being capable of being segmented into one or more portions, the data structure 2000 may identify which portion of the application may be output, rendered, or otherwise displayed at a user interface of the personal information manager application.

Figure 21:
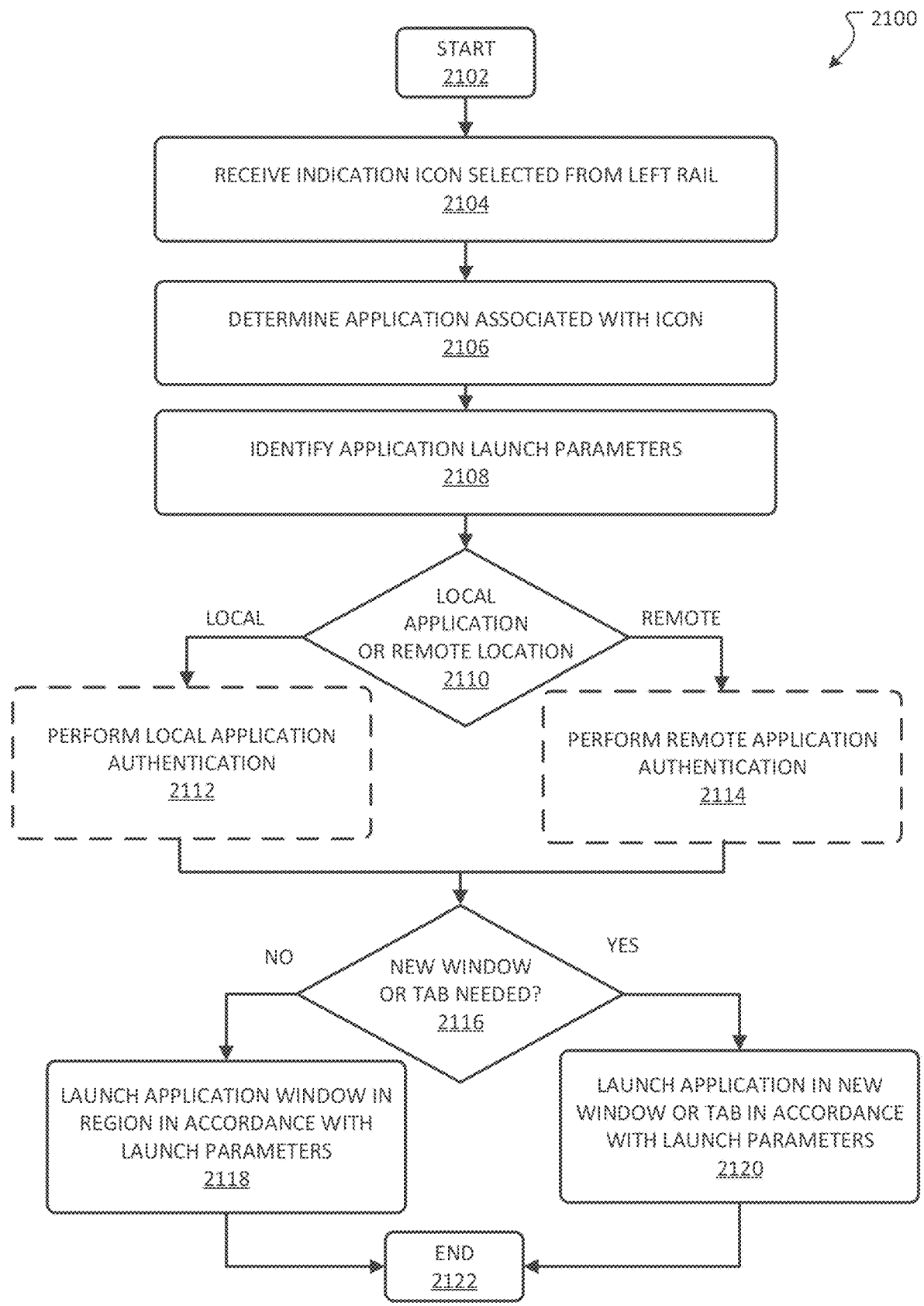
FIG. 21 depicts details of a method for launching and rendering an application selected from a rail of a personal information manager application user interface in accordance with examples of the present disclosure.

FIG. 21 depicts details of a method 2100 for launching and rendering an application selected from a rail of a personal information manager application user interface in accordance with examples of the present disclosure. A general order for the steps of the method 2100 is shown in FIG. 21. Generally, the method 2100 starts at 2102 and ends at 2122. The method 2100 may include more or fewer steps or may arrange the order of the steps differently than those shown in FIG. 21. The method 2100 can be executed as a set of computer-executable instructions executed by a computer system and encoded or stored on a computer readable medium. Further, the method 2100 can be performed by gates or circuits associated with a processor, Application Specific Integrated Circuit (ASIC), a field programmable gate array (FPGA), a system on chip (SOC), or other-hardware device. Hereinafter, the method 2100 shall be explained with reference to the systems, components, modules, software, data structures, user interfaces, etc described in conjunction with FIGS. 1-20.

The method starts at 2102, where flow may proceed to 2104. At 2104, an indication that a user has selected an icon for a different application that is displayed in a user interface associated with a personal information manager application may be received. For example, a user may select icon 140 of the user interface 100, where the icon 140 is located in the rail 128 of the personal information manager application 101 of FIG. 1. Flow may proceed to 2106, where an application associated with the icon is determined. In some examples, the icon may include location information identifying a location, such as a location on a computing device or a location accessible via a network. As an example, the location may correspond to a location entered by a user when adding an application to an application gallery, such as the application gallery 808 of FIG. 8. For example, a location associated with the icon may be identified based on a location in the window 820 of FIG. 8. The method may then proceed to 2120, where a determination as to whether the application selected by the user that is to be launched is local (e.g., resides at the computing device) or is remote (e.g., resides at a network location).

If the application is local, then the method may proceed to 2112 to perform authentication locally at a processing device for example. That is, an operating system at the processing device may determine whether a user, the personal information management application, and/or a combination of both the user and the personal information manager application has appropriate privileges to access the local application. In some examples, a user may be presented with a logon screen to enter credentials giving the user access to the location and/or the privileges to execute the application.

If the application is located at a remote location, then the method may proceed to 2114 to perform authentication at the remote location, (e g, a remotely located processing device, such as a server) for example. That is, an operating system and/or application at the remotely located server may determine whether a user, the personal information management application, and/or a combination of both the user and the personal information manager application has appropriate privileges to access the remote application and/or data associated with the remote application. In some examples, a user may be presented with a logon screen to enter credentials giving the user access to the location and/or the privileges to execute the application. For example, the application selected by the user may be a web accessible application; accordingly, a logon screen provided to the user may allow the user to access the web accessible application.

The method may then proceed to 2116, where a determination is made as to how the application should launch and be rendered to a display. Such determination as to how the application should launch and be rendered to the display may be based on one or more configuration settings maintained by an operating system and/or the personal information manager application. For example, information may be configured by the user using the window 820 for example, and stored in a data structure, such as data structure 2000 of FIG. 20. If a new tab is needed following the determination as to how the application should launch and be rendered to the display at 2116, the method may proceed to 2120 where a new tab in a web browser may be created and the application may be launched and rendered within the web browser. Alternatively, or in addition, if a new window is needed following the determination as to how the application should launch and be rendered to the display at 2116, the method may proceed to 2120 where a new window may be created and the application may be launched and rendered within the new window In instances where the selected application is to be launched within the personal information manager application running, for example the personal information manager application running within a web browser or as a native application running at or otherwise being executed at a local computing devices, one or more parameters may indicate a region, or location, within the personal information manager application that a user interface should be located. In some examples, the application launched may correspond to a web browser instance such that the application may be executed in a web browser within one or more regions of the personal information manager application Once the application has launched and has been rendered to the display, the method 2100 may end at 2122.

Figure 22:
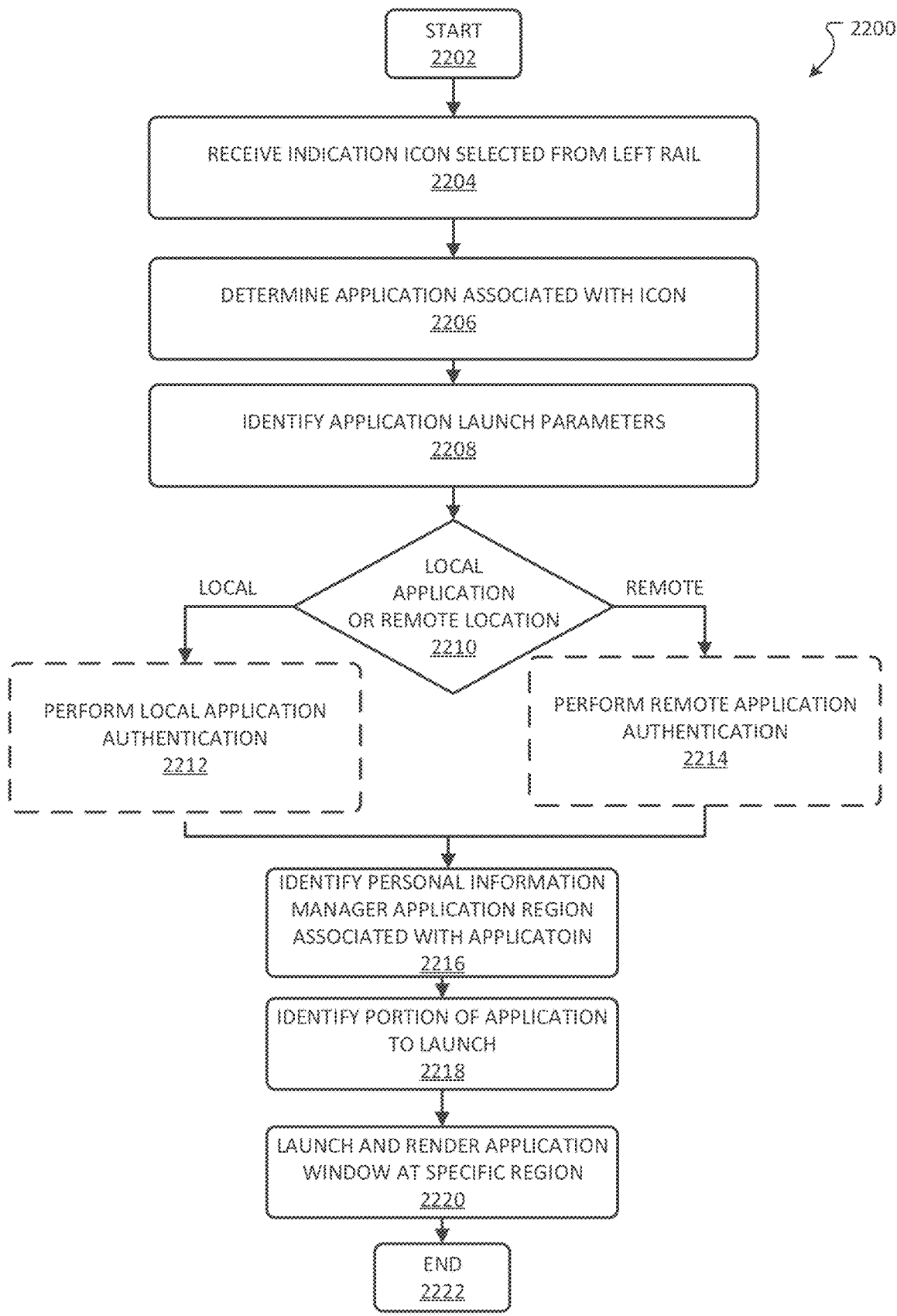
FIG. 22 depicts details of a method for launching and rendering a portion of an application selected from a rail of a personal information manager application user interface in accordance with examples of the present disclosure.

FIG. 22 depicts details of a method 2200 for launching and rendering a portion of an application within a personal information manager application user interface that is different from the application in accordance with examples of the present disclosure. A general order for the steps of the method 2200 is shown in FIG. 22. Generally, the method 2200 starts at 2202 and ends at 2222. The method 2200 may include more or fewer steps or may arrange the order of the steps differently than those shown in FIG. 22. The method 2200 can be executed as a set of computer-executable instructions executed by a computer system and encoded or stored on a computer readable medium. Further, the method 2200 can be performed by gates or circuits associated with a processor. Application Specific Integrated Circuit (ASIC), a field programmable gate array (FPGA), a system on chip (SOC), or other hardware device. Hereinafter, the method 2200 shall be explained with reference to the systems, components, modules, software, data structures, user interfaces, etc. described in conjunction with FIGS. 1-21.

The method starts at 2202, where flow may proceed to 2204. At 2204, an indication that a user has selected an icon for a different application that is displayed in a user interface associated with a personal information manager application may be received. For example, a user may select icon 140 of the user interface 100, where the icon 140 is located in the rail 128 of the personal information manager application 101 of FIG. 1. Flow may proceed to 2206, where an application associated with the icon is determined. In some examples, the icon may include location information identifying a location, such as a location on a computing device or a location accessible via a network. As an example, the location may correspond to a location entered by a user when adding an application to an application gallery, such as the application gallery 808 of FIG. 8. A location associated with the icon may be identified based on a location in the window 820 of FIG. 8. The method may then proceed to 2220, where a determination as to whether the application selected by the user that is to be launched is local (e.g., resides at the computing device) or is remote (e.g., resides at a network location).

If the application is local, then the method may proceed to 2212 to perform authentication locally at a processing device for example. That is, an operating system at the processing device may determine whether a user, the personal information management application, and/or a combination of both the user and the personal information manager application has appropriate privileges to access the local application. In some examples, a user may be presented with a logon screen to enter credentials giving the user access to the location and/or the privileges to execute the application.

If the application is located at a remote location, then the method may proceed to 2214 to perform authentication at the remote location, (e.g, a remotely located processing device, such as a server) for example. That is, an operating system and/or application at the remotely located server may determine whether a user, the personal information management application, and/or a combination of both the user and the personal information manager application has appropriate privileges to access the remote application and/or data associated with the remote application. In some examples, a user may be presented with a logon screen to enter credentials giving the user access to the location and/or the privileges to execute the application. For example, the application selected by the user may be a web accessible application, accordingly, a logon screen provided to the user may allow the user to access the web accessible application.

The method may then proceed to 2216, where a region within the user interface of the personal information manager application may be identified, the region corresponding to a location within the personal information manager application that the application, or a portion of the application, should be displayed. For example, the region within the user interface of the personal information manager application may correspond to one or more regions identified in FIG. 17. As a non-limiting example, the region may correspond to Region 3 1712, Region 4.1 1716, Region 4.2 1720, and Region 5 1724 of FIG. 17. As another non-liming example, the region may correspond to Region 5 1724 of FIG. 17. The method 2200 may proceed to 2218 where a portion of an application to launch and render to a display may be identified. In examples, the portion of the application to launch and render to the display may be identified from one or more configuration settings or parameters associated with the application. As an example, the portion of the application may be identified from the data structure 2000 shown in FIG. 20. The method 2200 may then proceed to 2220, where the application window may be rendered at the specified region of the user interface of the personal information manager application. As one non-limiting example, the portion of the application may correspond to a text portion and may be rendered at a region of the user interface of the personal information manager application identified at 1924 of FIG. 19. In some examples, the portion of the application launched may correspond to a web browser instance such that the portion of the application may be executed in a web browser within the identified regions of the personal information manager application Once the application has launched and has been rendered to the display, the method 2200 may end at 2222.

Figure 23:
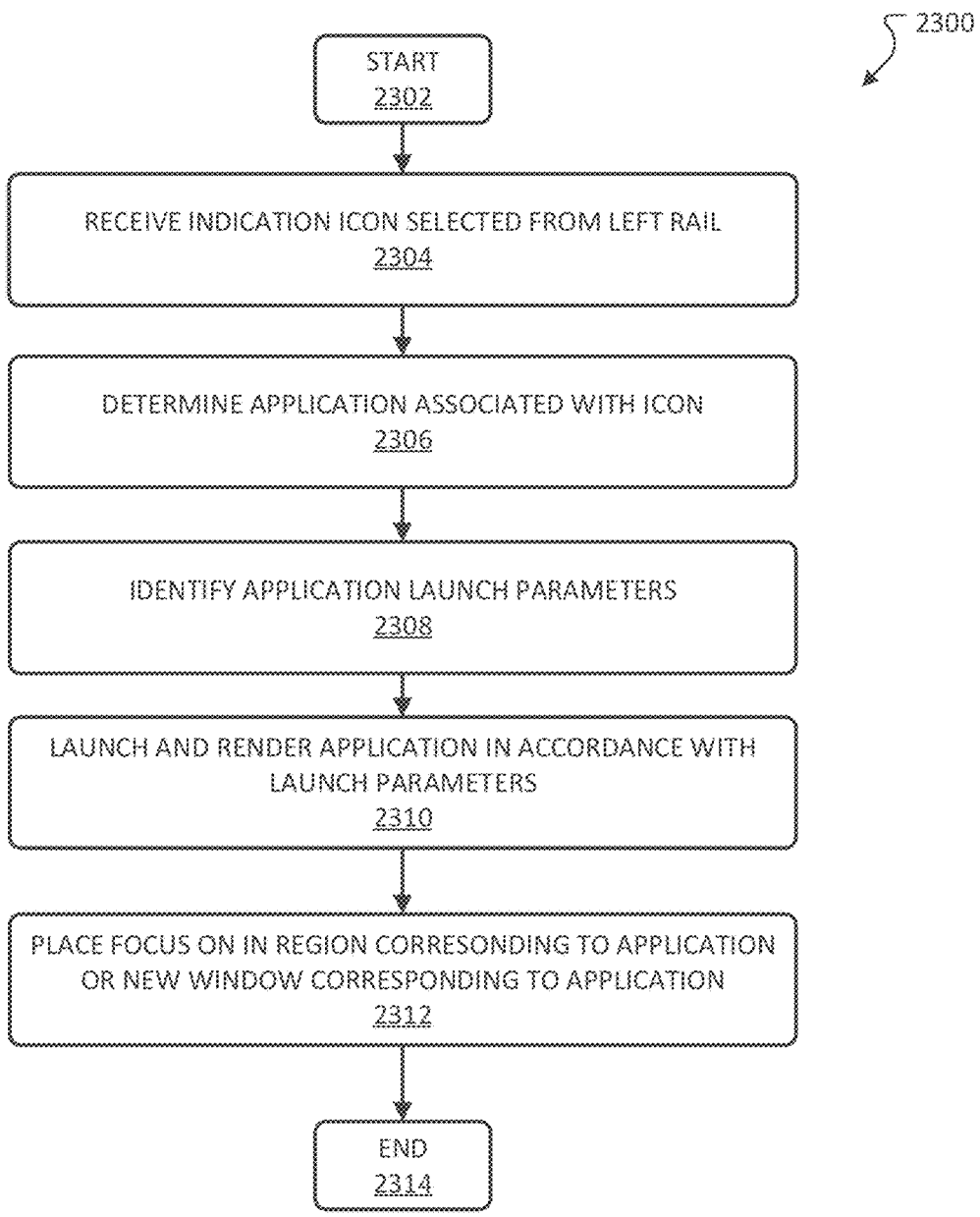
FIG. 23 depicts details of a method for placing a focus on a region or on a new window after launching and rendering an application selected from a rail of a personal information manager application user interface in accordance with examples of the present disclosure.

FIG. 23 depicts details of a method 2300 for placing a focus on a region or on a new window after launching and rendering an application selected from a rail of a personal information manager application user interface in accordance with examples of the present disclosure. A general order for the steps of the method 2300 is shown in FIG. 23. Generally, the method 2300 starts at 2302 and ends at 2314. The method 2300 may include more or fewer steps or may arrange the order of the steps differently than those shown in FIG. 23. The method 2300 can be executed as a set of computer-executable instructions executed by a computer system and encoded or stored on a computer readable medium. Further, the method 2300 can be performed by gates or circuits associated with a processor, Application Specific Integrated Circuit (ASIC), a field programmable gate array (FPGA), a system on chip (SOC), or other hardware device. Hereinafter, the method 2300 shall be explained with reference to the systems, components, modules, software, data structures, user interfaces, etc described in conjunction with FIGS. 1-22.

The method starts at 2302, where flow may proceed to 2304. At 2304, an indication that a user has selected an for a different application that is displayed in a user interface associated with a personal information manager application may be received. For example, a user may select icon 140 of the user interface 100, where the icon 140 is located in the rail 128 of the personal information manager application 101 of FIG. 1. Flow may proceed to 2306, where an application associated with the icon is determined. In some examples, the icon may include location information identifying a location, such as a location on a computing device or a location accessible via a network. As an example, the location may correspond to a location entered by a user when adding an application to an application gallery, such as the application gallery 808 of FIG. 8. A location associated with the icon may be identified based on a location in the window 820 of FIG. 8. The method may then proceed to 2308, where a one or more application launch parameters may be determined. For example, the one or more or more launch parameters may correspond to one or more configuration settings identified from the data structure 2000. In some examples, the one or more configuration settings may indicate that a new window and/or web browser tab may need to be created and that the application is to be launched within the newly-created window and/or web browser. As another example, the one or more configuration settings may indicate that the application is to be launched within the personal information manager application. The method may proceed to 2310, where the application may be launched and rendered in accordance with the identified launch parameters. In some examples, the application launched may correspond to a web browser instance such that the application may be executed in a web browser within one or more identified regions of the personal information manager application.

Upon launching the application and rendering a user interface associated with the application to the display, the method 2300 may proceed to 2312, where the focus following the application launch may be determined and applied to the determined location. Text or commands entered at the keyboard or mouse or pasted from a clipboard is sent to or otherwise directed to the component which has the focus. Moving the mouse will typically move the mouse pointer without changing the focus. The focus can usually be changed by clicking on an element, such as an icon, that can receive focus with the mouse. Accordingly, when an application is launched, there is often a need to determine which element, application, or otherwise is to receive the focus following the launch.

For example, if the application was launched in a new window, the focus may transition from the personal information manager application (e.g., the selection of the icon associated with the application) to the new window in which the application was launched. In some examples, the focus may remain at the personal information manager application. For example, if the application was launched in a new window, the focus may remain at the personal information manager application (e.g., the selection of the icon associated with the application) and not transition to the new window in which the application was launched. Such determination may be associated with a configuration setting and/or parameter, where such configuration setting and/or parameter may be accessible via the data structure 2000 for example.

In some examples, upon launching the application and rendering a user interface associated with the application to the display, the focus following the application launch may be determined to correspond to a location or region within the personal information manager application. For example, if the application was launched and displayed within a region of the user interface of the personal information manager application, the focus may transition from the rail, for example the selection of the icon associated with the application, to the region within the user interface of the personal information manager application where the application as launched to the new window in which the application was launched. In some examples, the focus may remain at the left rail of the personal information manager application Such a determination may be associated with a configuration setting and/or parameter, where such configuration setting and/or parameter may be accessible via the data structure 2000 for example. The method 2300 may end at 2314.

Figure 24:
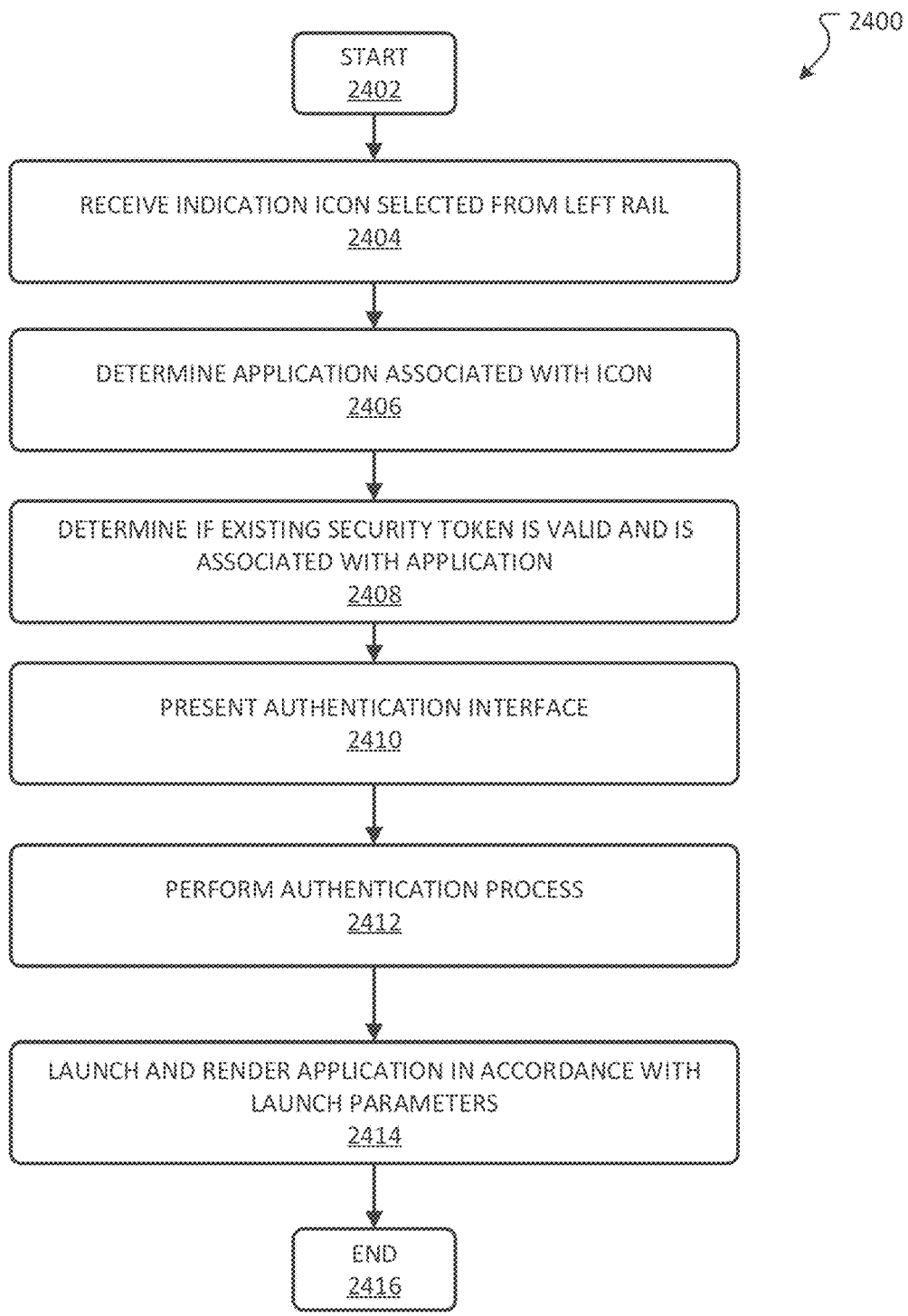
FIG. 24 depicts details of a method for launching and rendering an application selected from a rail of a personal information manager application user interface with in accordance with examples of the present disclosure.

FIG. 24 depicts details of a method 2400 for launching and rendering an application selected from a rail of a personal information manager application user interface with in accordance with examples of the present disclosure. A general order for the steps of the method 2400 is shown in FIG. 24. Generally, the method 2400 starts at 2402 and ends at 2414. The method 2400 may include more or fewer steps or may arrange the order of the steps differently than those shown in FIG. 24. The method 2400 can be executed as a set of computer-executable instructions executed by a computer system and encoded or stored on a computer readable medium. Further, the method 2400 can be performed by gates or circuits associated with a processor, Application Specific Integrated Circuit (ASIC), a field programmable gate array (FPGA), a system on chip (SOC), or other hardware device. Hereinafter, the method 2400 shall be explained with reference to the systems, components, modules, software, data structures, user interfaces, etc. described in conjunction with FIGS. 1-23.

The method starts at 2402, where flow may proceed to 2404. At 2404, an indication that a user has selected an icon for a different application that is displayed in a user interface associated with a personal information manager application may be received. For example, a user may select icon 140 of the user interface 100, where the icon 140 is located in the rail 128 of the personal information manager application 101 of FIG. 1. Flow may proceed to 2406, where an application associated with the icon is determined. In some examples, the icon may include location information identifying a location, such as a location on a computing device or a location accessible via a network. As an example, the location may correspond to a location entered by a user when adding an application to an application gallery, such as the application gallery 808 of FIG. 8. A location associated with the icon may be identified based on a location in the window 820 of FIG. 8. The method may then proceed to 2408, where a determination is made as to whether an existing security token associated with the personal information manager application is valid and is associated with the application to be launched.

For example, a token-based authentication architecture may be employed by the personal information manager application. Alternatively, or in addition, the personal information manager application may communicate with a centralized identity provider and/or platform that performs and manages identity verification processes and tasks that may be needed to ensure that each user has access to the personal information manager application and the data relied upon by the personal information manager application. More specifically, a centralized identity platform may authenticate users and provide security tokens, such as access tokens, refresh tokens, and ID tokens that allow the personal information manager application to access protected resources on a resource server, for example the server device 1512 of FIG. 15A and/or 1612 of FIG. 16A. An access token is a security token that is issued by an authorization server as part of an authentication process. The access token contains information about the user and the application for which the token is intended. The access token may be used to access web application programming interfaces and other protected resources. Accordingly, an access token may be issued allowing a user to use the personal information manager application to access the personal information manager application data. As access tokes are generally valid for a short period of time, a refresh token may be issued from the centralized identity platform such that a client may exchange the refresh token for an access token. An ID token may be provided to the personal information manager application alongside of or instead of an access token such that the personal information manager application may properly authenticate a user using the application.

In examples, when the application selected by the user is launched, the application may determine if a valid security token exists. In some examples, the valid security token may be the same security token used by the personal information manager application. In other examples, the valid security token may be utilized as part of a single-sign-on event and/or remain from a previous session. If an existing valid security token does not exist upon application launch for example, the method 2400 may proceed to 2410 where authentication credentials of a user may be obtained. For example, a user interface with a username field and a password field may be presented to the user such that the user can enter the requested information. In some examples, the request for authentication may utilize facial recognition, voice recognition, or a similar authentication process to ensure the user attempting to access the launched application can verify their identity. That is, the user's identity may be verified at 2412. The method may then proceed to 2114, where the application may be launched and rendered to a display in accordance with the launch parameters, such as the parameters in the data structure 2000. The method 2400 may then end at 2416.

Figure 25:
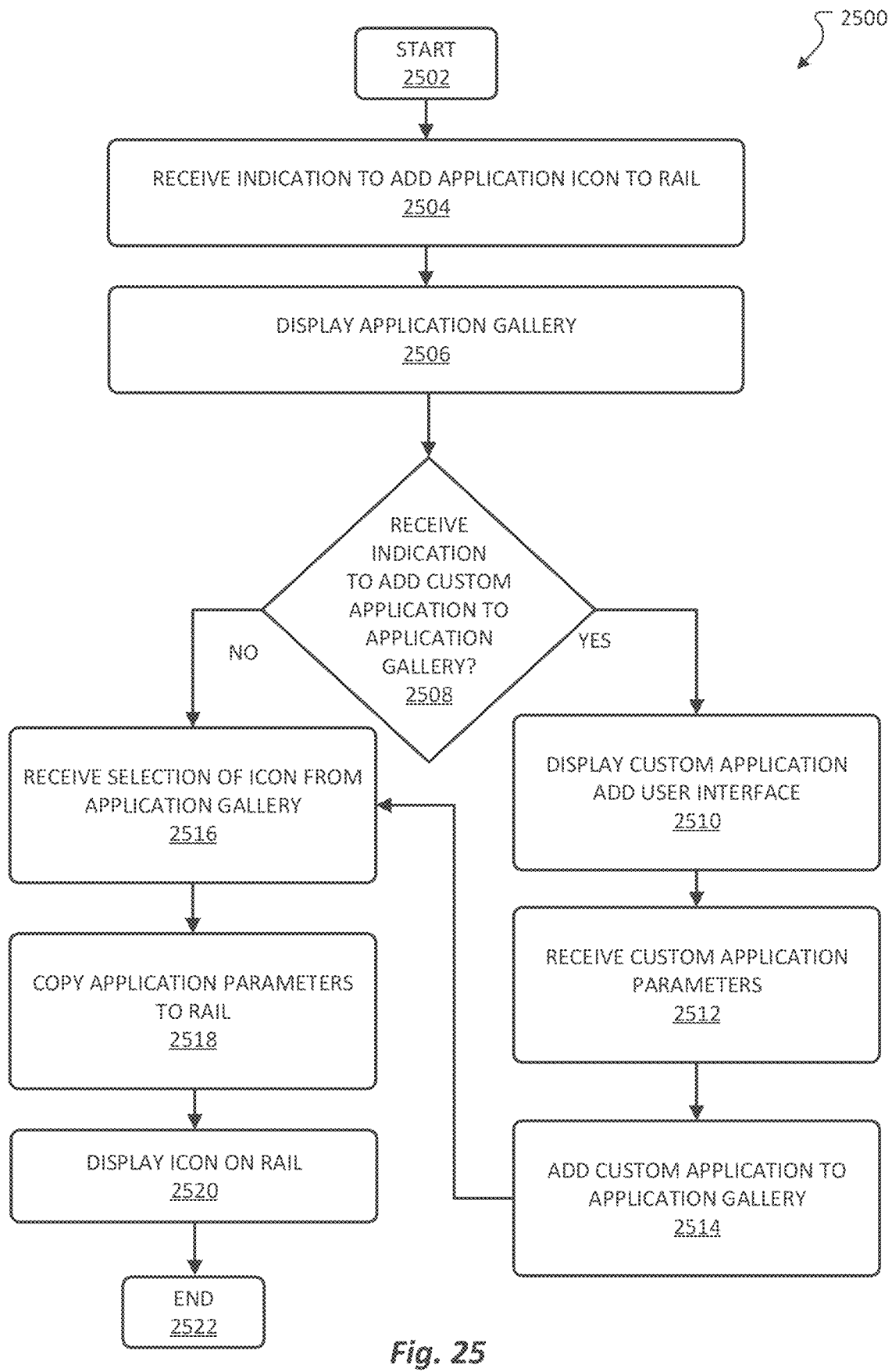
FIG. 25 depicts details of a method for adding an application icon to the rail of the user interface of the personal information manager application in accordance with in accordance with examples of the present disclosure.

FIG. 25 depicts details of a method 2500 for adding an application icon to the rail of the user interface of the personal information manager application in accordance with in accordance with examples of the present disclosure. A general order for the steps of the method 2500 is shown in FIG. 25. Generally, the method 2500 starts at 2502 and ends at 2522. The method 2500 may include more or fewer steps or may arrange the order of the steps differently than those shown in FIG. 25. The method 2500 can be executed as a set of computer-executable instructions executed by a computer system and encoded or stored on a computer readable medium. Further, the method 2500 can be performed by gates or circuits associated with a processor. Application Specific Integrated Circuit (ASIC), a field programmable gate array (FPGA), a system on chip (SOC), or other hardware device. Hereinafter, the method 2500 shall be explained with reference to the systems, components, modules, software, data structures, user interfaces, etc. described in conjunction with FIGS. 1-24.

The method starts at 2502, where flow may proceed to 2504. At 2504, an indication to add an application icon to the rail may be received. For example, an indication that a user selected the "plus" element 404 in the left rail 428 of FIG. 4 may be received. Upon receiving the indication that the user selected the "plus" element 404 for example, an application gallery may be rendered and displayed to a user. For example, the application gallery 408 of FIG. 4 including various application icons corresponding to a plurality of applications may be displayed. In some instances, a user may desire to add a custom application to the application gallery and/or the rail. For example, a user may select the add icon 816 of FIG. 8. Accordingly, the method 2500 may proceed to 2510, where a custom user interface may be displayed to a user that allows the user to select the application they would like to add to the application gallery. As one example, the window 820 of FIG. 8 may be displayed to the user. Accordingly, a user may provide a location, an icon, and/or whether to launch the application within the personal information manager application or external to the personal information manager application at 2512.

The method 2500 may then proceed to 2514, where the custom application may be added to the application gallery. As one example, the custom "MyApp" application of FIGS. 8B and 8C may be added to the application gallery 808. The method may proceed to 2516 where an indication of a selection of an icon made by the user is received. In examples, the user may select the newly added application, such as the "MyApp" icon 824 of FIG. 8 representing the custom application that was added to the application gallery at 2514. In other examples, the indication may correspond to a selection of an application previously existing in the application gallery. The method may then proceed to 2518, where one or more parameters may be copied to the rail.

In accordance with examples of the present disclosure, the one or more parameters may correspond to a location associated with an icon. For example, the one or more settings may be a link indicating where the underlying application, such as an executable file is locally located. In some examples, the link may refer to a network location, such as a webpage or web accessible resource. In some examples, the one or more configuration settings may specify how the application is to be launched and rendered to the display. For example, the one or more configuration settings my included one or more settings of the data structure 2000 of FIG. 20. In examples, the one or more configuration settings may indicate that when launched, a new window or browser tap is to be created and the user interface associated with the application should be directed to that particular window or browser instance. In some examples, a region may be specified in the one or more configuration settings. The method may flow to 2520 such that the icon representing the application may be displayed on the rail.

In some examples, the one or more configuration settings may be modified once the icon has been added to the rail. For example, the one or more configuration settings may indicate which position on the rail the icon occupies. Further, in instances there a location of the underlying executable file or network location changes, such locations can be updated to reflect a new location. The method 2500 may end at 2522.

Figure 26:
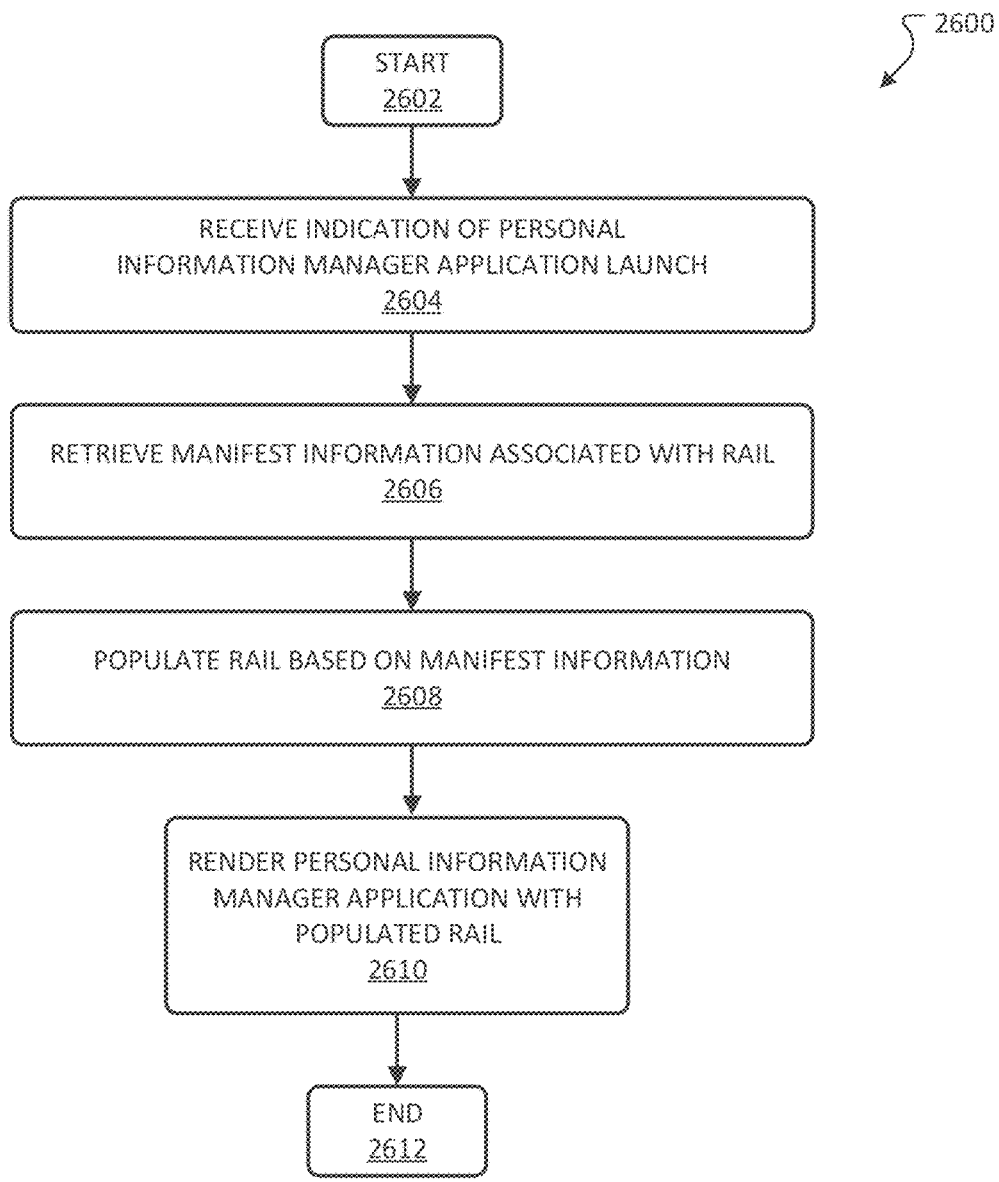
FIG. 26 depicts details of a method for determining one or more icons representative of an application to display at a rail of the user interface of the personal information manager application in accordance with in accordance with examples of the present disclosure.

FIG. 26 depicts details of a method 2600 for determining one or more icons representative of an application to display at a rail of the user interface of the personal information manager application in accordance with in accordance with examples of the present disclosure. A general order for the steps of the method 2600 is shown in FIG. 26. Generally, the method 2600 starts at 2602 and ends at 2612. The method 2600 may include more or fewer steps or may arrange the order of the steps differently than those shown in FIG. 26. The method 2600 can be executed as a set of computer-executable instructions executed by a computer system and encoded or stored on a computer readable medium. Further, the method 2600 can be performed by gates or circuits associated with a processor, Application Specific Integrated Circuit (ASIC), a field programmable gate array (FPGA), a system on chip (SOC), or other hardware device. Hereinafter, the method 2600 shall be explained with reference to the systems, components, modules, software, data structures, user interfaces, etc. described in conjunction with FIGS. 1-25.

The method starts at 2602, where flow may proceed to 2604. At 2604, an indication that a personal information manager application has been launched is received. For example, the indication may correspond to a selection of an icon associated with the personal information manager application. As another example, the indication may be received as the personal information manager application loads and/or access information. In some examples, the indication may correspond to a successful authentication at a web site such that the personal information manager application may be presented as a web-enabled application. The method may proceed to 2606 to retrieve information associated with a manifest. In some examples, the manifest may be specific to the rail. In other examples, the manifest may be a shared manifest an include information associated with the rail and information associated with a gallery. An example manifest may be the same as or similar to the manifest 1520, 1518, and/or 1618.

In examples, the manifest may include a description of one or more applications that should be included in the rail, such as rail 128. Accordingly, the manifest may be seen as a list of applications, and/or icons, specifying a location for each icon on the rail. In some examples, the manifest may also include additional information, such as one or more configuration settings; the one or more configuration settings may be the same as or similar to the one or more configuration settings and/or parameters of the data structure 2000. In some examples, the manifest may be a collection of information associated with icons and applications, where a designation may be provided indicating that the designated icon is to appear on the rail.

The method may proceed to 2608, where a rail, such as the left rail 128 is populated with one or more icons based on the information included in the manifest. For example, a rail load procedure may be called which identifies one or more applications, based on the manifest, that are to be added to the rail. In some examples, and as part of the process of loading the icons and/or applications associated with the rail, the personal information manager application may proceed to ensure that the user using the personal information manager application is authenticated with respect to each of the applications appearing on the rail. Accordingly, if a user is required to provide authentication credentials, the personal information manager application make such request, or allow such request, and ensure that the user is properly logged in and configured to use each of the applications appearing on the rail. The method 2600 may proceed to 2610, where the personal information manager application including the populated rail is rendered to the display. The method 2600 may end at 2612.

Figure 27:
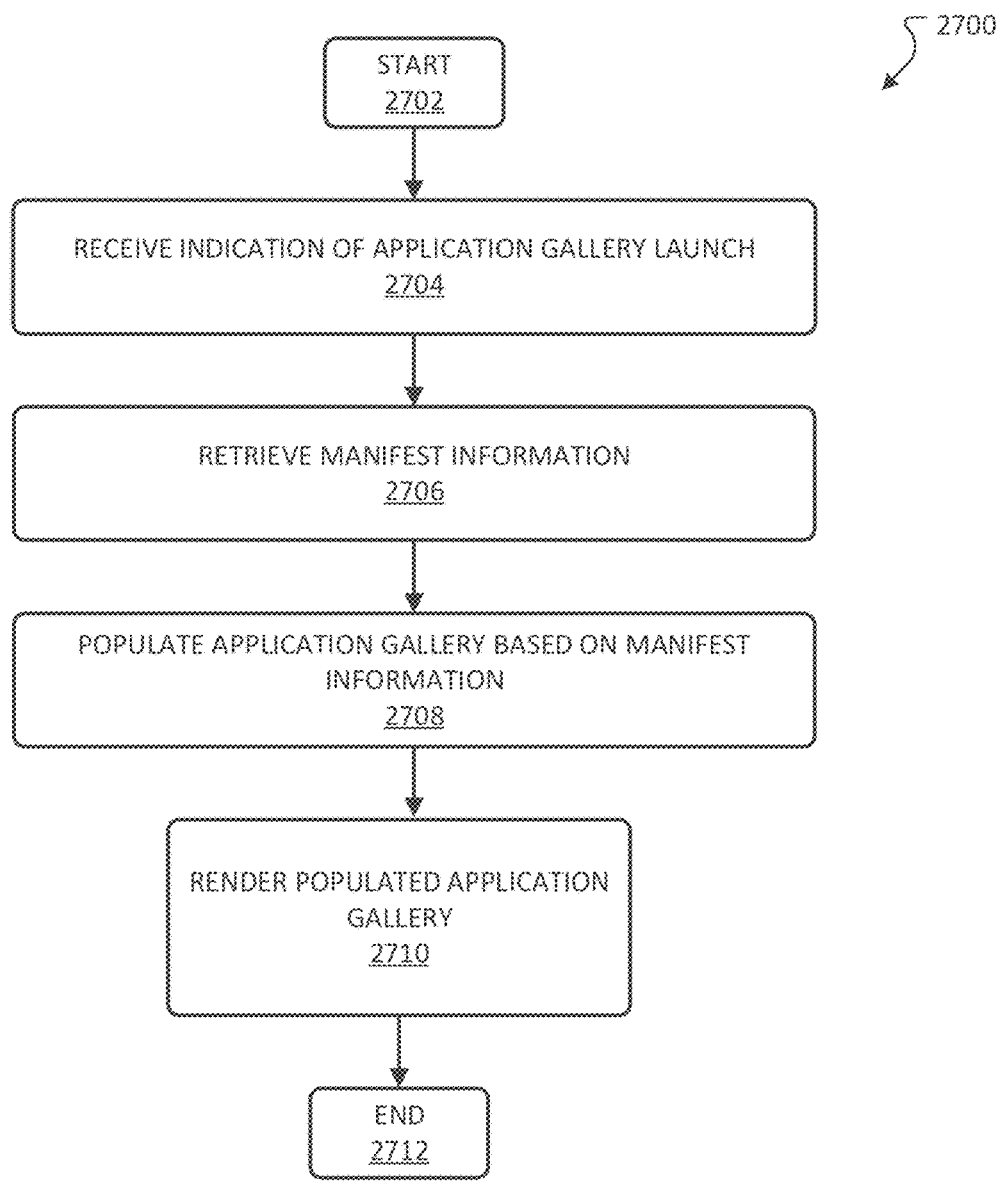
FIG. 27 depicts details of a method for determining one or more icons representative of an application to display in an application gallery of a window associated with the user interface of the personal information manager application in accordance with in accordance with examples of the present disclosure.

FIG. 27 depicts details of a method 2700 for determining one or more icons representative of an application to display in an application gallery of a window associated with the user interface of the personal information manager application in accordance with in accordance with examples of the present disclosure. A general order for the steps of the method 2700 is shown in FIG. 27. Generally, the method 2700 starts at 2702 and ends at 2712. The method 2700 may include more or fewer steps or may arrange the order of the steps differently than those shown in FIG. 27. The method 2700 can be executed as a set of computer-executable instructions executed by a computer system and encoded or stored on a computer readable medium. Further, the method 2700 can be performed by gates or circuits associated with a processor, Application Specific Integrated Circuit (ASIC), a field programmable gate array (FPGA), a system on chip (SOC), or other hardware device. Hereinafter, the method 2700 shall be explained with reference to the systems, components, modules, software, data structures, user interfaces, etc. described in conjunction with FIGS. 1-26.

The method starts at 2702, where flow may proceed to 2704. At 2704, an indication that an application gallery, such as the application gallery 808, has been launched is received. For example, the indication may correspond to a selection of the "plus" or "add" icon 804. The method may proceed to 2706 to retrieve information associated with a manifest. In some examples, the manifest may be specific to the application gallery. In other examples, the manifest may be a shared manifest an include information associated with the application gallery and information associated with a gallery. An example manifest may be the same as or similar to the manifest 1520, 1518 of FIG. 15A and/or 1618 of FIG. 16A.

In examples, the manifest may include a description of one or more applications that should be included in the application gallery 808 of FIG. 8. Accordingly, the manifest may be seen as a list of applications, and/or icons, specifying a location for each icon in the application gallery. In some examples, the manifest may also include additional information, such as one or more configuration settings; the one or more configuration settings may be the same as or similar to the one or more configuration settings and/or parameters of the data structure 2000 of FIG. 20. In some examples, the manifest may be a collection of information associated with icons and applications, where a designation may be provided indicating that the designated icon is to appear in the application gallery.

The method may proceed to 2708, where an application gallery, such as the application gallery 808, is populated with one or more icons based on the information included in the manifest. For example, an application gallery load procedure may be called which identities one or more applications, based on the manifest, that are to be added to the application gallery. In some examples, and as part of the process of loading the icons and/or applications associated with the application gallery, the personal information manager application may proceed to ensure that the user using the personal information manager application is authenticated or otherwise authorized to use each of the applications appearing on the rail. The method 2700 may proceed to 2710, where a window associated with the application gallery is rendered to the display. The method 2700 may end at 2712.

Figure 28:
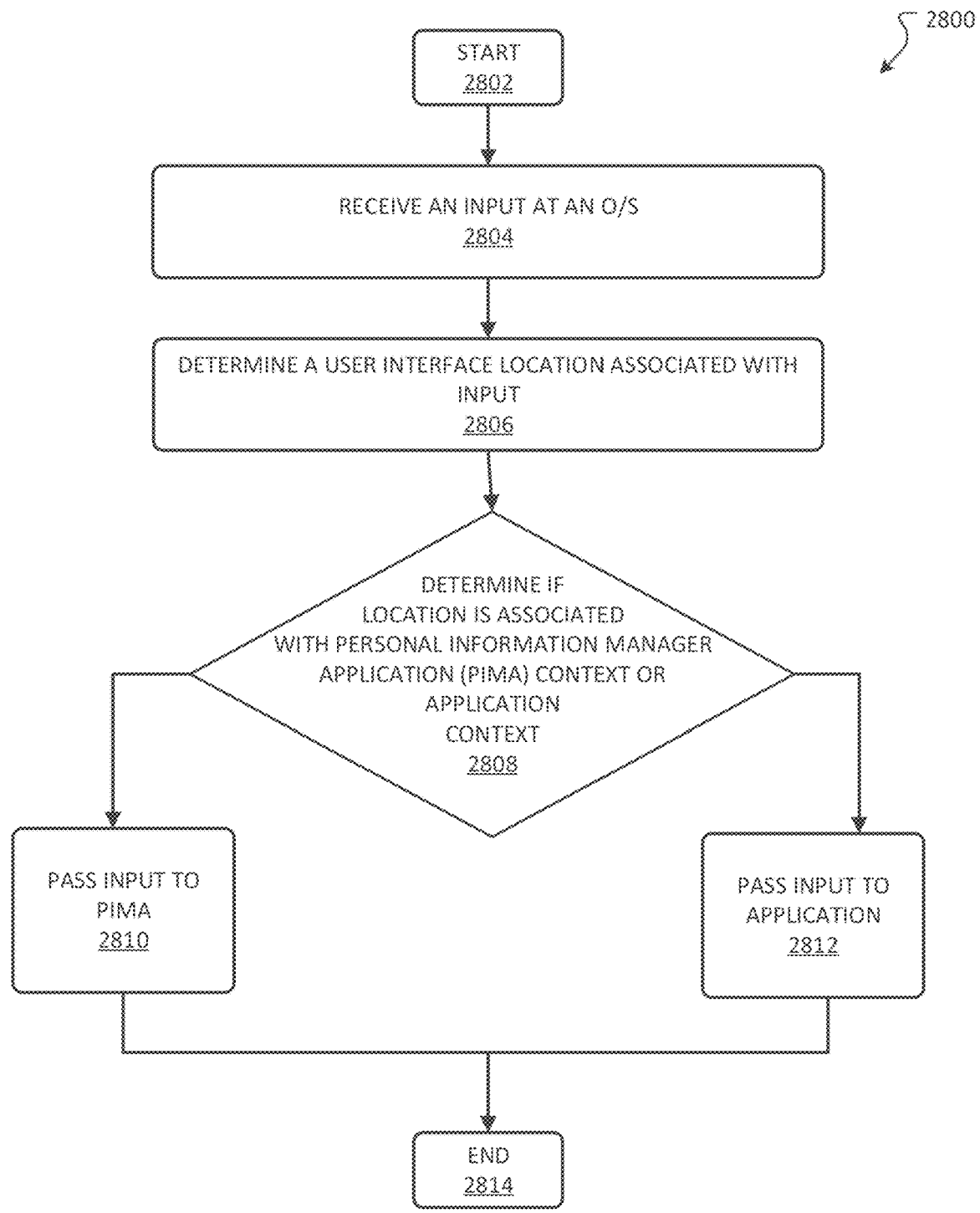
FIG. 28 depicts details of a method for routing an input received by an operating system to one or more of the personal information manager application and/or an application launched within or otherwise contained within the personal information manager application in accordance with in accordance with examples of the present disclosure.

FIG. 28 depicts details of a method 2800 for routing an input received by an operating system to one or more of the personal information manager application and/or an application launched within or otherwise contained within the personal information manager application in accordance with in accordance with examples of the present disclosure. A general order for the steps of the method 2800 is shown in FIG. 28. Generally, the method 2800 starts at 2802 and ends at 2814. The method 2800 may include more or fewer steps or may arrange the order of the steps differently than those shown in FIG. 28. The method 2800 can be executed as a set of computer-executable instructions executed by a computer system and encoded or stored on a computer readable medium. Further, the method 2800 can be performed by gates or circuits associated with a processor. Application Specific Integrated Circuit (ASIC), a field programmable gate array (FPGA), a system on chip (SOC), or other hardware device. Hereinafter, the method 2700 shall be explained with reference to the systems, components, modules, software, data structures, user interfaces, etc described in conjunction with FIGS. 1-27.

The method starts at 2802, where flow may proceed to 2804. At 2804, an input may be received by an operating system. The input may correspond to a click, select, or other indication generally made to an area rendered at a display device. The method may proceed to 2806, where a location on the displayed user interface may be determined. For example, an x,y location may be determined and/or received from the operating system. In some examples, an indication of focus may also be received. For example, an application may have a focus and an input may not be specific to a location. Accordingly, the input may be routed to the application having the focus.

In examples, the personal information manager application may have focus, and a user may be interacting with the application contained within the personal information manager application. Accordingly, at 2808, based on the location determined at 2806, the personal information manager application may determine whether the location is associated with the personal information manager application context (e.g, location corresponds to an area at the personal information manager application) or the context associated with the application that is running within the personal information manager application (e.g., location corresponds to an area within the personal information manager application and associated with the application). In some examples, the context may include not only what is currently being displayed, but may be based on user information (e.g, user credentials) and/or physical display parameters and/or input device information (such as mouse, keyboard, touch etc). If the location is associated with the context of the personal information manager application, then the input may be passed to the personal information manager application whereby the personal information manager application processes the input. For example, the location may be determined to be on the rail 128, accordingly, the input may be passed to the personal information manager application and an action associated with the received input may be processed by the personal information manager application. If, at 2808, the location is associated with the application context, then the input may be passed to the application such that the application can process the input. For example, the input may correspond to a selection of a dashboard in the MICROSOFT POWER BI™ interface. The method 2800 may end at 2814.

Figure 29:
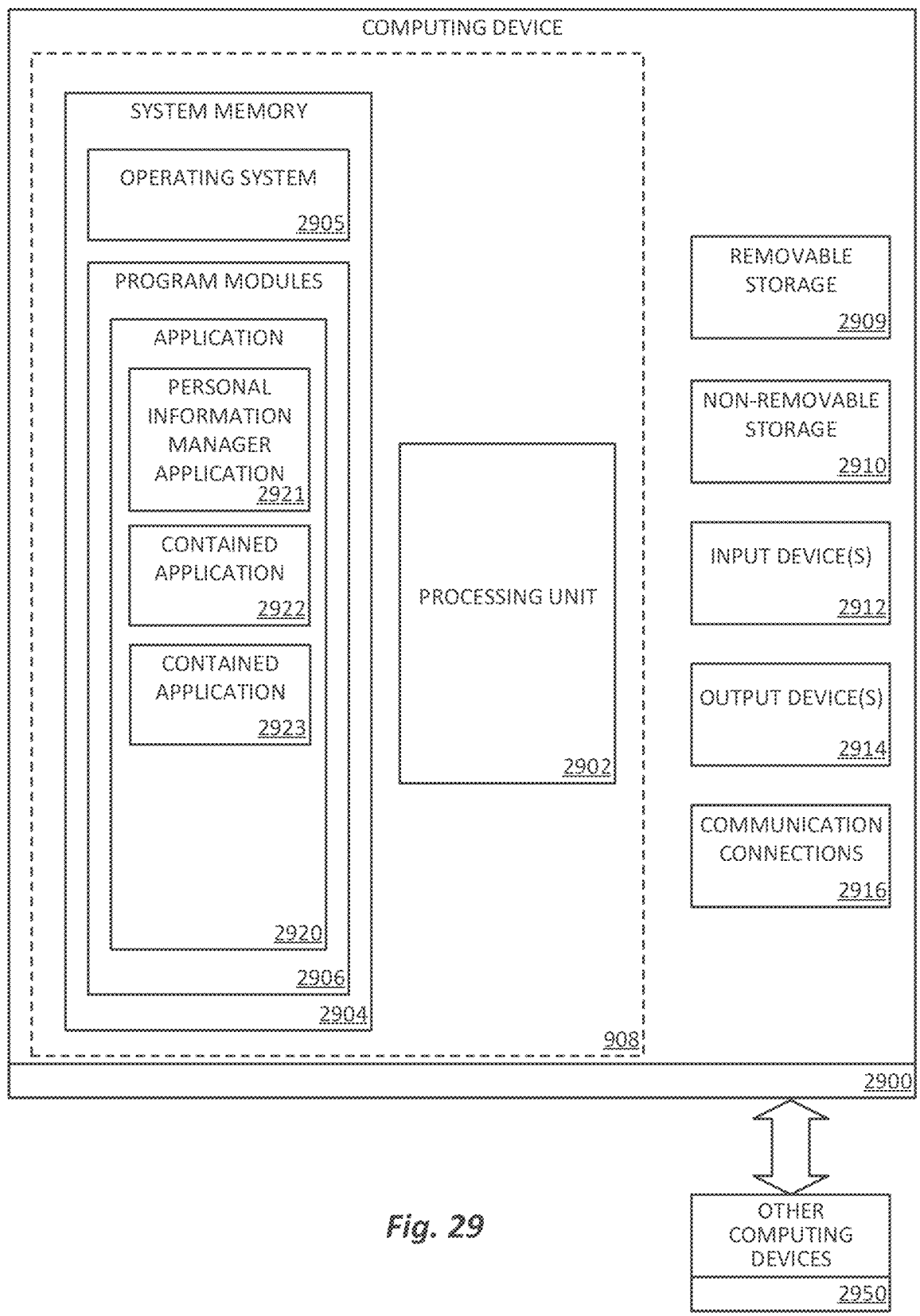
FIG. 29 is a block diagram illustrating physical components (e.g., hardware) of a computing device with which aspects of the disclosure may be practiced.
Figure 30A:
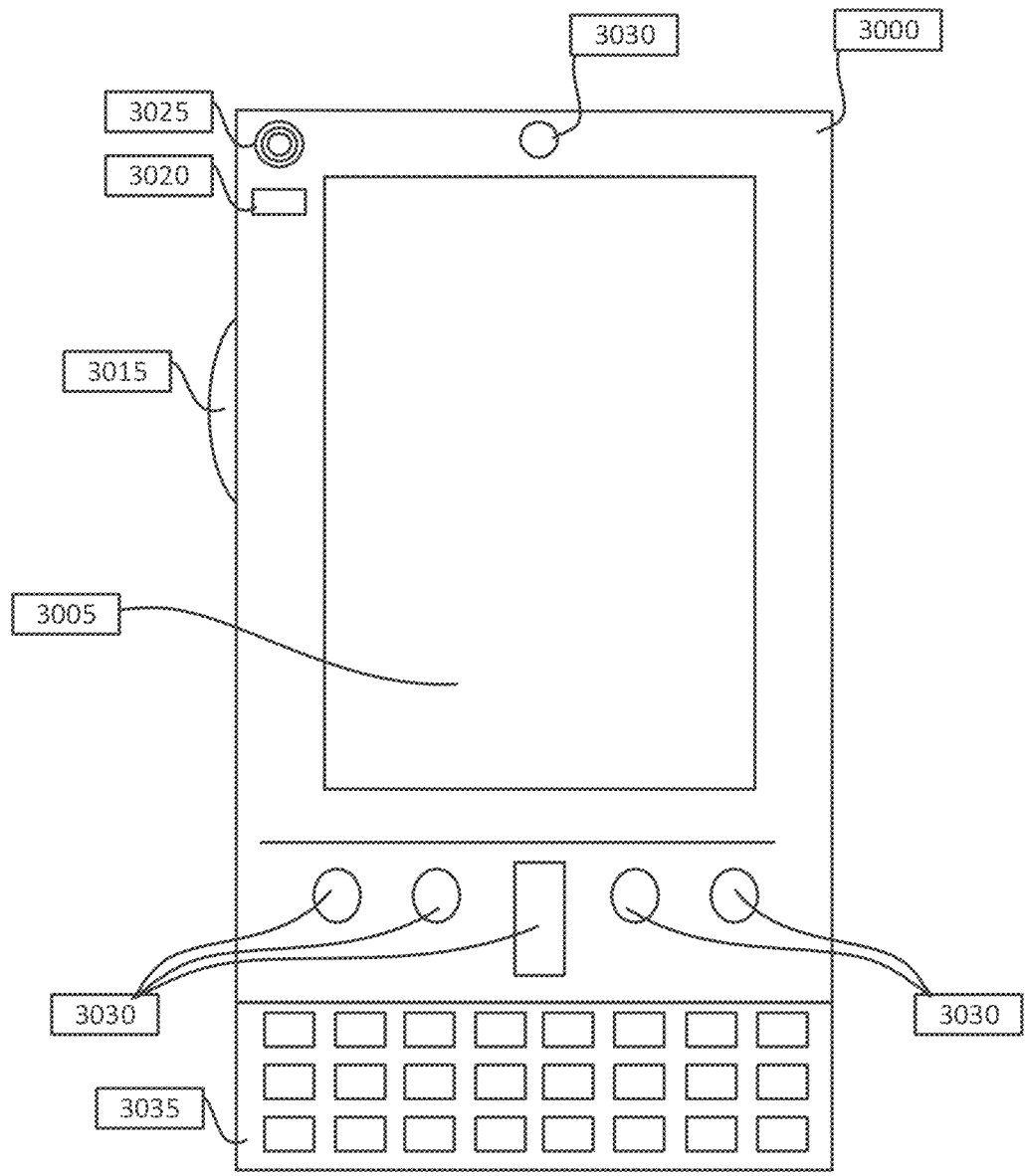
FIGS. 30A-30B illustrate a mobile computing device with which embodiments of the disclosure may be practiced.
Figure 30B:
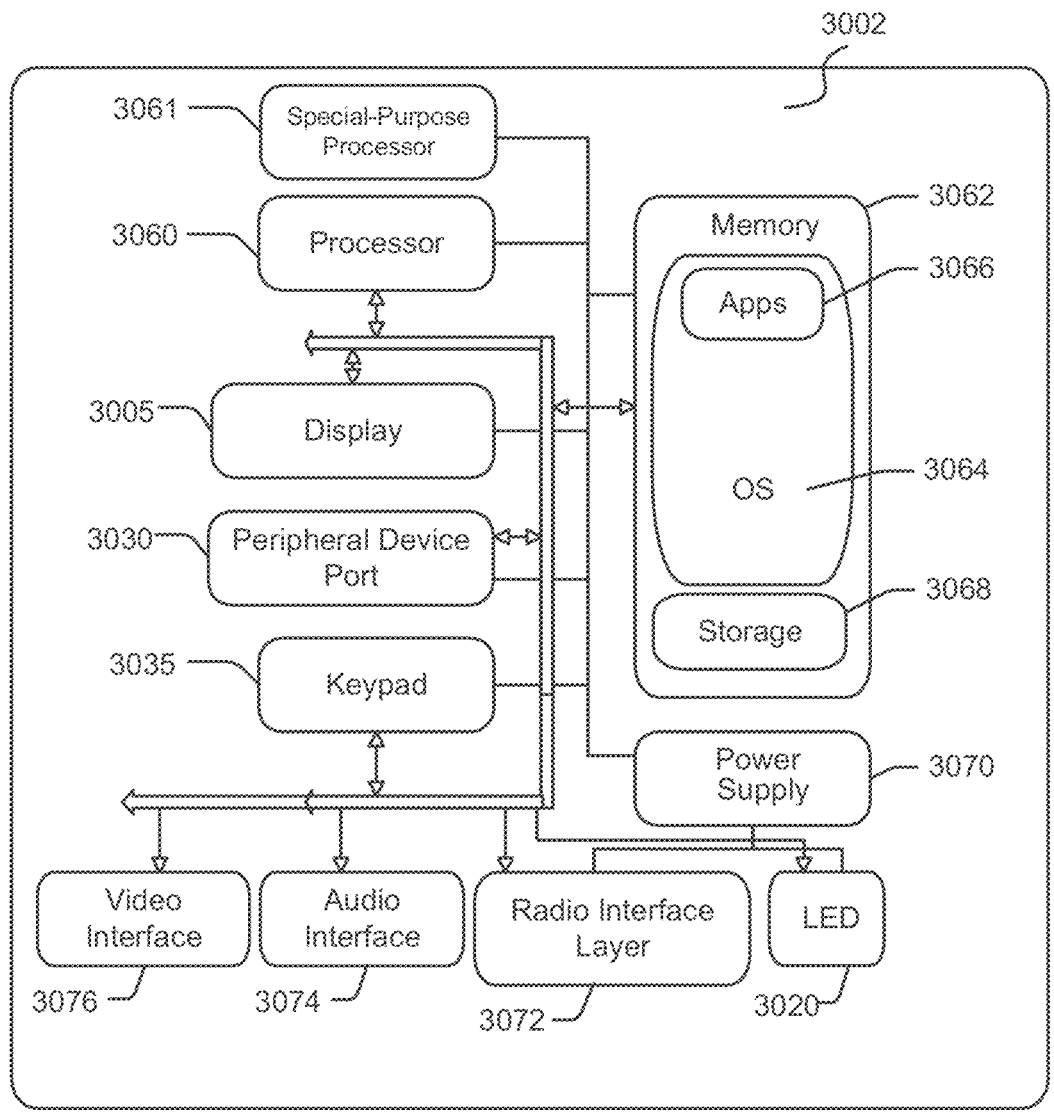
Figure 31:
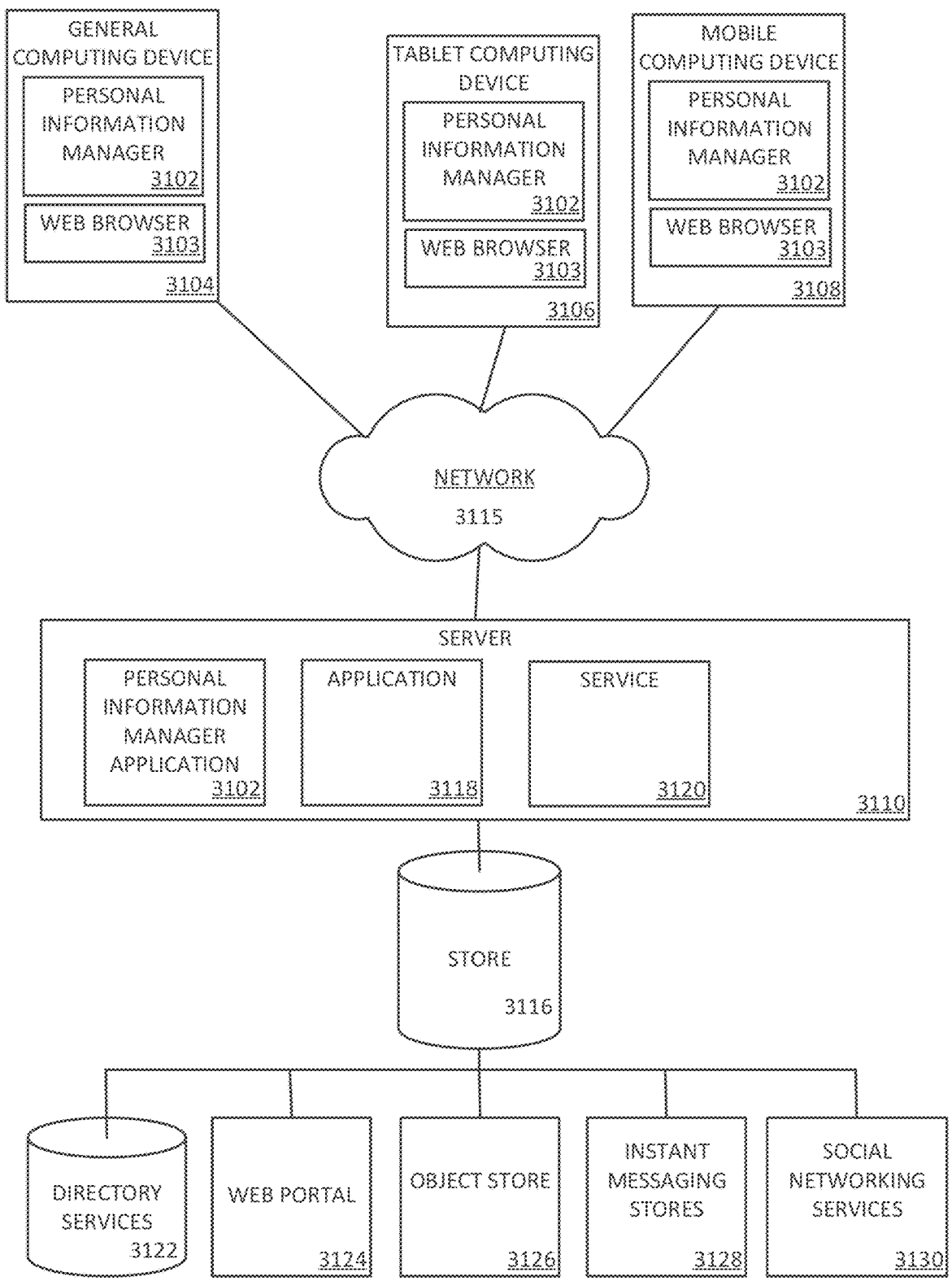
FIG. 31 illustrates one aspect of the architecture of a system for processing data.

FIGS. 29-31 and the associated descriptions provide a discussion of a variety of operating environments in which aspects of the disclosure may be practiced. However, the devices and systems illustrated and discussed with respect to FIGS. 29-31 are for purposes of example and illustration and are not limiting of a vast number of computing device configurations that may be utilized for practicing aspects of the disclosure, described herein.

FIG. 29 is a block diagram illustrating physical components (e.g., hardware) of a computing device 2900 with which aspects of the disclosure may be practiced. The computing device components described below may be suitable for the computing and/or processing devices described above. In a basic configuration, the computing device 2900 may include at least one processing unit 2902 and a system memory 2904. Depending on the configuration and type of computing device, the system memory 2904 may comprise, but is not limited to, volatile storage (e.g., random-access memory (RAM)), non-volatile storage (e.g, read-only memory (ROM)), flash memory, or any combination of such memories.

The system memory 2904 may include an operating system 2905 and one or more program modules 2906 suitable for running software application 2920, such as one or more components supported by the systems described herein. As examples, system memory 2904 may include the personal information manager application 2921, the contained application 2922, and/or a web browser 2923. The personal information manager application 2921 may be the same as or similar to the personal information previously described; the contained application 2922 may be the same as or similar to the contained application or otherwise the user selected application that is selected from the rail as previously described, the web browser may be the same as or similar to the web browser as previously described. The operating system 2905, for example, may be suitable for controlling the operation of the computing device 2900.

Furthermore, embodiments of the disclosure may be practiced in conjunction with a graphics library, other operating systems, or any other application program and is not limited to any particular application or system. This basic configuration is illustrated in FIG. 29 by those components within a dashed line 2908. The computing device 2900 may have additional features or functionality. For example, the computing device 2900 may also include additional data storage devices (removable and/or non-removable) such as, for example, magnetic disks, optical disks, or tape. Such additional storage is illustrated in FIG. 29 by a removable storage device 2909 and a non-removable storage device 2910.

As stated above, a number of program modules and data files may be stored in the system memory 2904. While executing on the processing unit 2902, the program modules 2906 (e.g, application 2920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 29 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 2900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 2900 may also have one or more input device(s) 2912 such as a keyboard, a mouse, a pen, a sound or voice input device, a touch or swipe input device, etc. The output device(s) 2914 such as a display, speakers, a printer, etc may also be included. In some examples, the output device 2914 may include two displays. The aforementioned devices are examples and others may be used. The computing device 2900 may include one or more communication connections 2916 allowing communications with other computing devices 2950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 2904, the removable storage device 2909, and the non-removable storage device 2910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 2900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 30A-30B illustrate a mobile computing device 3000, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 30A, one aspect of a mobile computing device 3000 for implementing the aspects is illustrated. In a basic configuration, the mobile computing device 3000 is a handheld computer having both input elements and output elements. The mobile computing device 3000 typically includes one or more displays 3005 and one or more input buttons 3010 that allow the user to enter information into the mobile computing device 3000. The one or more displays 3005 of the mobile computing device 3000 may also function as an input device (e.g., a touch screen display).

If included, an optional side input element 3015 allows further user input. The side input element 3015 may be a rotary switch, a button, or any other type of manual input element. In alternative aspects, mobile computing device 3000 may incorporate greater or fewer input elements. For example, a display of the one or more displays 3005 may not be a touch screen in some embodiments.

In yet another alternative embodiment, the mobile computing device 3000 is a portable phone system, such as a cellular phone. The mobile computing device 3000 may also include an optional keypad 3035. Optional keypad 3035 may be a physical keypad or a "soft" keypad generated on the touch screen display.

In various embodiments, the output elements include the display 3005 for showing a graphical user interface (GUI), a visual indicator 3020 (e.g., a light emitting diode), and/or an audio transducer 3025 (e.g., a speaker). In some aspects, the mobile computing device 3000 incorporates a vibration transducer for providing the user with tactile feedback. In yet another aspect, the mobile computing device 3000 incorporates input and/or output ports, such as an audio input (e.g., a microphone jack), an audio output (e.g, a headphone jack), and a video output (e.g., a HDMI port) for sending signals to or receiving signals from an external device.

FIG. 30B is a block diagram illustrating the architecture of one aspect of a mobile computing device. That is, the mobile computing device 3000 can incorporate a system (e.g., an architecture) 3002 to implement some aspects. In one embodiment, the system 3002 is implemented as a "smart phone" capable of running one or more applications (e.g., browser, e-mail, calendaring, contact managers, messaging clients, games, and media clients/players). In some aspects, the system 3002 is integrated as a computing device, such as an integrated personal digital assistant (PDA) and wireless phone.

One or more application programs 3066 may be loaded into the memory 3062 and run on or in association with the operating system 3064. Examples of the application programs include phone dialer programs, e-mail programs, personal information management (PIM) programs, word processing programs, spreadsheet programs, Internet browser programs, messaging programs, and so forth. The system 3002 also includes a non-volatile storage area 3068 within the memory 3062. The non-volatile storage area 3068 may be used to store persistent information that should not be lost if the system 3002 is powered down. The application programs 3066 may use and store information in the non-volatile storage area 3068, such as e-mail or other messages used by an e-mail application, and the like. A synchronization application (not shown) also resides on the system 3002 and is programmed to interact with a corresponding synchronization application resident on a host computer to keep the information stored in the non-volatile storage area 3068 synchronized with corresponding information stored at the host computer. As should be appreciated, other applications may be loaded into the memory 3062 and run on the mobile computing device 3000 described herein (e.g., search engine, extractor module, relevancy ranking module, answer scoring module, etc).

The system 3002 has a power supply 3070, which may be implemented as one or more batteries. The power supply 3070 might further include an external power source, such as an AC adapter or a powered docking cradle that supplements or recharges the batteries.

The system 3002 may also include a radio interface layer 3072 that performs the function of transmitting and receiving radio frequency communications. The radio interface layer 3072 facilitates wireless connectivity between the system 3002 and the "outside world," via a communications carrier or service provider. Transmissions to and from the radio interface layer 3072 are conducted under control of the operating system 3064. In other words, communications received by the radio interface layer 3072 may be disseminated to the application programs 3066 via the operating system 3064, and vice versa.

The visual indicator 3020 may be used to provide visual notifications, and/or an audio interface 3074 may be used for producing audible notifications via the audio transducer 3025. In the illustrated embodiment, the visual indicator 3020 is a light emitting diode (LED) and the audio transducer 3025 is a speaker. These devices may be directly coupled to the power supply 3070 so that when activated, they remain on for a duration dictated by the notification mechanism even though the processor 3060 and other components might shut down for conserving battery power. The LED may be programmed to remain on indefinitely until the user takes action to indicate the powered-on status of the device. The audio interface 3074 is used to provide audible signals to and receive audible signals from the user. For example, in addition to being coupled to the audio transducer 3025, the audio interface 3074 may also be coupled to a microphone to receive audible input, such as to facilitate a telephone conversation. In accordance with embodiments of the present disclosure, the microphone may also serve as an audio sensor to facilitate control of notifications, as will be described below. The system 3002 may further include a video interface 3076 that enables an operation of an on-board camera 3030 to record still images, video stream, and the like.

A mobile computing device 3000 implementing the system 3002 may have additional features or functionality. For example, the mobile computing device 3000 may also include additional data storage devices (removable and/or non-removable) such as, magnetic disks, optical disks, or tape. Such additional storage is illustrated in FIG. 30B by the non-volatile storage area 3068.

Data/information generated or captured by the mobile computing device 3000 and stored via the system 3002 may be stored locally on the mobile computing device 3000, as described above, or the data may be stored on any number of storage media that may be accessed by the device via the radio interface layer 3072 or via a wired connection between the mobile computing device 3000 and a separate computing device associated with the mobile computing device 3000, for example, a server computer in a distributed computing network, such as the Internet. As should be appreciated such data/information may be accessed via the mobile computing device 3000 via the radio interface layer 3072 or via a distributed computing network. Similarly, such data/information may be readily transferred between computing devices for storage and use according to well-known data/information transfer and storage means, including electronic mail and collaborative data/information sharing systems.

FIG. 31 illustrates one aspect of the architecture of a system for processing data received at a computing system from a remote source, such as a personal computer 3104, tablet computing device 3106, or mobile computing device 3108, as described above. The personal computer 3104, tablet computing device 3106, or mobile computing device 3108 may include the personal information 3102 and/or a web browser 3103 as previously described. Content at a server device 3110 may be stored in different communication channels or other storage types. For example, various documents may be stored using a directory service 3122, a web portal 3124, a mailbox service 3126, an instant messaging store 3128, or a social networking site 3130.

One or more of the previously described program modules 2906 or software applications 2920 may be employed by server device 3110 and/or the personal computer 3104, tablet computing device 3106, or mobile computing device 3108, as described above. For example, the server device 3110 may include a personal information manager application 3102, the contained application 3118, and/or a service 3120. The personal information manager application 3102 may be the same as or similar to the personal information previously described; the contained application 3118 may be the same as or similar to the contained application or otherwise the user selected application that is selected from the rail as previously described.

The server device 3110 may provide data to and from a client computing device such as a personal computer 3104, a tablet computing device 3106 and/or a mobile computing device 3108 (e.g., a smart phone) through a network 3115. By way of example, the computer system described above may be embodied in a personal computer 3104, a tablet computing device 3106 and/or a mobile computing device 3108 (e.g., a smart phone). Any of these embodiments of the computing devices may obtain content from the store 3116, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry-, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
one or more computer-readable storage media; and
program instructions stored on the one or more computer-readable storage media that, when executed by at least one processor, cause the at least one processor to:
cause a display of a first user interface corresponding to a first application at a display device, the first user interface comprising a rail including a first set of icons representing a plurality of applications and a second set of icons representing a plurality of functions associated with the first application:
generate a plurality of regions within the first user interface based on a selection of a first icon of the second set of icons, the first icon being associated with a first function of the plurality of functions associated with the first application;
receive an indication of an input directed to a selection of a second icon of the first set of icons;
determine a second application associated with the selected second icon; and
cause content associated with a second user interface of the second application to be rendered in at least one region of the plurality of regions within the first user interface.

2. The system of claim 1, wherein the program instructions, when executed by the at least one processor, further cause the at least one processor to:
identify an area of the first user interface; and
cause the second user interface of the second application to be displayed at the identified area.

3. The system of claim 2, wherein the program instructions, when executed by the at least one processor, further cause the at least one processor to launch a web browser instance at the identified area.

4. The system of claim 2, wherein the program instructions, when executed by the at least one processor, further cause the at least one processor to cause a display of an application gallery, the application gallery including a plurality of icons associated with a second plurality of applications, wherein the plurality of icons is different than the first set of icons displayed at the rail.

5. The system of claim 4, wherein the program instructions, when executed by the at least one processor, further cause the at least one processor to:
   receive an indication of an input indicative of a selection of an icon of the plurality of icons; and
   based on the selection, include the selected icon in the rail.

6. The system of claim 2, wherein the program instructions, when executed by the at least one processor, further cause the at least one processor to:
   receive an input indicative of an interaction with the first application or the second application;
   determine a location associated with the input;
   determine whether the input is intended for the first application or the second application; and
   route the input to the determined first application or determined second application.

7. The system of claim 1, wherein the program instructions, when executed by the at least one processor, further cause the at least one processor to:
   obtain information identifying a portion of the second application to be displayed, wherein the portion of the second application to be displayed corresponds to less than all of the second user interface;
   obtain information identifying a region of the first user interface at which the portion of the second application is to be displayed; and
   cause the portion of the second application to be displayed at the identified region.

8. The system of claim 1, wherein at least one application of the plurality of applications is accessible via a network.

9. The system of claim 1, wherein the program instructions, when executed by the at least one processor, further cause the at least one processor to:
   determine if a security token associated with at least one application of the plurality of applications has expired; and
   authenticate a user based on the at least one application.

10. The system of claim 1, wherein the first application is displayed within a web browser.

11. The system of claim 1, wherein the first application is a personal information manager application.

12. The system of claim 1, wherein the program instructions, when executed by the at least one processor, further cause the at least one processor to:
   receive information from a manifest file; and
   populate the rail with the first set of icons based on the manifest file.

13. A method for displaying a user interface of an application, the method comprising:
   causing a display of a first user interface corresponding to a first application at a display device, the first user interface comprising a rail including a first set of icons representing a plurality of applications and a second set of icons representing a plurality of functions associated with the first application;
   generating a plurality of regions within the first user interface based on a selection of a first icon of the second set of icons, the first icon being associated with a first function of the plurality of functions associated with the first application;
   receiving an indication of an input directed to a selection of a second icon of the first set of icons;
   determining a second application associated with the selected second icon;
   determining a location to render a second user interface associated with the second application; and
   causing content associated with the second user interface of the second application to be rendered in at least one region of the plurality of regions within the first user interface at the determined location.

14. The method of claim 13, further comprising determining that the location to render the display of the second user interface associated with the second application is at least one of a new application window or tab of a web browser.

15. The method of claim 13, wherein an execution of the second application occurs at a different device than an execution of the first application.

16. A computer-readable storage media including instructions, which when executed by a processor, cause the processor to:
   determine, from a manifest file, a first set of icons representing a plurality of applications to be displayed at a first user interface;
   populate a first application window of a first user interface corresponding to a first application with the first set of icons and a second set of icons representing a plurality of functions associated with the first application:
   receive an indication associated with a selection of a first icon of the second set of icons from within the first application window of the first user interface;
   determine a first function of the plurality of functions associated based on the selected first icon;
   generate a plurality of regions within the first user interface based on the first function;
   receive an indication of an input directed to a selection of a second icon of the first set of icons;
   determine a second application associated with the selected second icon;
   cause content associated with a second user interface of the second application to be rendered in at least one region of the plurality of regions within the first user interface:
   receive an input at the first user interface;
   determine that the received input is associated with the second application; and
   provide the received input to the second application.

17. The computer-readable storage media of claim 16, wherein the instructions, which when executed by a processor, cause the processor to:
   receive a user input associated with a request to add an icon to the first application window of the first user interface;
   update the manifest file based on the request to add the icon to the first application window of the first user interface; and
   display the icon in the first user interface together with the first set of icons.

* * * * *